(12) United States Patent
Bagate et al.

(10) Patent No.: US 10,977,395 B1
(45) Date of Patent: Apr. 13, 2021

(54) METHOD, SYSTEM AND PROGRAMMED PRODUCT FOR ADMINISTERING BUILDING PROJECTS

(71) Applicant: MIND-i, LLC, New York, NY (US)

(72) Inventors: Norine W. Bagate, Lake Hiawatha, NJ (US); Ibrahima Bagate, Lake Hiawatha, NJ (US); Oumar T. Konate, Burlington, NJ (US)

(73) Assignee: MIND-I, LLC, New York, NY (US)

( * ) Notice: Subject to any disclaimer, the term of this patent is extended or adjusted under 35 U.S.C. 154(b) by 325 days.

(21) Appl. No.: 16/180,924

(22) Filed: Nov. 5, 2018

Related U.S. Application Data

(60) Provisional application No. 62/677,428, filed on May 29, 2018, provisional application No. 62/581,120, filed on Nov. 3, 2017.

(51) Int. Cl.
*G06F 30/13* (2020.01)
*G06F 111/02* (2020.01)
*G06F 111/04* (2020.01)
*G06F 111/20* (2020.01)

(52) U.S. Cl.
CPC .......... *G06F 30/13* (2020.01); *G06F 2111/02* (2020.01); *G06F 2111/04* (2020.01); *G06F 2111/20* (2020.01)

(58) Field of Classification Search
None
See application file for complete search history.

(56) References Cited

U.S. PATENT DOCUMENTS

| | | | |
|---|---|---|---|
| 2011/0010134 A1* | 1/2011 | Balla | G06F 30/13 703/1 |
| 2018/0349522 A1* | 12/2018 | Aphek | G06F 30/13 |
| 2019/0188339 A1* | 6/2019 | Cho | G06Q 50/08 |

* cited by examiner

*Primary Examiner* — Craig C Dorais
(74) *Attorney, Agent, or Firm* — Amster, Rothstein & Ebenstein LLP

(57) ABSTRACT

A method of validating an electronic computer model of a building project includes: providing one or more electronic building project databases storing: (i) stakeholder information, (ii) element data; (iii) material data; (iv) specification data; (v) requirement data; (vi) procurement data and a plurality of instance data items are provided by at least one stakeholder of the first subgroup of stakeholders; generating a scope ID associated with each instance data item (c) storing the scope ID; (d) receiving a first electronic computer model including a plurality of existence objects associated with the first building project; (e) validating, the first electronic computer model (f) receiving updated data; (g) repeating step (e)-(f) until no alert is generated; (h) generating and transmitting a certification query; (j) receiving, a certification message from each stakeholder and (k) storing, in immutable form, the plurality of instance data items and respective scope ID of each instance data item.

20 Claims, 36 Drawing Sheets

LOD Completion Requirements 3D-1

3D-1(a) LOD 1 Completion
Complete when the parameters of spatial context, size, scope, and scale of the project have been established and an assessment of potential project impacts has been made

3D-1(b) LOD 2 Completion
Complete when performance criteria for building systems and assemblies are developed. All predetermined design criteria must be met and accepted by the relevant stakeholders.

3D-1(c) LOD 3 Completion
Complete when all predetermined design criteria have been met and accepted by the relevant stakeholders or when the size, shape, location, configuration, performance, and properties of elements, materials, and systems for a building project have been confirmed and accepted by all relevant stakeholders.

3D-1(d) LOD 4 Completion
Complete when it is determined that sufficient data has been provided to: (1) describe and assess the scope of work implied by the design; (2) assign procurement responsibility for every element, material, system, and requirement implied by the design; (3) assess constructability and determine means and methods required to accomplish the design; obtain regulatory approvals for the scope of the proposed work; and (4) solicit bid proposals for a fixed price from building professionals and construction managers for the scope of work implied by the design.

3D-1(e) LOD 5 Completion
Complete when sufficient data has been provided to verify installed systems of the building project and the verified data are integrated into the virtual model.

3D-1(f) LOD 6 Completion
Complete when the electronic building project administration computer system determines or confirms that any post construction and operational requirements have been met and confirmed by the relevant stakeholders

FIG. 3D

| | | |
|---|---|---|
| | TIMELINE | TOTAL LENGTH OF PROJECT<br>START DATE - END DATE |
| | LOD 1 Complete  LOD 2 Complete  DATE  LOD 3 In Progress | |

Actions

| Owner | | |
|---|---|---|
| Project Information | Manage Profile | Upload/Download Documents |
| Overview | Access/View Project Home Page | Send/Track Submittals |
| Notifications (3) | Invite Participants | View Project Cost Data |
| Email (20) | View/Review/Execute Contracts | View Project Cost Data |
| SMS/IM (4) | Look Up Defined Terms | Review and Comment on Quotations |
| Calendar | View Practical Standards | Review and Comment on CM Bids |
| Details & Scope | Create/Review/Comment on Meeting Notes | Review and Comment on Project Schedule |
| Actions | Basic Content Search | Review and Comment on Project Schedule |
| References & Records | Access/View Documents | Review and Comment on Sub-trade Bids |
| | Communicate Directly with Other Participants | |

FIG. 5B

| Owner Representative | | | | |
|---|---|---|---|---|
| Project Information | Timeline | LOD 1 Complete | LOD 2 Complete | LOD 3 In Progress | TOTAL LENGTH OF PROJECT START DATE - END DATE |
| Overview | Actions | | | |
| | Manage Profile | | | |
| | Access/View Project Home Page | | | |
| Notifications (2) | Invite Participants | | | |
| Email (11) | View/Review/Execute Contracts | | | |
| SMS/IM (3) | Look Up Defined Terms | | | |
| Calendar | View Practical Standards | | | |
| | Create/Review/Comment on Meeting Notes | Anonymous Communications Between Participants and Subscribers | Review/Approve Invoices | Review and Comment on Construction Schedule |
| Details & Scope | Basic Content Search | Upload/Download Documents | Prepare/Submit Invoices | Prepare/Manage Construction Schedule |
| Actions | Advanced Content Search | Initiate/Participate in Forum Discussions | Review/Approve Change Requests | Review and Comment on Project Schedule |
| | Access/View Documents | Prepare Quotation Packages | Review/Approve Change Requests | |
| References & Records | Communicate Directly with Other Participants | Prepare Bid Packages | View Construction Cost Data | |
| | | Send/Track Submittals | Prepare/Manage Construction Cost Data | |
| | | Create/Respond to/Track RFIs | Review and Comment on Quotations | |
| | | View Submittal Log | Review and Comment on Sub-trade Bids | |
| | | Anonymously Solicit Solutions and Receive Responses to Performance Specifications | Review and Comment on CM Bids | |

FIG. 5D

Cost Consultant

Timeline: LOD 1 Complete | LOD 2 Complete | LOD 3 In Progress | TOTAL LENGTH OF PROJECT START DATE - END DATE

| Project Information | Actions | | |
|---|---|---|---|
| Overview | Manage Profile | | |
| | Access/View Project Home Page | | |
| Notifications (1) | Invite Participants | | |
| Email (13) | View/Review/Execute Contracts | | |
| SMS/IM (7) | Look Up Defined Terms | | |
| Calendar | View Practical Standards | | |
| Details & Scope | Create/Review/Comment on Meeting Notes | Anonymous Communications Between Participants and Subscribers | Review/Approve Invoices |
| | | Upload/Download Documents | Prepare/Submit Invoices | Review and Comment on Construction Schedule |
| | | Initiate/Participate in Forum Discussions | Review/Approve Change Requests | Prepare/Manage Construction Schedule |
| | | Prepare Quotation Packages | Review/Approve Change Requests | |
| | | Prepare Bid Packages | View Construction Cost Data | Prepare/Manage/Submit 4D Model |
| | | Send/Track Submittals | Prepare/Manage Construction Cost Data | Prepare/Manage/Submit 5D Model |
| Actions | Basic Content Search | Create/Respond to/Track RFIs | Review and Comment on Quotations | Review and Comment on Project Schedule |
| | Advanced Content Search | View Submittal Log | Review and Comment on Sub-trade Bids | |
| References & Records | Access/View Documents | Anonymously Solicit Solutions and Receive Responses to Performance Specifications | Review and Comment on CM Bids | |
| | Communicate Directly with Other Participants | | | |

FIG. 5E

| Building Professionals | | | |
|---|---|---|---|
| Project Information | TIMELINE | LOD 1 Complete   LOD 2 Complete   LOD 3 In Progress | TOTAL LENGTH OF PROJECT START DATE - END DATE |
| Overview | Actions | | |
| Notifications (9) | Manage Profile | Upload/Download Documents | Assign Procurement Responsibility |
| Email (12) | Access/View Project Home Page | Send/Track Submittals | Request/Review/Approve Purchase Orders/Invoices |
| SMS/IM (4) | Access/Project Workspace | Create/Respond to/Track RFIs | Prepare/Submit Applications for Payment |
| Calendar | View/Review/Execute Contracts | View Submittal Log | Prepare Bid Packages |
| Details & Scope | Look Up Defined Terms | Review and Comment on Quotations | Prepare Quotation Packages |
| Actions | View Practical Standards | Prepare/Remit 4D Model | Prepare/Submit Change Requests |
| References & Records | Create/Review/Comment on Meeting Notes | View and Select Quotations | Prepare/Remit Construction Cost Data |
| | Basic Content Search | Prepare/Remit 5D Model | Publish/Export LOD Certified Documents |
| | Access/View Documents | Review and Comment on Project Schedule | |
| | Communicate Directly with Participants | Review and Comment on Construction Schedule | |

Prime Design Consultant

| Timeline | LOD 1 Complete | LOD 2 Complete | LOD 3 In Progress | TOTAL LENGTH OF PROJECT START DATE - END DATE |
|---|---|---|---|---|

| Section | Actions |
|---|---|
| Project Information | Manage Profile • Access Project Workspace • Specify |
| Overview | Access/View Project Home Page |
| Notifications (3) | Invite Participants • Certify LOD of Uploaded/Imported Deliverables |
| Email (1) | View/Review/Execute Contracts • Initiate/Participate in Forum Discussions • Review/Approve Invoices • Review and Comment on Construction Schedule |
| SMS/IM (6) | Look Up Defined Terms • Upload/Download Documents • Prepare/Submit Invoices • Prepare/Manage Construction Schedule |
| Calendar | View Practical Standards • Initiate/Participate in Forum Discussions • Review/Approve Change Requests • Coordinate Schedules/Calendars |
| Details & Scope | Create/Review/Comment on Meeting Notes • Prepare Quotation Packages • Review/Approve Change Requests • Publish and Submit WIP |
| | Basic Content Search • Prepare Bid Packages • View Construction Cost Data • Review and Comment on Project Schedule |
| Actions | Advanced Content Search • Send/Track Submittals • Prepare/Manage Construction Cost Data |
| References & Records | Access/View Documents • Create/Respond to/Track RFIs • Review and Comment on Quotations |
| | Communicate Directly with Other Participants • View Submittal Log • Review and Comment on Sub-trade Bids |
| | | Publish/Export/Log LOD Certified Documents • Review and Comment on CM Bids |

FIG. 5I

Constructor

TIMELINE

| LOD 1 Complete | LOD 2 Complete | LOD 3 In Progress | TOTAL LENGTH OF PROJECT START DATE - END DATE |

- Project Information
- Overview
- Notifications (6)
- Email (2)
- SMS/IM (14)
- Calendar
- Details & Scope
- Actions
- References & Records

Actions

| Manage Profile | Prepare/Remit 4D Model | Prepare/Remit 5D Model |
| Access/View Project Home Page | Upload/Download Documents | Assign Procurement Responsibility |
| Access/Project Workspace | Send/Track Submittals | Request/Review/Approve Purchase Orders/Invoices |
| View/Review/Execute Contracts | Create/Respond to/Track RFIs | Prepare/Submit Applications for Payment |
| Look Up Defined Terms | View Submittal Log | Prepare/Submit Change Requests |
| View Practical Standards | Review and Comment on Quotations | Prepare Bid Packages |
| Create/Review/Comment on Meeting Notes | Review/Comment on Sub-trade Bids | Prepare Quotation Packages |
| Basic Content Search | View and Select Quotations | Publish/Export LOD Certified Documents |
| Access/View Documents | View and Select Sub-trade Bids | Prepare/Remit Construction Cost Data |
| Communicate Directly with Participants | Review and Comment on Project Schedule | |
| | Review and Comment on Construction Schedule | |

FIG. 5K

Supplier/Vendor

Project Information

Timeline | LOD 1 Complete | LOD 2 Complete | LOD 3 In Progress | TOTAL LENGTH OF PROJECT START DATE - END DATE

Overview

Notifications (2)

Email (3)

SMS/IM (3)

Calendar

Details & Scope

Actions

- Manage Profile
- Access/View Project Home Page
- Invite Participants
- Review/Execute Terms of Use
- Prepare/Submit Purchase Orders/Invoices
- Basic Content Search
- Advanced Content Search
- Access/View Documents
- Acknowledge Receipt/Access to Documents and Submittals
- Anonymous Communications Between Participants and Subscribers
- Upload/Download Documents
- Initiate/Participate in Forum Discussions
- Prepare Quotation Packages
- Send/Track Submittals
- Create/Respond to/Track RFIs
- View Submittal Log
- Review and Comment on Project Schedule
- Communicate Directly with Other Participants
- Review and Comment on Construction Schedule

References & Records

FIG. 5M

| | TIMELINE | LOD 1 Complete | LOD 2 Complete | LOD 3 In Progress | TOTAL LENGTH OF PROJECT START DATE - END DATE |
|---|---|---|---|---|---|

| Specifier | |
|---|---|
| Project Information | |
| Overview | Actions · Manage Profile · Access/View Project Home Page · Invite Participants · View/Review/Execute Contract · Look up Defined Terms · View Practical Standards |
| Notifications (8) | Communicate Directly w/ Participants · Upload/Download Documents · Review and Mark-up Documents · Coordinate schedules/calendars w/ Project Professionals · Import/Export Modeled Data · Initiate/Participate in Forum Discussions |
| Email (3) | |
| SMS/IM (1) | Send/Track Submittals |
| Calendar | Solicit Quotations · Assign Procurement Responsibility · Review and Comment on Quotations |
| Details & Scope | Create/Review/Comment on Meeting Notes · Review and Comment on Sub-trade Bids · Review/Comment on Project Schedule · Review/Comment on Construction Schedule |
| Actions | Basic Content Search · Advanced Content Search · Access/View Documents |
| References & Records | Anonymously Solicit Solutions and Receive Responses to Performance Specification |

| Project Professional/ Prime Design Professional | Search (Date) | NOTIFICATION | NOTIFICATION TYPE | Date/Time Received |
|---|---|---|---|---|
| Project Information | Notification 1 Preview<br><br>Subject<br>Sender Name<br>Date Received | Subject<br>Scope Item<br>Material Object Category | | GO TO SUBMITTAL |
| Overview | Notification 2 Preview<br><br>Subject<br>Sender Name<br>Date Received | Previous Notification | | Next Notification |
| Notifications (5) | | | | |
| Email (20) | Notification 3 Preview<br><br>Subject<br>Sender Name<br>Date Received | BODY OF NOTIFICATION 2 | | |
| SMS/IM (4) | | | | |
| Calendar | Notification 4 Preview<br><br>Subject<br>Sender Name<br>Date Received | | | |
| Details & Scope | | | | |
| Actions | | | | |
| References & Records | | | | |

0 Comments

METHOD, SYSTEM AND PROGRAMMED PRODUCT FOR ADMINISTERING BUILDING PROJECTS

RELATED APPLICATIONS

This application claims priority to and the benefit of each of U.S. Provisional Patent Application No. 62/677,428, filed on May 29, 2018, entitled "METHOD, SYSTEM AND PROGRAMMED PRODUCT FOR ADMINISTERING BUILDING PROJECTS" and U.S. Provisional Patent Application No. 62/581,120, filed on Nov. 3, 2017, entitled "METHOD, SYSTEM AND PROGRAMMED PRODUCT FOR ADMINISTERING BUILDING PROJECTS," the entire content of each of which is hereby incorporated by reference herein.

FIELD

The present invention generally relates to computer systems, methods, and programmed products used in administering, managing and/or mitigating escalation risk in building projects.

BACKGROUND

Building projects are notoriously difficult to realize on budget, on schedule and to specifications. Project and construction management is used to shepherd the project through the planning, design and construction process to ensure these goals are met.

Computer systems have long been used for project and construction management including the use of specific computer systems related to critical path method ("CPM") administration.

Typically, these computer systems aid in process workflow, but the systems developed to date are inadequate to manage the complexity of building project risk and suffer a significant technical drawback. For example, by allowing the user to customize the basic configuration, the existing system enables poor data input, such as incorrect or incomplete model data and poor data management which results in schedule delay, overall cost escalation and disputes over scope between stakeholders in a building project. As a result, many building projects exceed their budget and construction contract cost estimates, and are completed past schedule.

Conventional computer systems used to share building project data suffer from a variety of technical challenges. The use of federated computer systems can lead to the distribution of false, misleading and/or unreliable data. Other technical challenges can arise from the lack of an appropriate technical barrier to the generation and distribution of counterfeit derivatives of project data in digital and/or published page format. Other technical problems arise from the lack of technological controls against undisclosed peer-to-peer data exchanges and transactions. Current systems lack the ability to block and/or track unauthorized and uncoordinated changes to the project Conventional project management systems also suffer from the lack of technical ability to properly and seamlessly identify, allocate and maintain stakeholder risk allocations over the entire project life cycle.

Conventional project management systems also suffer from the lack of technical ability for all stakeholders in a building project to interact in a practical real-time way across a single controlled platform which allows the stakeholders to see and understand the implications of their decisions that impact the scope, cost and schedule of the project, to manage and/or mitigate the risk of escalation.

Conventional project management systems also suffer from the lack of technical ability to detect and reveal unresolved and under-developed scope during planning and design that precedes the under-estimation of construction cost that is revealed during construction of a building project. The true cost of unspecified or unresolved scope is significantly greater and more difficult to manage and control during construction.

Conventional project management systems also suffer from the lack of technical ability to properly estimate the project scope and cost and to track the estimates throughout the life of the building project.

Conventional project management systems also suffer from the lack of technical ability to provide for a system to create immutable virtual assets and provide the practical framework for governance and enforcement necessary to uphold trust in the network.

It is an object of the present invention to provide systems, methods, and programmed products which addresses one or more of these and other technical challenges.

SUMMARY

The present invention generally relates to computer systems, methods, and programmed products used in administering, managing and/or mitigating escalation risk in building projects.

One or more of the above and other technical issues are addressed by embodiments of the present invention.

A method of validating a first electronic computer model of a first building project using an electronic building project administration computer system includes: (a) providing one or more electronic building project databases stored on non-volatile computer readable media operatively connected to the electronic building project administration computer system, the one or more electronic building project databases comprising at least the following first data types associated with the first building project: (i) stakeholder information associated with each stakeholder of a first subgroup of stakeholders of a plurality of stakeholders associated with the first building project, (ii) element data associated with each instance data item of a plurality of instance data items associated with the first building project, wherein the element data for each instance data item is provided by a first responsible stakeholder of the first subgroup of stakeholders and the element data includes first source information associated with the first responsible stakeholder and a first timestamp indicating when the element data was provided to the one or more electronic building project databases; (iii) material data associated with each instance data item of the plurality of instance data items associated with the first building project, wherein the material data for each instance data item is provided by a second responsible stakeholder of the first subgroup of stakeholders and the material data includes second source information associated with the second responsible stakeholder and a second timestamp indicating when the material data was provided to the one or more electronic building project databases; (iv) specification data associated each instance data item of the plurality of instance data items associated with the first building project, wherein the specification data for each instance data item is provided by a third responsible stakeholder of the first subgroup of stakeholders where the element data includes third source information associated with the third responsible stakeholder and a third timestamp indicating when the specification data was provided to the one or more electronic building project databases; (v) requirement data associated with contract documents related to each instance data item of the plurality of instance data items associated with the first building project, wherein the requirement data for each instance data item is provided by a fourth responsible stakeholder of the first subgroup of stakeholders where the requirement data includes fourth source information associated with the fourth responsible stakeholder and a fourth timestamp indicating when the element data was provided to the one or more electronic building project databases; (vi) procurement data associated with procurement of each instance data item of the plurality of instance data items associated with the first building project, wherein the procurement data is provided by a fifth responsible stakeholder of the first subgroup of stakeholders and includes fifth source information associated with the fifth responsible stakeholder and a fifth timestamp indicating when the procurement data was provided to the one or more electronic building project databases; and wherein the plurality of instance data items are provided by at least one stakeholder of the first subgroup of stakeholders wherein each instance data item is linked to at least one of the element data, the specification data, the requirement data and the procurement data and each instance data item includes sixth source information associated with the at least one stakeholder that provided the instance data item to the one or more electronic building project databases and a sixth time stamp indicating when the instance data item was added to the one or more electronic building project databases; (b) generating, by the electronic building project administration computer system, a scope ID associated with each instance data item of the plurality of instance data items associated with the first building project, the scope ID including at least: (i) a material element category indicator; (ii) a CSI division number; (iii) a material object category indicator; (iv) a scope designator; (v) a type designator; (vi) a material object category indicator; and (vii) a specification category number; wherein a respective value of each of the material element category indicator, CSI division number, material object category indicator, scope designator, material object category indicator, and specification category number is based on at least one of element data, material data, specification data, requirement data, and procurement data to which a respective instance data item is linked to, such that the respective instance data item is associated with a respective scope ID; (c) storing, by the electronic building project administration computer system, the scope ID associated with each respective instance data item in the one or more electronic building project databases; (d) receiving, by the electronic building project administration computer system, from a second at least one stakeholder from a second subgroup of stakeholders associated with the first building project, a first electronic computer model related to the first building project, the first electronic building model including a plurality of existence objects associated with the first building project and including seventh source data associated with the second at least one stakeholder and seventh timing information indicating when the at least one computer model is received; (e) validating, by the electronic building administration computer system, the first electronic computer model including steps of: (i) comparing, by the electronic building administration system, the plurality of existence objects included in the first computer model to the plurality of instance data items associated with the first building project to map each existence object to a corresponding instance data item associated with the first building project and each instance data item to a corresponding existence object based at least on the scope ID; (ii) generating, by the electronic building administration system, an electronic alert signal when the first electronic computer model includes an existence object that is not mapped to a corresponding instance data item or when an instance data item is not mapped to a corresponding existence object; (iii) transmitting, by the electronic building administration system, the electronic alert signal to the second at least one stakeholder and the first subgroup of stakeholders; (f) receiving, by the electronic building administration system, updated information, including at least one of: updated instance data item information; and (ii) updated first computer model information; (g) repeating step (e)-(f) until no alert is generated; (h) generating, by the electronic building administration system, a certification query requesting certification of the instance data items; (i) transmitting, by the electronic building administration system, the certification query to each stakeholder of the first subgroup of stakeholders and the second subgroup of stakeholders; (j) receiving, by the electronic building administration system, a certification message from each stakeholder of the first subgroup of stakeholders and the second subgroup of stakeholders; (k) storing, by the electronic building administration system, in an immutable form, the plurality of instance data items along with the respective scope ID of each instance data item, wherein at least the value of the material element category indicator, the CSI division number and the type designator of each scope ID has a non-zero value, when the certification message form each stakeholder confirms certification; and (l) storing, by the electronic building administration system, the plurality of existences, when the certification message form each stakeholder confirms certification.

In embodiments, the method includes steps of: (m) receiving, by the electronic building administration system, a drawing sheet generation request from at least one stakeholder of the first subgroup of stakeholders or the second subgroup of stakeholders, the drawing sheet request including at least one scope ID; (n) generating, by the electronic building administration system, a drawing sheet indicating each instance of the existence object corresponding to the at least one scope ID included in the first computer model; (o) assigning, by the electronic building administration system, a sheet ID unique to the drawing sheet generated in (n), wherein the sheet ID, includes: (i) a discipline designator; (ii) a documentation format series number; (iii) a level of development indicator; and (iv) a level of development status indicator; wherein values for the discipline designator, document discipline designator, level of development indicator and level of development status indicator are based on input provided by stakeholders; (p) updating, by electronic building administration system, the level of development status indicator of the sheet ID to reflect certification when the certification message from each stakeholder of the first subgroup of stakeholders and the second subgroup of stakeholders is received; and (q) storing, by electronic building administration system, in an immutable form, the drawing sheet and updated sheet ID and the at least one scope ID.

In embodiments, the stakeholder information includes identity information related to an identity of each stakeholder of the first subgroup of stakeholders.

In embodiments, the stakeholder information includes role information related to a role of each stakeholder of the first subgroup of stakeholders.

In embodiments, the stakeholder information includes interest information related to an interest of each stakeholder of the first subgroup of stakeholders.

In embodiments, the stakeholder information includes professional information related to a profession of each stakeholder of the first subgroup of stakeholders.

In embodiments, the stakeholder information includes technical obligation information related to a technical obligation of each stakeholder of the first subgroup of stakeholders in the first building project.

In embodiments, the stakeholder information includes contribution information of each stakeholder of the first subgroup of stakeholders.

In embodiments, the first responsible stakeholder is the same as the second responsible stakeholder, third responsible stakeholder, fourth responsible stakeholder and fifth responsible stakeholder.

In embodiments, the first responsible stakeholder is the same as at least one of the second responsible stakeholder, third responsible stakeholder, fourth responsible stakeholder and fifth responsible stakeholder.

In embodiments, the first responsible stakeholder is different than the second responsible stakeholder, the third responsible stakeholder, the fourth responsible stakeholder and fifth responsible stakeholder.

In embodiments, the first responsible stakeholder is different than at least one of the second responsible stakeholder, the third responsible stakeholder, the fourth responsible stakeholder and fifth responsible stakeholder.

In embodiments the first responsible stakeholder is the same as the second responsible stakeholder. In embodiments the first responsible stakeholder is different than the second stakeholder party. In embodiments, the first responsible stakeholder is the same as the third responsible stakeholder. In embodiments, the second responsible stakeholder is the same as the third responsible stakeholder. In embodiments, the first responsible stakeholder is different than the third responsible stakeholder. In embodiments, the second responsible stakeholder is different than the third responsible stakeholder. In embodiments, the first responsible stakeholder is the same as the fourth responsible stakeholder. In embodiments, the third responsible stakeholder is the same as the fourth responsible stakeholder. In embodiments, the second responsible stakeholder is the same as the third responsible stakeholder. In embodiments, the first responsible stakeholder is different than the fourth responsible stakeholder. In embodiments, the third responsible stakeholder is different than the fourth responsible stakeholder. In embodiments, the second responsible stakeholder is different than the third responsible stakeholder.

In embodiments, the first responsible stakeholder is the same as the fifth responsible stakeholder. In embodiments, the fourth responsible stakeholder is the same as the fifth responsible stakeholder. In embodiments, the third responsible stakeholder is the same as the fourth responsible stakeholder. In embodiments, the second responsible stakeholder is the same as the third responsible stakeholder. In embodiments, the first responsible stakeholder is different than the fifth responsible stakeholder. In embodiments, the fourth responsible stakeholder is different than the fifth responsible stakeholder. In embodiments, the third responsible stakeholder is different than the fourth responsible stakeholder. In embodiments, the second responsible stakeholder is different than the third responsible stakeholder.

In embodiments, the procurement information includes procurement responsibility information. In embodiments, the procurement information includes procurement terms information. In embodiments, the procurement information includes procurement conditions information. In embodiments, the procurement information includes procurement warranty information.

In embodiments, only the value of the material element category indicator of the scope ID is a non-zero value. In embodiments, only the values of the material element category indicator, the CSI division number, and the type designator of the scope ID have non-zero values.

In embodiments, the instance data item corresponds to a physical object included in the first building project.

In embodiments, the instance data item corresponds to a service required in the first building project.

In embodiments, the instance data item corresponds to a physical object and a service required in the first building project.

In embodiments, the database is a relational database.

In embodiments, instance data items of the same type have the same scope ID.

In embodiments, the first electronic building model is an industry foundation classes model.

In embodiments, the first electronic building model is a two dimensional model.

In embodiments, the first electronic building model is a three dimensional model.

In embodiments, a method of validating an updated electronic computer model of a first building project using an electronic building project administration computer system, the method including: (a) providing, one or more electronic building project databases, stored on non-volatile computer readable media operatively connected to the electronic building project administration computer system, comprising at least the following first data types associated with the first building project: (i) stakeholder information associated with each stakeholder of a first subgroup of stakeholders and a second subgroup of stakeholders of a plurality of stakeholders associated with the first building project; (ii) element data associated with each instance data item of a plurality of instance data items associated with the first building project, wherein the element data is provided by a first responsible stakeholder of the first subgroup of stakeholders or the second subgroup of stakeholders and includes first source information associated with the first responsible stakeholder and a first timestamp indicating when each item of the element data was provided to the one or more electronic building project databases; (iii) material data associated with each instance data item of the plurality of instance data items associated with the first building project, wherein the material data is provided by a second responsible stakeholder of the first subgroup of stakeholders or the second subgroup of stakeholders where the material data includes second source information associated with the second responsible stakeholder and a second timestamp indicating when the material data was provided to the one or more electronic building project databases; (iv) specification data associated with each instance data item of the plurality of instance data items associated with the first building project, wherein the specification data for each instance data item is provided by a third responsible stakeholder of the first subgroup of stakeholders or second subgroup of stakeholders and the specification data includes third source information associated with the third responsible stakeholder and a third timestamp indicating when the specification data was provided to the one or more electronic building project databases; (v) requirement data associated with contract documents related to each instance data item of the plurality of instance data item associated with the first building project, wherein the requirement data for each instance data item is provided by a fourth responsible stakeholder of the first subgroup of stakeholders or the second subgroup of stakeholders and the requirement data includes fourth source information associated with the fourth responsible stakeholder and a fourth timestamp indicating when the requirement data was provided to the one or more electronic building project databases; (vi) procurement data associated with procurement of each instance data item of the plurality of instance data items associated with the first building project, wherein the procurement data is provided by a fifth responsible stakeholder of the first subgroup of stakeholders or second subgroup of stakeholders and includes fifth source information associated with the fifth responsible stakeholder and a fifth timestamp indicating when the procurement data was provided to the one or more electronic building project databases; and (vii) the plurality of instance data items associated with the first building project, wherein the plurality of instance data items are provided by at least one responsible stakeholder of the first subgroup of stakeholders or second subgroup of stakeholders wherein each instance data item is linked to at least one of the element data, the specification data, the requirement data and the procurement data and each instance data item includes sixth source information associated with the at least one responsible stakeholder that provided the instance data item to the one or more electronic building project databases and a sixth time stamp indicating when the instance data item was added to the one or more electronic building project databases, where each instance data item is associated with a scope ID including a material element category indicator, a CSI division number, a material object category indicator, a scope designator, a type designator, a material object category indicator and a specification category number, where a value of the a scope ID including a material element category indicator, a CSI division number, a material object category indicator, a scope designator, a type designator, a material object category indicator and a specification category number depends on at least one of the element data, material data, specification data and procurement data; (viii) existence information including information associated with each existence object of a plurality of existence objects specified in an electronic computer model associated with the first building project; (b) receiving, by the electronic building project administration computer system, from a second at least one stakeholder from a third subgroup of stakeholders associated with the first building project, updated existence information, wherein the updated existence information is associated with at least on one of the existence objects included in the electronic computer model or a new existence object; (c) storing, by the electronic building project administration computer system, the updated existence information in the one or more electronic building project databases; (d) validating, by the electronic building administration computer system, the updated existence information including steps of: (i) comparing, by the electronic building administration system, existence information associated with the plurality of existence to the plurality of instance data items associated with the first building project to map each existence object to a corresponding instance data item and each existence object to a corresponding instance data item based at least on the scope ID; (ii) generating, by the electronic building administration system, an electronic alert signal when the an existence object is not mapped to a corresponding instance data item or when an instance data item is not mapped to a corresponding existence object; (iii) transmitting, by the electronic building administration system, the electronic alert signal to the second at least one stakeholder and the first and second subgroups of stakeholders; (e) receiving, by the electronic building administration system, updated information, including at least one of: (i) updated instance data item information; (ii) additional updated existence information; (f) repeating steps (d)-(e) until no alert is generated; (g) updating, by the electronic building administration system, the scope ID of each instance data item of the plurality of instance data items; (h) confirming, by the electronic building administration system, that the scope ID of each instance data item of the plurality of instance data items includes non-zero values for at least a material element category indicator, CSI divisional number, specification category number and scope designator; (g) generating, by the electronic building administration system, a certification query requesting certification of the instance data items and the existence objects when it is confirmed that each instance data item of the plurality of instance data items includes non-zero values for at least a material element category indicator, csi divisional number, specification category number and scope designator; (h) transmitting, by the electronic building administration system, the certification query to each stakeholder; (i) receiving, by the electronic building administration system, a certification message from each stakeholder; (j) storing, by the electronic building administration system, in an immutable form, the plurality of instance data items along with the respective scope id of each instance data item and existence information related to the existence objects.

In embodiments, the stakeholder information includes identity information related to an identity of each stakeholder of the first subgroup of stakeholders.

In embodiments, the stakeholder information includes role information related to a role of each stakeholder of the first subgroup of stakeholders in the first building project.

In embodiments, the stakeholder information includes interest information related to an interest of each stakeholder of the first subgroup of stakeholders in the first building project.

In embodiments, the stakeholder information includes professional information related to a profession of each stakeholder of the first subgroup of stakeholders.

In embodiments, the stakeholder information includes technical obligation information related to a technical obligation of each stakeholder of the first subgroup of stakeholders in the first building project.

In embodiments, the stakeholder information includes contribution information of each stakeholder of the first subgroup of stakeholders.

In embodiments, the first responsible stakeholder is the same as at least one of the second responsible stakeholder, the third responsible stakeholder, the fourth responsible stakeholder or the fifth responsible stakeholder.

In embodiments, the first responsible stakeholder is the same as the second responsible stakeholder, the third responsible stakeholder, the fourth responsible stakeholder or the fifth responsible stakeholder.

In embodiments, the first responsible stakeholder is different than at least one of the second responsible stakeholder, the third responsible stakeholder, the fourth responsible stakeholder or the fifth responsible stakeholder.

In embodiments, the first responsible stakeholder is different than the second responsible stakeholder, the third responsible stakeholder, the fourth responsible stakeholder or the fifth responsible stakeholder.

In embodiments, the procurement information includes: (1) procurement responsibility information indicating an individual responsible for procurement of each instance data item; (2) procurement terms information indicating permissible terms for procurement of each instance data item; (3) procurement conditions information indicating conditions under for each instance data item; (4) procurement warranties indicating any warranties associated with procurement of each instance data item.

In embodiments, the instance data item corresponds to a physical object included in the first building project.

In embodiments, the instance data item corresponds to a service required in the first building project.

In embodiments, the instance data item corresponds to a physical object and a service required in the first building project.

In embodiments, the updated existence information is received as input data provided via a stakeholder user device associated with the second at least one stakeholder.

In embodiments, the updated existence information is received in a first electronic computer model.

In embodiment, the first electronic computer model is a two dimensional model.

In embodiments, the first electronic computer model is a three dimensional model.

In embodiments, a method of updating a first building project using an electronic building project administration computer system, the method including: (a) providing, one or more electronic building project databases, stored on non-volatile computer readable media operatively connected to the electronic building project administration computer system, comprising at least the following first data types associated with the first building project: (i) stakeholder information associated with a first subgroup of stakeholders, a second subgroup of stakeholders and a third subgroup of stakeholders associated with the first building project, (ii) element data associated with each instance data item of a plurality of instance data items associated with the first building project, wherein the element data is provided by a first responsible stakeholder of the first subgroup of stakeholders, second subgroup of stakeholders or third subgroup of stakeholders and includes first source information associated with the first responsible stakeholder and a first timestamp indicating when the element data was provided to the one or more electronic building project databases; (iii) material data associated with each instance data item of the plurality of instance objects associated with the first building project, wherein the material data is provided by a second responsible stakeholder of the first subgroup of stakeholders, second subgroup of stakeholders or third subgroup of stakeholders and the material data includes second source information associated with the second responsible stakeholder and a second timestamp indicating when the material data was provided to the one or more electronic building project databases; (iv) specification data associated with each instance data item of the plurality of instance data items associated with the first building project, wherein the specification data for each instance data item is provided by a third responsible stakeholder of the first subgroup of stakeholders, second subgroup of stakeholders or third subgroup of stakeholders and the specification data includes third source information associated with the third responsible stakeholder and a third timestamp indicating when the specification data was provided to the one or more electronic building project databases; (v) requirement data associated with contract documents related to each instance data item of the plurality of instance data items associated with the first building project, wherein the requirement data for each instance data item is provided by a fourth responsible stakeholder of the first subgroup of stakeholders, second subgroup of stakeholders or third subgroup of stakeholders and the requirement data includes fourth source information associated with the fourth responsible stakeholder and a fourth timestamp indicating when the requirement data was provided to the one or more electronic building project databases; (vi) procurement data associated with each instance data item of the plurality of instance data items associated with the first building project, wherein the procurement data is provided by a fifth responsible stakeholder of the first subgroup of stakeholders, second subgroup of stakeholders or third subgroup of stakeholders and includes fifth source information associated with the fifth responsible stakeholder and a fifth timestamp indicating when the procurement data was provided to the one or more electronic building project databases; (vii) the plurality of instance data items associated with the first building project, wherein the plurality of instance data items are provided by at least one responsible stakeholder of the first subgroup of stakeholders, second subgroup of stakeholders or third subgroup of stakeholders wherein each instance data item is linked to one or more of the element data, the specification data, the requirement data and the procurement data and each instance data item includes sixth source information associated with the at least one responsible stakeholder that provided the instance data item to the one or more electronic building project databases and a sixth time stamp indicating when the instance data item was added to the one or more electronic building project databases; (viii) existence information including information associated with each existence object of a plurality of existence objects specified in an electronic computer model associated with the first building project; (b) receiving, by the electronic building project administration computer system, from a second at least one stakeholder from a fourth subgroup of stakeholders associated with the first building project, supply information associated with at least one instance data item; (c) validating, by the electronic building project administration computer system, the supply information corresponds to the at least one instance data item, including steps of: (i) confirming that the supply information corresponds to procurement information related to the at least one instance data item; (ii) generating, by the building project administration computer system, an electronic alert signal when the supply information does not correspond to the procurement information related to the at least one existence object; (iii) transmitting, by the building project administration computer system, the electronic alert signal, to the second at least one stakeholder and the fourth subgroup of stakeholders, the first subgroup of stakeholders, second subgroup of stakeholders, and third group of stakeholders; (d) receiving, by the building project administration computer system, additional information including at least one of: (i) updated instance data item information; (ii) updated good information; and (iii) updated procurement information related the at least one instance data item; (e) repeating steps (c)-(d) until no electronic alert signal is generated; (f) repeating steps (b)-(e) for each instance data item of the plurality of instance data items; (g) storing, by the building project administration computer system receiving, supply information related to each instance data item of the plurality of instance data items in the electronic building project databases; (h) receiving, by the electronic building administration system, a selection message from a third at least one stakeholder of the first subgroup of stakeholders, second subgroup of stakeholders or third subgroup of stakeholders, the selection message including a selection of respective supply information related to a respective instance data item; (i) generating, by the electronic building project administration computer system, a management bid, comprising at least the respective supply information related to the respective instance data item; (j) transmitting, by the electronic building project administration computer system, the management bid to an owner included in the first subgroup of stakeholders; (k) receiving, by the electronic building administration system, an acceptance message from the owner, the acceptance message indicating acceptance of the management bid; (l) storing, by the electronic building administration system, in an immutable form, the plurality of instance data items along with the respective scope id of each instance data item, existence objects and the management bid.

In embodiments, the stakeholder information includes identity information related to an identity of each stakeholder of the first subgroup of stakeholders.

In embodiments, the stakeholder information includes role information related to a role of each stakeholder of the first subgroup of stakeholders in the first building project.

In embodiments, the stakeholder information includes interest information related to an interest of each stakeholder of the first subgroup of stakeholders in the first building project.

In embodiments, the stakeholder information includes professional information related to a profession of each stakeholder of the first subgroup of stakeholders.

In embodiments, the stakeholder information includes technical obligation information related to a technical obligation of each stakeholder of the first subgroup of stakeholders in the first building project.

In embodiments, the stakeholder information includes contribution information of each stakeholder of the first subgroup of stakeholders.

In embodiments, the first responsible stakeholder is the same as at least one of the second responsible stakeholder, the third responsible stakeholder, the fourth responsible stakeholder or the sixth responsible stakeholder.

In embodiments, the first responsible stakeholder is the same as the second responsible stakeholder, the third responsible stakeholder, the fourth responsible stakeholder or the sixth responsible stakeholder.

In embodiments, the first responsible stakeholder is different than at least one of the second responsible stakeholder, the third responsible stakeholder, the fourth responsible stakeholder or the sixth responsible stakeholder.

In embodiments, the first responsible stakeholder is different than the second responsible stakeholder, the third responsible stakeholder, the fourth responsible stakeholder or the sixth responsible stakeholder.

In embodiments, procurement information includes: (1) procurement responsibility information indicating an individual responsible for procurement of each instance data item; (2) procurement terms information indicating permissible terms for procurement of each instance data item; (3) procurement conditions information indicating conditions under for each instance data item; (4) procurement warranties indicating any warranties associated with procurement of each instance data item.

In embodiments, the instance data item corresponds to a physical object included in the first building project.

In embodiments, the instance data item corresponds to a service required in the first building project.

In embodiments, the instance data item corresponds to a physical object and a service required in the first building project.

In embodiments, the good information comprises supplier information related to the good associated with the at least one instance data item.

In embodiments, the good information comprises a good price based on procurement information related to the at least one instance data item.

In embodiments, the good information comprises a service price base on procurement information related to the at least one instance data item.

In embodiments, the supply information comprises an item price and a service price based on procurement information related to the at least one instance data item.

In embodiments, the method may further include: (m) receiving, by the electronic building project administration computer system, from a third at least one stakeholder from the fourth subgroup of stakeholders associated with the first building project, additional supply information associated with at least one instance data item; (n) validating, by the electronic building project administration computer system, the additional supply information corresponds to the at least one instance data item, including steps of: (i) confirming that the additional supply information corresponds to procurement information related to the at least one instance data item; (ii) generating, by the building project administration computer system, an electronic alert signal when the additional supply information does not correspond to the procurement information related to the at least one existence object; (iii) transmitting, by the building project administration computer system, the electronic alert signal, to the second at least one stakeholder and the fourth subgroup of stakeholders, the first subgroup of stakeholders, second subgroup of stakeholders, and third group of stakeholders; (o) receiving, by the building project administration computer system, additional information including at least one of: (i) updated instance data item information; (ii) updated advanced good information; (iii) updated procurement information related the at least one instance data item; (p) repeating steps (c)-(d) until no electronic alert signal is generated; (q) repeating steps (b)-(e) for each instance data item of the plurality of instance data items; (r) storing, by the building project administration computer system receiving, additional supply information related to each instance data item of the plurality of instance data items in the electronic building project databases; (s) receiving, by the electronic building administration system, a second selection message from a third at least one stakeholder of the first subgroup of stakeholders, second subgroup of stakeholders or third subgroup of stakeholders, the second selection message including a selection of respective additional good information related to the respective instance data item; (t) generating, by the electronic building project administration computer system, a management bid, comprising at least the additional respective good information relate to the respective instance data item; (u) transmitting, by the electronic building project administration computer system, the management bid to an owner included in the first subgroup of stakeholders; (v) receiving, by the electronic building administration system, an acceptance message from the owner, the acceptance message indicating acceptance of the management bid; (w) storing, by the electronic building administration system, in an immutable form, the plurality of instance data items along with the respective scope id of each instance data item, existence objects and the management bid.

In embodiments, the supply information comprises supplier information.

In embodiments, the supply information comprises a product price based on procurement information related to the at least one instance data item.

In embodiments, the supply information comprises a service price based on procurement information related to the at least one data instance item.

In embodiments, the supply information comprises a product price and a service price based on procurement information related to the at least one instance data item.

In embodiments, a method of updating a first building project using an electronic building project administration computer system, the method including: (a) providing, one or more electronic building project databases, stored on non-volatile computer readable media operatively connected to the electronic building project administration computer system, comprising at least the following first data types associated with the first building project: (i) stakeholder information associated with a first subgroup of stakeholders, a second subgroup of stakeholders, a third subgroup of stakeholders and a fourth subgroup of stakeholders associated with the first building project; (ii) element data associated with each instance data item of a plurality of instance data items associated with the first building project, wherein the element data is provided by a first responsible stakeholder of the first subgroup of stakeholders, second subgroup of stakeholders, third subgroup of stakeholders or fourth subgroup of stakeholders and includes first source information associated with the first responsible stakeholder and a first timestamp indicating when the element data was provided to the one or more electronic building project databases; (iii) material data associated with each instance data item of the plurality of instance objects associated with the first building project, wherein the material data is provided by a second responsible stakeholder of the first subgroup of stakeholders, second subgroup of stakeholders, third subgroup of stakeholders or fourth subgroup of stakeholders and the material data includes second source information associated with the second responsible stakeholder and a second timestamp indicating when the material data was provided to the one or more electronic building project databases; (iv) specification data associated with each instance data item of the plurality of instance data items associated with the first building project, wherein the specification data for each instance data item is provided by a third responsible stakeholder of the first subgroup of stakeholders, second subgroup of stakeholders, third subgroup of stakeholders or fourth subgroup of stakeholders and the specification data includes third source information associated with the third responsible stakeholder and a third timestamp indicating when the specification data was provided to the one or more electronic building project databases; (v) requirement data associated with contract documents related to each instance data item of the plurality of instance data items associated with the first building project, wherein the requirement data for each instance data item is provided by a fourth responsible stakeholder of the first subgroup of stakeholders, second subgroup of stakeholders, third subgroup of stakeholders or fourth subgroup of stakeholders and the requirement data includes fourth source information associated with the fourth responsible stakeholder and a fourth timestamp indicating when the requirement data was provided to the one or more electronic building project databases; (vi) procurement data associated with procurement of each instance data item of the plurality of instance data items associated with the first building project, wherein the procurement data is provided by a fifth responsible stakeholder of the first subgroup of stakeholders, second subgroup of stakeholders, third subgroup of stakeholders or fourth subgroup of stakeholders and includes fifth source information associated with the fifth responsible stakeholder and a fifth timestamp indicating when the procurement data was provided to the one or more electronic building project databases; (vii) the plurality of instance data items associated with the first building project, wherein the plurality of instance data items are provided by at least one responsible stakeholder of the first subgroup of stakeholders, second subgroup of stakeholders, third subgroup of stakeholders or fourth subgroup of stakeholders wherein each instance data item is linked to one or more of the element data, the specification data, the requirement data and the procurement data and each instance data item includes sixth source information associated with the at least one responsible stakeholder that provided the instance data item to the one or more electronic building project databases and a sixth time stamp indicating when the instance data item was added to the one or more electronic building project databases; (viii) existence information including information associated with each existence object of a plurality of existence objects specified in an electronic computer model associated with the first building project; (ix) good information related to each instance data item of the plurality of instance data item; (x) management bid information related to each instance data item of the plurality of instance data items; (b) receiving, by the electronic building project administration computer system, from a second at least one stakeholder from a fifth subgroup of stakeholders associated with the first building project, a request for payment associated with at least one instance data item; (c) validating, by the electronic building project administration computer system, the invoice information for payment, including steps of: (i) matching, by the electronic building project administration computer system, the invoice information to the at least one instance data item based on at least the scope ID; and (ii) determining, by the electronic building project administration computer system, an amount of work completed based on at least presence or absence of a corresponding existence item in a building associated with the first building project; (iii) generating, by the building project administration computer system, a percentage value indicative of the amount of work done; (iv) transmitting, by the building project administration computer system, the percentage value to a managing stakeholder responsible for the at least one instance data item; (d) receiving, by the building project administration computer system, payment instructions from the managing stakeholder responsible for the at least one instance data authorizing payment; (e) executing, by the electronic building administration system, the payment instructions; (f) receiving, by the electronic building administration system, receipt information confirming receipt of payment; (g) generating, by the electronic building administration system, a certification query requesting certification of the instance data items, the existence objects, request for payment, percentage value and receipt information; (h) transmitting, by the electronic building administration system, the certification query to each stakeholder; (i) receiving, by the electronic building administration system, a certification message from each stakeholder; (j) storing, by the electronic building administration system, in an immutable form, the plurality of instance data items along with the respective scope id of each instance data item and existence information related to the existence objects as well as the request for payment, percentage value and receipt information related thereto.

In embodiments, the one or more electronic building project databases are relational databases.

In embodiments, the stakeholder information comprises identity information related to an identity of each stakeholder.

In embodiments, the stakeholder information includes role information related to a role of each stakeholder in the first building project.

In embodiments, the stakeholder information includes interest information related to an interest of each stakeholder in the first building project.

In embodiments, the stakeholder information includes professional information related to a profession of each stakeholder.

In embodiments, the stakeholder information includes technical obligation information related to a technical obligation of each stakeholder.

In embodiments, the stakeholder information includes contribution information of each stakeholder.

In embodiments, the first responsible stakeholder is the same as at least one of the second responsible stakeholder, the third responsible stakeholder, the fourth responsible stakeholder or the fifth responsible stakeholder.

In embodiments, the first responsible stakeholder is the same as the second responsible stakeholder, the third responsible stakeholder, the fourth responsible stakeholder or the fifth responsible stakeholder.

In embodiments, the first responsible stakeholder is different than at least one of the second responsible stakeholder, the third responsible stakeholder, the fourth responsible stakeholder or the fifth responsible stakeholder.

In embodiments, wherein the first responsible stakeholder is different than the second responsible stakeholder, the third responsible stakeholder, the fourth responsible stakeholder or the fifth responsible stakeholder.

In embodiments, procurement information includes: (1) procurement responsibility information indicating an individual responsible for procurement of each instance data item; (2) procurement terms information indicating permissible terms for procurement of each instance data item; (3) procurement conditions information indicating conditions under for each instance data item; (4) procurement warranties indicating any warranties associated with procurement of each instance data item.

In embodiments, the instance data item corresponds to a physical object included in the first building project.

In embodiments, the instance data item corresponds to a service required in the first building project.

In embodiments, the instance data item corresponds to a physical object and a service required in the first building project.

In embodiments, the step of determine an amount of work completed is based on information provided by one or more stakeholders of the first subgroup of stakeholders, the second subgroup of stakeholders, the third subgroup of stakeholders or the further subgroup of stakeholders.

In embodiments, the step of determine an amount of work completed is based on information provided by one or more sensors positioned in the building associated with the first building project.

In embodiments, each sensor of the one or more sensors is associated with a scope ID.

In embodiments, a method of updating a first building project using an electronic building project administration computer system, the method including: (a) providing, one or more electronic building project databases, stored on non-volatile computer readable media operatively connected to the electronic building project administration computer system, comprising at least the following first data types associated with the first building project: (i) stakeholder information associated with a first subgroup of stakeholders, a second subgroup of stakeholders, a third subgroup of stakeholders, fourth subgroup of stakeholders or fifth group of shareholders associated with the first building project; (ii) element data associated with each instance data item of a plurality of instance data items associated with the first building project, wherein the element data is provided by a first responsible stakeholder of the first subgroup of stakeholders, second subgroup of stakeholders, third subgroup of stakeholders, fourth subgroup of stakeholders or fifth group of shareholders and includes first source information associated with the first responsible stakeholder and a first timestamp indicating when the element data was provided to the one or more electronic building project databases; (iii) material data associated with each instance data item of the plurality of instance objects associated with the first building project, wherein the material data is provided by a second responsible stakeholder of the first subgroup of stakeholders, second subgroup of stakeholders, third subgroup of stakeholders, fourth subgroup of stakeholders or fifth group of shareholders and the material data includes second source information associated with the second responsible stakeholder and a second timestamp indicating when the material data was provided to the one or more electronic building project databases; (iv) specification data associated with each instance data item of the plurality of instance data items associated with the first building project, wherein the specification data for each instance data item is provided by a third responsible stakeholder of the first subgroup of stakeholders, second subgroup of stakeholders, third subgroup of stakeholders, fourth subgroup of stakeholders or fifth group of shareholders and the specification data includes third source information associated with the third responsible stakeholder and a third timestamp indicating when the specification data was provided to the one or more electronic building project databases; (v) requirement data associated with contract documents related to each instance data item of the plurality of instance data items associated with the first building project, wherein the requirement data for each instance data item is provided by a fourth responsible stakeholder of the first subgroup of stakeholders, second subgroup of stakeholders, third subgroup of stakeholders, fourth subgroup of stakeholders or fifth group of shareholders and the requirement data includes fourth source information associated with the fourth responsible stakeholder and a fourth timestamp indicating when the requirement data was provided to the one or more electronic building project databases; (vi) procurement data associated with each instance data item of the plurality of instance data items associated with the first building project, wherein the procurement data is provided by a fifth responsible stakeholder of the first subgroup of stakeholders, second subgroup of stakeholders, third subgroup of stakeholders, fourth subgroup of stakeholders or fifth group of shareholders and includes fifth source information associated with the fifth responsible stakeholder and a fifth timestamp indicating when the procurement data was provided to the one or more electronic building project databases; (vii) the plurality of instance data items associated with the first building project, wherein the plurality of instance data items are provided by at least one responsible stakeholder of the first subgroup of stakeholders, second subgroup of stakeholders, third subgroup of stakeholders, fourth subgroup or fifth group of shareholders of stakeholders wherein each instance data item is linked to one or more of the element data, the specification data, the requirement data and the procurement data and each instance data item includes sixth source information associated with the at least one responsible stakeholder that provided the instance data item to the one or more electronic building project databases and a sixth time stamp indicating when the instance data item was added to the one or more electronic building project databases; (viii) existence information including information associated with each existence object of a plurality of existence objects specified in an electronic computer model associated with the first building project; (b) receiving, by the electronic building project administration computer system, from a second at least one stakeholder from a sixth subgroup of stakeholders associated with the first building project, a service request associated with at least one instance data item; (c) validating, by the electronic building project administration computer system, the service request, including steps of: (i) matching, by the electronic building project administration computer system, the service request to the at least one instance data item based on at least the scope ID; and (ii) generating, by the building project administration computer system, an electronic alert signal when the service request does not match with a respective instance data item; and (iii) transmitting, by the building project administration computer system, the electronic alert signal, to the second at least one stakeholder and the first subgroup of stakeholders, second subgroup of stakeholders, third group of stakeholders, fourth subgroup of stakeholders and fifth group of stakeholders; (d) receiving, by the building project administration computer system, additional information including at least one of: (i) updated instance data item information; and (ii) service request information; (e) repeating steps (c)-(d) until no electronic alert signal is generated; (f) generating, by the electronic building administration system, service instructions related to the invoice information; (g) executing, by the electronic building administration system, the service instructions; (h) receiving, by the electronic building administration system, service receipt information confirming performance of service; (i) generating, by the electronic building administration system, a certification query requesting certification of the instance data items, the existence objects, service request information, and service receipt information; (j) transmitting, by the electronic building administration system, the certification query to each stakeholder; (k) receiving, by the electronic building administration system, a certification message from each stakeholder; (l) storing, by the electronic building administration system, in an immutable form, the plurality of instance data items along with the respective scope id of each instance data item and existence information related to the existence objects as well as the service request information and service receipt information.

In embodiments, the one or more electronic building project databases are relational databases.

In embodiments, the stakeholder information comprises stakeholder information includes identity information related to an identity of each stakeholder of the first subgroup of stakeholders.

In embodiments, the stakeholder information includes role information related to a role of each stakeholder of the first subgroup of stakeholders in the first building project.

In embodiments, the stakeholder information includes interest information related to an interest of each stakeholder of the first subgroup of stakeholders in the first building project.

In embodiments, the stakeholder information includes professional information related to a profession of each stakeholder of the first subgroup of stakeholders.

In embodiments, the stakeholder information includes technical obligation information related to a technical obligation of each stakeholder of the first subgroup of stakeholders in the first building project.

In embodiments, the stakeholder information includes contribution information of each stakeholder of the first subgroup of stakeholders.

In embodiments, the first responsible stakeholder is the same as at least one of the second responsible stakeholder, the third responsible stakeholder, the fourth responsible stakeholder or the sixth responsible stakeholder.

In embodiments, the first responsible stakeholder is the same as the second responsible stakeholder, the third responsible stakeholder, the fourth responsible stakeholder or the fifth responsible stakeholder.

In embodiments, the first responsible stakeholder is different than at least one of the second responsible stakeholder, the third responsible stakeholder, the fourth responsible stakeholder or the fifth responsible stakeholder.

In embodiments, the first responsible stakeholder is different than the second responsible stakeholder, the third responsible stakeholder, the fourth responsible stakeholder or the fifth responsible stakeholder.

In embodiments, procurement information includes: (i) procurement responsibility information indicating an individual responsible for procurement of each instance data item; (ii) procurement terms information indicating permissible terms for procurement of each instance data item; (iii) procurement conditions information indicating conditions under for each instance data item; (iv) procurement warranties indicating any warranties associated with procurement of each instance data item.

In embodiments, the instance data item corresponds to a physical object included in the first building project.

In embodiments, the instance data item corresponds to a service required in the first building project.

In embodiments, the instance data item corresponds to a physical object and a service required in the first building project.

In embodiments, the sixth subgroup of stakeholders comprises users residents of the building based on the first building project.

In embodiments, the sixth subgroup of stakeholders comprises employees of the building based on the first building project.

In embodiments, the service request is generated one or more sensors provided in the building based on the first building project.

BRIEF DESCRIPTION OF THE DRAWINGS

Exemplary embodiments of the present invention will be described with references to the accompanying figures, wherein:

FIG. 3D is an exemplary representation of the level of development (LOD) completion requirements associated with each LOD level (1-6) used by the electronic building project administration computer system in accordance with exemplary embodiments of the present invention.

DETAILED DESCRIPTION

The present invention generally relates to computer systems, methods, and programmed products used in administering, managing and/or mitigating escalation risk in building projects.

Figure 1:
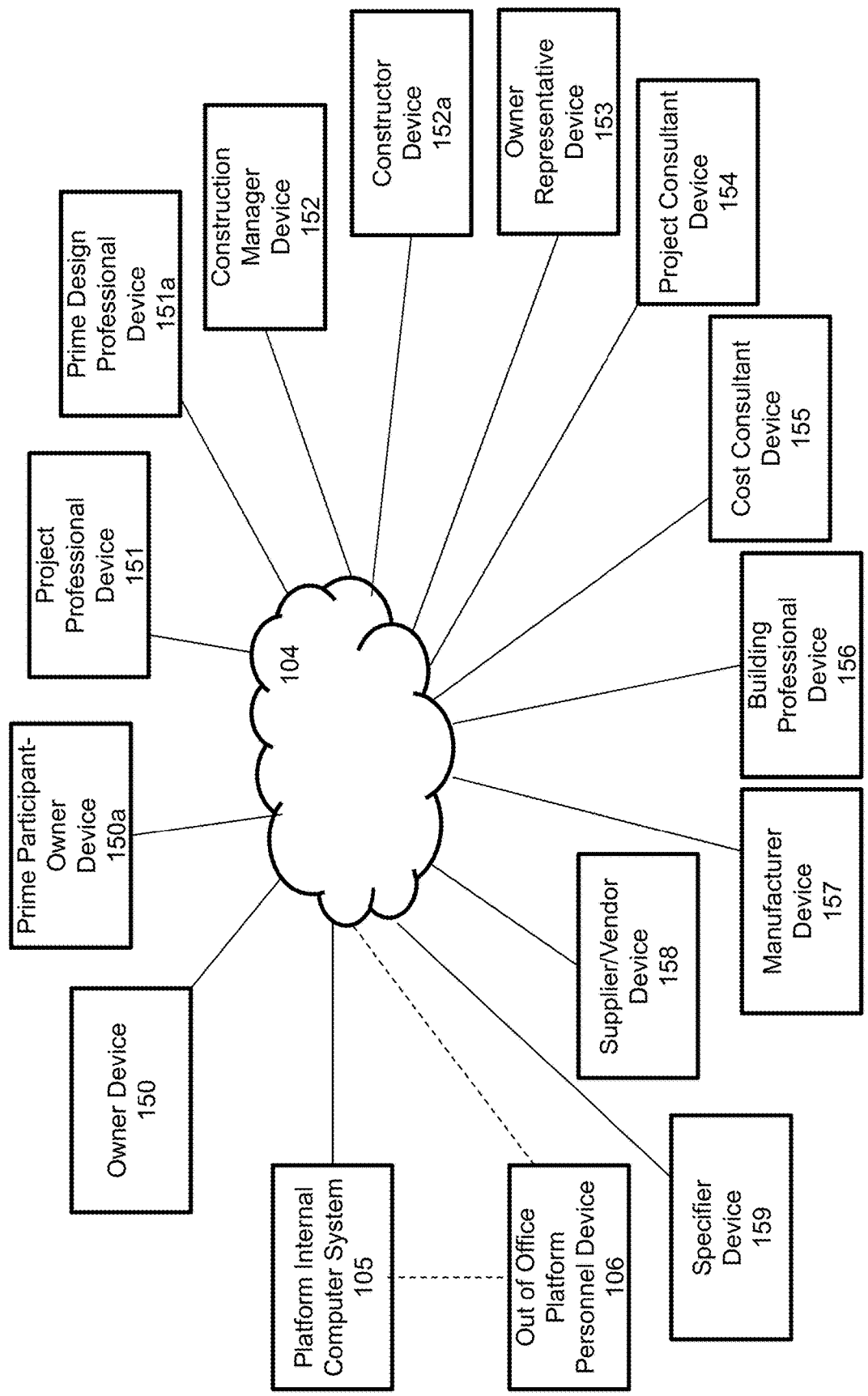
FIG. 1 is a schematic diagram of computer systems and devices involved in the building project administration system in accordance with exemplary embodiments of the present invention.

FIG. 1 is a schematic diagram illustrating a plurality of computer systems or computer devices associated with a plural of participants or stakeholders associated with a building project which may communicate with each other and an electronic building project administration computer system 200 (see FIG. 2A, for example), which may include platform internal computer system 105. The participant computer systems or devices (e.g., user devices such as computers and mobile devices, to name a few) involved in the building project in accordance with an exemplary embodiment of the present invention. The participant device may communicate via a network, such as the Internet 104, for example, both with each other and the electronic building project administration computer system 200.

As indicated in FIG. 1, a building project administration system in accordance with the present invention may include a variety of different computer systems or devices. While in FIG. 1 each type of participant (stakeholder) is illustrated as a single computer, it will be understood by those of skill in the art, that each participant type may include more than one participant and one or more computer systems or devices may be used to implement the described computing operation. In embodiments, the one or more participants may use the same or different computer systems or devices to implement the described computing operations of the system.

In embodiments, the electronic building administration computer system 200, may include or be in communication with, by way of example, user devices, including, e.g. owner device 150, prime participant-owner device 150a, project professional device 151, prime design professional device 151a, construction manager device 152, constructor device 152a, owner representative device 153, project consultant device 154, cost consultant device 155, building professional device 156, manufacturer device 157, supplier/vendor device 158, specifier device 159, to name a few. These participant devices may be collectively referred to as "stakeholder devices."

In embodiments, the electronic building administration computer system 200 may also include, by way of example, platform internal computer system 105 and out of office platform personnel device 106. In embodiments, stakeholder devices may interface directly with the electronic building administration computer system 200 through a network 104, such as a local area network, wide area network, the Internet, private cloud, public cloud, and/or a combination thereof. In embodiments, stakeholders may interact through use of the same single device such as a desktop terminal.

In embodiments, network 104 may represent a multi-tenant infrastructure where any stakeholder can fulfill his or her computing needs and where automated and scheduled computational tasks of the electronic building project administrative computer system 200 may occur.

In embodiments, the network 104 represents a communication network dedicated to the computing needs of a single tenant or for the sole use of an organization, including but not limited to government entities. In embodiments, such a private network 104 may be preferred to public network for security reasons.

In embodiments, network 104 may be implemented from within a cloud computing service provider's infrastructure. Exemplary cloud computing service providers include Amazon Web Services™ (AWS) and Microsoft Azure®, to name a few.

As illustrated, each computer system may be connected directly or indirectly through one or more network 104, such as the Internet, a local area network, wide area network, a mesh network, and/or telephone network, to name a few. As noted above, participant computer systems may include a single device or computer system or multiple devices, computers or servers. In embodiments, a computer or server may be implemented using an the Internet and/or a cloud computing system, to name a few. In embodiments, some participant computer systems may include multiple devices or computers or servers while others may include a single device such as a desktop. Generally, each stakeholder will have his or her own authorization credentials to insure proper tracking of actions taken with the system.

In embodiments, stakeholder devices interact with the platform internal computer system 105 of the computer system 200 through network 104. Exemplary devices to be used by the stakeholders include a computer system (such as a desktop or laptop computer, to name a few), a mobile phone or smart phone (such as an iPhone or Android device, to name a few), a tablet (such as an iPad or Surface device, to name a few), or other personal or business devices, to name a few, which electronically interacts through the network 104 with the platform internal computer system 105 of the computer system 200.

In embodiments, in addition to interactions with stakeholder devices, data transmitted from one or more sensors (not shown) related to materials being used in or conditions occurring at a building project, may also interact with the network 104. For example, one or more sensors affixed to elements during construction may be used to detect plumbness, vibration, settlement, temperature, and moisture content, and presence in the building, to name a few. In embodiments, data from these sensors, or in other embodiments, data resulting from sensor interaction, may be transmitted directly or indirectly via the network 104. In embodiments, transmissions from sensors may be accomplished via WiFi signals to local WiFi hubs then to the Internet or via cellular signal to the Internet or via any current or future protocol that directly or indirectly enables transmission to the Internet, to name a few. In embodiments, sensors may have direct or indirect physical connections to the internet, such as Ethernet, telephone, or proprietary hardwiring into facilities, to name a few, which in turn transmute signals into Internet-friendly signals and enable connectivity to network 104.

The sensor interaction may include, for example, data from an advanced optical monitoring system built around a high-precision robotic total station that provides automated monitoring of deformation and settlement in structures and excavation support systems, also referred to as an automated total station (AMTS).

In embodiments, platform internal computer system 105 may continuously assesses the risk to a building project based on interactions from stakeholder devices, data transmitted from sensors, as well as project-related communications, actions, inactions and the potential impact of relevant externalities, to name a few. Project-related communications may be provided from e.g. communications between different stakeholders via stakeholder devices, for example, to name a few. In embodiments, these communications may be tracked and recorded to ensure that all changes and alterations to the project are made of record. Data related to actions and inactions may be derived from e.g. communications between the stakeholder devices, as well as information input into and output from the various modules illustrated in FIG. 2A or stakeholders, to name a few.

As illustrated in FIG. 1, in embodiments, the stakeholder devices interact through network 104.

In embodiments, building project web sites may also be included that may provide an interface for stakeholder devices to interact with electronic building project administration computer system 200. Components of the building project web site may include various servers such as one or more authentication servers, storage servers, process servers, platform staging environment servers, platform development environment servers, other application servers, to name a few.

In embodiments, platform internal computer system 105 of the computer system 200 may contain or be connected to one or more electronic building project databases, stored on non-volatile computer readable media. In FIG. 2B, the one or more electronic building project databases are represented by building project platform database 2B1. In embodiments, the database 2B1 may be a relational database that contains identifiers with the data elements. In embodiments, the database 2B1 may be a hierarchal database configured to link the identifiers to each other. In embodiments the database 2B1 may be one or more databases.

Figure 2A:
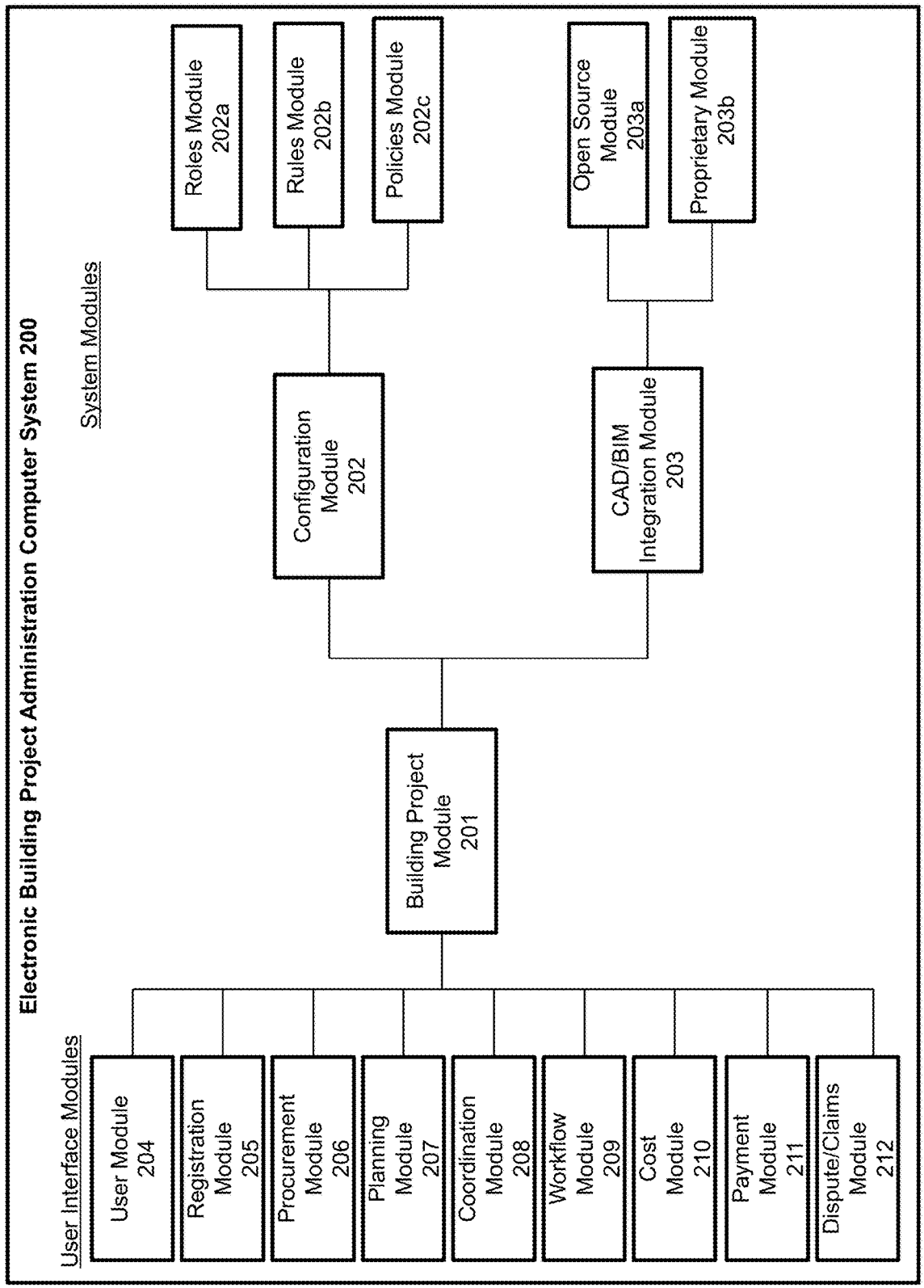
FIG. 2A is a schematic diagram the electronic building project administration computer system 200 in accordance with embodiments of the present invention.
Figure 2B:
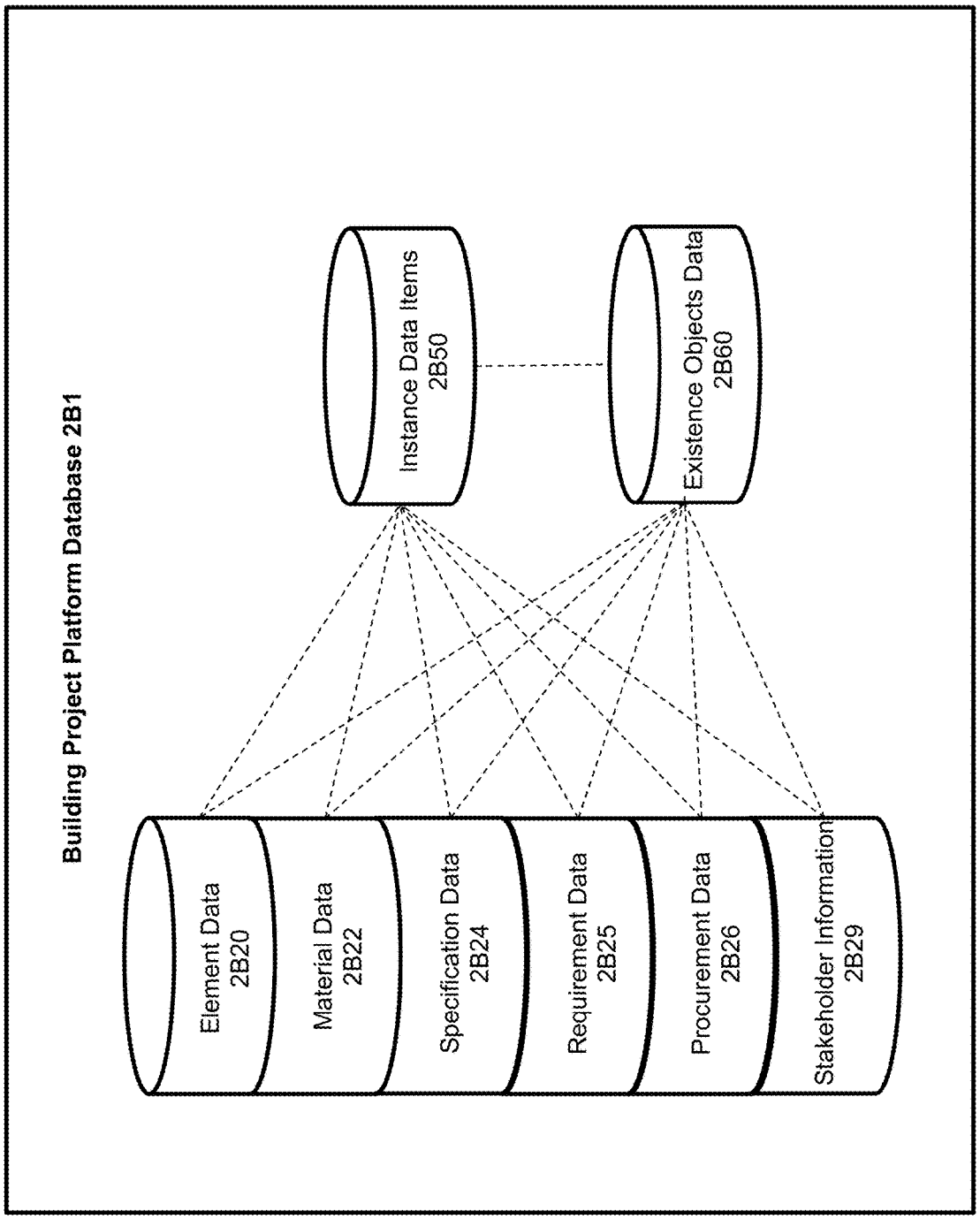
FIG. 2B is a schematic representation of one or more building project databases that may be used by the building project administration computer system in accordance with exemplary embodiments of the present invention.

FIG. 2A is a schematic diagram of the electronic building project administration computer system 200 in accordance with embodiments of the present invention.

Turning to FIG. 2A, generally, building project module 201 may include and/or be operatively connected to both system modules and user interface modules (stakeholder interfaces). In embodiments, stakeholders may function within the electronic building project administration computer system 200 as avatars or virtual embodiments of their respective roles relative to building project module 201. In embodiments, configuration module 202 may configures a virtual environment for each stakeholder inclusive of governance, workflow, and knowledge capture specific to their respective domain. In embodiments, stakeholders may perform their roles within a controlled and structured environment where stakeholders exchange knowledge, data and develop new shared knowledge, to develop the complete scope of the building project associated with building project module 201. In embodiments, the electronic building project administration computer system 200 may utilize artificial intelligence, which may be developed based on prior activity occurring in this and/or other building projects to detect risks early and intervene as necessary to manage and/or mitigate the risk detected. In embodiments, the electronic building project administration computer system 200 may use program logic and analytics on a continuous even-driven basis where an event is an input from any source or any specified, authorized source, or the passage of time to monitor and predict probable risks associated with each stakeholder's practices, workflow, data inputs and contributions to the building project administration process.

In embodiments, the electronic building project administration computer system 200 may electronically reassesses risk based on inputs from the stakeholders and displays real-time status of a building project and the elements, materials, design, specifications, requirements and procurements in the building project database.

In embodiments, stakeholders (such as those shown in FIG. 1), exchange knowledge, data, and develop new shared knowledge regarding the scope of building project via the electronic building project administration computer system 200. Typically, collaboration and data sharing platforms in the architecture, engineering, and construction industry create the possibility for inappropriate liability exposures. For example, contractors may find themselves responsible for design errors, and an architect or engineer may be liable for implying inappropriate means and methods of implementation, to name a few. The present invention seeks to overcome and/or mitigate such risks though technological solutions that limit and/or eliminate such events from happening, and/or provides technological mechanism to detect when the risk of such events occur. In embodiments, as a condition of their participating in building project 201, stakeholders cannot customize or otherwise alter user interfaces and system modules; nor can they perform a role they are not assigned, or carry out an act not associated with their role and discipline. Thereby, the present invention mitigates the risk and limits the exposures to stakeholders of the additional professional liability and commercial risk typically inherent to user-configured collaborative project information sharing platforms and CAD/BIM authoring software in a collaborative environment, which conventional systems are unable to obtain.

In embodiments, CAD/BIM integration module 203 and configuration module 202 may capture inputs from 2D and 3D models and intelligently correlate the object with the data in building project platform database 2B1 shown in FIG. 2B. In embodiments, the inputs are captured from 2D and 3D models using interface models which integrate with CAD/BIM systems and transmit information to CAD/BIM integration module 203 or user uploads of CAD/BIM native files to CAD/BIM integration module 203 which is unpacked and translated into data internal format, to name a few.

Turning back to FIG. 2A, system modules function to integrate information provided for the building project, for example, by stakeholder devices into the electronic building project administration computer system 200. In embodiments, configuration module 202 comprises modules for roles 202a, rules 202b, and policies 202c, to name a few.

In embodiments, the roles module 202a may be configured based on the respective role of stakeholders in a typical building project, such as those in FIG. 1, to name a few. For example, as illustrated in FIG. 2A, each stakeholder category may have one or more user interface modules 204 associated with the proper scope of such stakeholder's activities (and in embodiments, access credentials). For example, an owner user interface (see, e.g., FIG. 5B) may include overlapping and/or different operations from a Manager's user interface (see, e.g., FIG. 5C) or from an owner's representative user interface (see, e.g., FIG. 5D). Thus, the roles module may be configured to define the roles of individual stakeholders and provide role information related thereto. In embodiments, the roles modules 202a may limit the time of data and other information that the relevant stakeholder may provide the system through the respective stakeholders' user interface 204. In embodiments, access to such role modules may be strictly limited and tracked using user credentials.

The rules module 202b may be configured to apply executive rules specific to each stakeholder's legal, commercial, and/or professional obligations and practices. In embodiments, the rules module 202b may also be configured to implement project workflow and create information reflective thereof based on the executive rules. Thus, the rules module may be configured to apply specific rules to each stakeholder (and/or stakeholder category) to govern their interaction with the electronic building project administration computer system 200.

In embodiments, the policies module 202c may be configured to define, apply and enforce compliance with applicable administrative laws, regulatory requirements, and/or corporate or institutional policies, to name a few. In embodiments, the constraints applied by the system to conform the data to be in compliance with applicable administrative laws, regulatory requirements, and/or corporate or institutional policies may be imported through a limited access user interface and/or structured database, to name a few. Such information may be considered requirements data. For example, in embodiments, an ingestion engine may identify the schema of incoming data and then parses the data according to the schema. If the schema cannot be identified with complete certainty, the application may attempt an artificial intelligence and/or a heuristics-based "best fit" identification of various data fields. In embodiments, the resulting mapping must be presented to a human playing the appropriate role for the adjudication of the correctness of the parsing. In embodiments, once the data is parsed, it may be converted to the canonical superset schema of the system. In embodiments, any two fully-accepted records within the system are in the same schema/format and can therefore be directly compared field-for-field, while an external record or entered data must be parsed, validated, and converted to the system format prior to comparison.

In embodiments, the stakeholder devices that interact on building project 201 correspond to the stakeholder devices shown in FIG. 1. Numerous stakeholders may interact as needed on building project 201. In embodiments, owner stakeholder device 150 and prime participant-owner stakeholder device 150a will commence building project 201. Other stakeholders, through their stakeholder devices, such as prime design professional stakeholder device 151a, construction manager stakeholder device 152, constructor stakeholder device 152a, owner representative stakeholder device 153, project consultant stakeholder device 154, cost consultant stakeholder device 155, building professional stakeholder device 156, manufacturer stakeholder device 157, supplier/vendor device 158, to name a few, as needed, may interact with each other and may provide information to the system 200. These stakeholders may be considered part of a first subgroup of stakeholders that provide basic information about the building project. Each stakeholder may have one or more corresponding stakeholder devices, and corresponding stakeholder credentials that are used by the system to identify who and when each stakeholder interacts with the system. In embodiments, each authorized user of each stakeholder device may be required to have separate stakeholder credentials which will define the activities and information that such user may be authorized and/or allowed to access, update, modify, and/or remove from the system.

In embodiments, the CAD/BIM Integration module 203 conducts building information modeling ("BIM") or may be used to receive electronic computer model information used to incorporate into the building project 201 elements data, materials data, specification data, requirements data, procurement data, and stakeholder data, to name a few, supplied by one or more building project stakeholders. CAD/BIM integration module 203 in combination with configuration module 202 normalizes data being incorporated into building project 201. CAD/BIM integration module 203 assesses data inputs regarding existences in the 2D and 3D models for scope, risk, and change then assesses the inputs received for lapses in coordination, omissions, design oversights, errors, and/or other risks, to name a few. In embodiments, the CAD/BIM integration module 203 may extract elements data, materials data, and specification data based on the input CAD models and may also generate or process procurement data associated with the elements data, materials data, and specification data. The CAD/BIM integration module 203 may also extract or accept stakeholder data provided by the stakeholders as well as sensors regarding existences in the models. In embodiments, one or more of the stakeholders may provide the CAD information and/or the BIM information.

Each module may interact with the one or more building project platform database(s) 2B1, shown in FIG. 2B, in a manner that restricts the types of data to an acceptable format based on restraints on the data that the stakeholders can enter and previously entered data.

In embodiments, CAD/BIM integration module 203 may operate using either open source module 203a software such as BIMserver™ by BIMserver.org, to name a few, or proprietary software module 203b such as Microstation® and BentleyBIM® by Bentley Systems, Inc., to name a few.

In embodiments, user interface modules 204-212 enable the stakeholders to interact with the electronic building project administration computer system 200 in various ways and interoperate with other user interface modules and system modules. In embodiments, user interface modules include user registration module 204; project registration module 205; procurement module 206; planning module 207; coordination module 208; workflow module 209; cost module 210; payment module 211, and disputes/claims module 212, to name a few. In embodiments, additional user interface modules may be provided or added as desired. In embodiments, each module may be configured to reflect the proper scope of access of the relevant stakeholder using the stakeholder credentials, the stakeholder role, and/or other information as may be stored in the roles module 202a, rules module 202b and/or policies module 202c and/or configured by the configuration module 202. In embodiments, such configuration may be hard coded into the modules.

In embodiments, the user registration module 204 allows new users to create a secure profile, username, and password log-in credentials. In embodiments, new users provide profile information as well as their username and password via one more input devices included in or associated with the user registration module 204. In embodiments, this information may be manually provided via a keyboard, mouse, voice recognition, optical recognition, touch screen, or other input element, to name a few. In embodiments, profile information and username and password information may be transmitted either by a wired or wireless connection, to name a few.

In embodiments, the project registration module 205 allows owner device 150, shown in FIG. 1, to submit information regarding a building project for eligibility review and acceptance of building project 201.

In embodiments, the procurement module 206 allows owner device 150, shown in FIG. 1, to qualify, solicit, and engage the services of other stakeholders to participate in building project 201, and to qualify sources, terms, and pricing for elements and materials incorporated into the design and specifications. In embodiments, the procurement module 206 tracks all elements and materials data throughout the process until delivery and provides procurement information.

In embodiments, planning module 207 structures and manages validated non-volatile data such as due diligence reports, survey data, determinations, and relevant use and design parameters, to name a few, for the purpose of managing risk related to the building project 201.

In embodiments, the coordination module 208 administers knowledge exchange and technical contributions of project professional device 151, project consultant device 154, building professional device 156, manufacturer device 157, and supplier/vendor device 258, shown in FIG. 1, to name a few, regarding the scope, performance, and/or development of the design of the building project 201.

In embodiments, the workflow module 209 administers and monitors the workflow of stakeholders as they participate in the building project 201.

In embodiments, the cost module 210 enables cost consultant device 155, shown in FIG. 1, to name a few, to model and analyze the cost of construction for the design and proposed changes thereto, and audit and model the cost of proposed changes during construction of building project 201.

In embodiments, payment module 211 administers the remittance of payments to building professional device 156, manufacturer device 157, and supplier/vendor device 158, shown in FIG. 1, to name a few.

In embodiments, the payment module 211 may track invoices and requests for payment received from building professional device 156, manufacturer device 157, and/or supplier/vendor device 158, shown in FIG. 1, and confirm payments made. In embodiments, the payment module 211 may also generate and transmit instructions to pay invoices to a bank or other financial institution, for example to initiate payments, to name a few. In embodiments, the payment module may also confirm that that the materials, work, or other services that are reflected in the invoices have been completed prior to instructing payment of an invoice.

In embodiment, a disputes/claims module 212 administers and resolves project participant disputes or claims related to building project 201. In embodiments, the disputes/claims module 212 may receive and record information including all necessary details regarding any disputes that may arise or any claims made by building professional device 156, manufacturer device 157, and suppliers/vendors 158, shown in FIG. 1, to name a few. In embodiments, the details may include identification of the project, the party initiating the dispute/claim, the basis of the dispute/claim, to name a few. In embodiments, this dispute/claim information may be stored in an immutable (i.e., difficult to manipulate) format to ensure that proper records are maintained for future reference. In embodiments, the disputes/claims module 212 may also process the dispute information and provide an indication of the validity of the dispute or claim. For example, the disputes/claims module 212 may process the dispute/claim information and determine validity of the claim or dispute based on the available information, to name a few. In embodiments, the disputes/claims module 212 may also suggest or direct a solution to the dispute as well. For example, where the dispute is with respect to an unpaid invoice, the dispute/claim information indicates that the invoiced work was performed in accordance with preexisting agreements, and where the work was accepted or approved, the module may determine that the invoice should be paid and either recommend or instruct full or partial payment. Similarly, if the disputes/claims module 212 determines that the work performed was within the scope of previously approved and paid for work, it may instruct that no further payment is necessary.

In embodiments, each of the user interface modules and system modules may have its own components and subcomponents and are interoperable.

In embodiments, electronic building project administration computer system 200 may be scalable to provide for business growth and system expansion and sophistication.

FIG. 2B is a schematic of the building project platform database 2B1 structure in accordance with embodiments of the present invention.

As illustrated, in embodiments, the building project platform database 2B1 is part of platform internal computer system 105, and electronic building administration computer system 200 accesses and stores information in this building project platform database 2B1. While illustrated as part of the platform internal computer system 105, the building project platform database 2B1 may be located remote from the internal computer system 105 but connected thereto.

In embodiments, one or more building project database 2B1 is provided and stores, stores on non-volatile computer readable media: (i) element data 2B20 associated with an element which is used in a building project (e.g., substructure, superstructure, thermal moisture envelope, sub-infrastructure, and interior, to name a few); (ii) material data 2B22 associated with materials of which elements used in the building project are made (e.g., concrete, metal, glass, wood, and polymers to name a few); (iii) specification data 2B24 associated with the elements and materials used in a typical building project (e.g., concrete mix, structural steel, doors and hardware, exterior and interior finishes, to name a few); (iv) requirement data 2B25 associated with contract documents (or other requirements such as regulatory legal requirements) used in a typical building project (e.g., Minority Business Enterprise ("MBE")/Woman Business Enterprise ("WBE") procurement policies, a site safety plan, and implementation of water recovery practices and other sustainability practices, to name a few); (v) procurement data 2B26 associated with procurement responsibility information, procurement term information, procurement condition information, and warranty information of the elements, materials, specifications, and requirements related to a typical building project (e.g., explicit assignment of procurement responsibility, a database of vetted procurement sources, itemized quotations for specified items to be procured with terms and conditions, material and product use, handling, installation, performance and maintenance data, to name a few); and (vi) stakeholder information 2B29 associated with each stakeholder such as those shown in FIG. 1, to name a few, to a building project 201; (vii) instance data items 2B50 each of which is related to a product or service required in the building project 501, where each instance data item is assigned a scope ID which is indicative of a level of development of the building project; and (viii) existence objects data 2B60 each of which is related to an element (physical or service) of the electronic computer model related to the first building project where each existence object corresponds to a instance data item.

In embodiments, stakeholder information includes identity information, role information, interest information, professional and technical obligation information, and contribution information of each stakeholder.

In embodiments, the instance data items relate to items that are to be used in the first building project. In embodiments, the instance data items relate to services that are to be used in the building project. In embodiments, each instance data item may relate to an item and service to be used on the building project.

In embodiments, existence objects correspond to items and services that are modeled or reflected in one or more computer models produced for the building project. In embodiments, existence objects correspond to items and related services that are modeled or otherwise required in the building project.

In embodiments, each data item is associated with source indicator information to enable proper tracking of who and when such data item is added and/or modified in the system. For example, source indicator information may include stakeholder information, to name a few, and a time stamp, including date and time, to name a few. In embodiments, source indicator information may identify the individual stakeholder that provided data related to an instance data item as well as potentially other information to verify authenticity and/or track responsibility, e.g., computer identification code, IP protocol code, etc.

In embodiments, the building project platform database 2B1 may contain identifiers (not shown) used by the relational database, which is configured to link each data item to other data items in the database. For example, in embodiments, if there is a project record whose ID is 12345, when a user (with ID 99999) is created and/or assigned to the project as a general contractor, there is a table in the database that indicates that the user 99999 is assigned to project 12345 in the role of general contractor. When the system needs to pull data for all users linked to the project ID 12345, user 99999 automatically comes up.

Figure 3A:
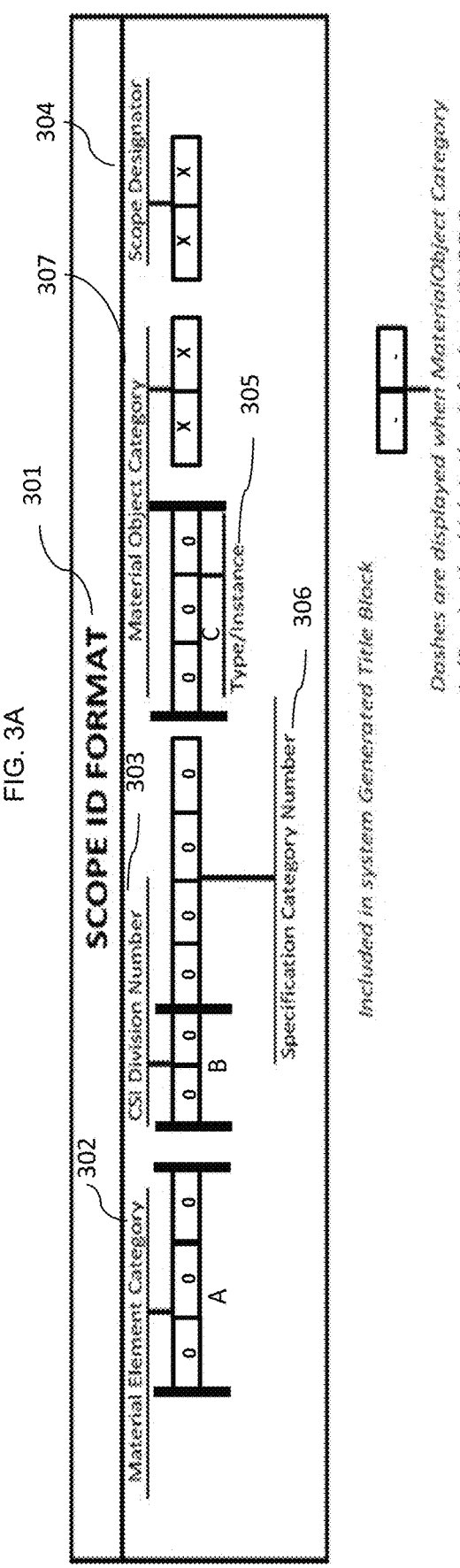
FIG. 3A is an exemplary representation of a scope ID format which may be associated with each instance data item stored by the building project administration computer system in accordance with exemplary embodiments of the present invention.

FIG. 3A is an exemplary representation of the scope ID format 301 associated with each instance data item that exists in the electronic building project administration computer system 200.

In embodiments, the electronic building project administration computer system 200 makes this data available to each unique participant in the building project 201 in an intuitive, accessible, and revelatory "page" format. Using the electronic building project administration computer system 200, pages (or sheets) may be generate and printed (electronically or on paper) for practical offline access; however, when accessed from a computer or web enabled device, the building project platform database 2B1 is also accessible. This is accomplished by data linking such as through highly structured and relational data formats. Using the electronic building project administration computer system 200, a page viewer may navigate to the simplest indivisible element of every instance of an object that exists in building project platform database 2B1. For example, a stakeholder interested in seeing the construction of a secondary entrance door within building project 201 can click on the door in a 3D view of the building to display its scope ID (described below in FIG. 3A) using the electronic building project administration computer system 200. Relevant information about the door is available, including its material, components, properties, who has installed or will install it, and when it will be displayed to the stakeholder and may be printed out if desired.

In order to make this information available, in embodiments, a scope ID, such as that illustrated in scope ID format 301 of FIG. 3A, is associated with each instance of an object that exists in the electronic building project administration computer system 200. Scope ID format 301 includes material element category 302, CSI division number 303, scope designator 304, type/instance 305, specification category number 306, and material object category 307. One of ordinary skill in the art will recognize the underlying taxonomies that comprise scope ID format 301 communicate information regarding an object's scope, context, element, and material. The scope ID is a container abstract data type, that represents a data class, data structure, abstract data, or a collection thereof, to name a few.

In embodiments, all objects of the same type have the same scope ID. For example, a building project may include a number of floors, each of which may be made of the same materials and subject to the same element data, material data, specification data, requirement data and procurement data. In embodiments, all instances of this same floor would be assigned the same scope ID.

Figure 3B:
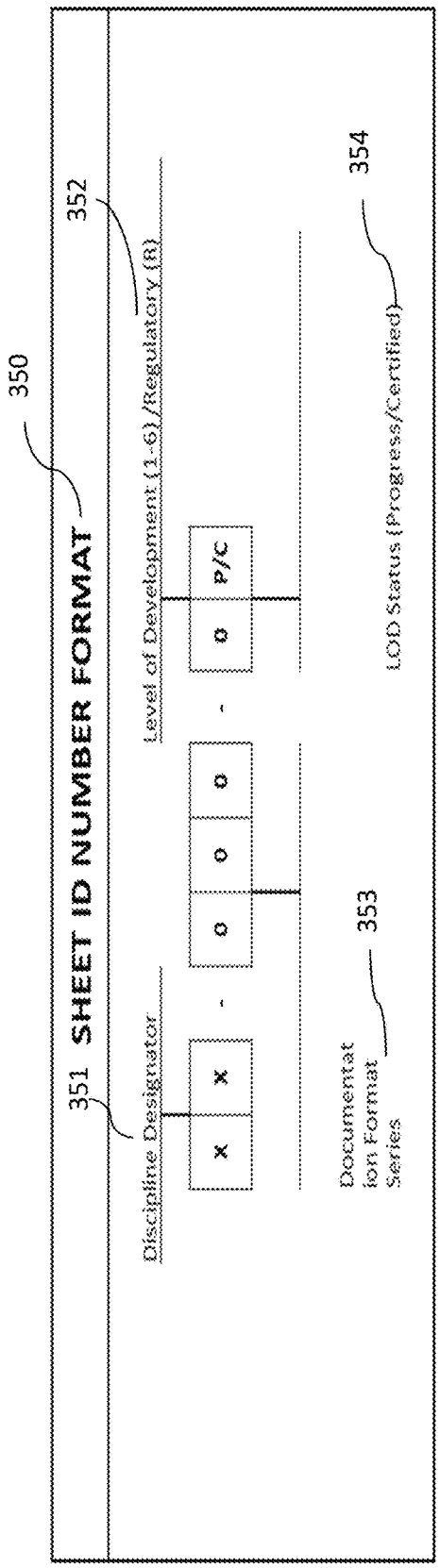
FIG. 3B is an exemplary representation of a sheet ID number format which may be associated with each sheet of graphic information generated by the building project administration computer system in accordance with exemplary embodiments of the present invention.

FIG. 3B is an exemplary representation of the sheet ID number format 350 which will be associated with each page of graphic information in published sheets and pages viewed using a computer in the electronic building project administration computer system 200.

As illustrated in FIG. 3B, in embodiments, a unique sheet ID number may be associated with each published sheet of graphic information, using sheet ID Number Format 350. The sheet ID number format 350 includes a discipline designator 351, a level of development/regulatory identifier 352, identification of a documentation format series 353, and LOD status 354.

Sheet ID number format 350 supports offline navigation of printed pages, and interactive navigation of pages viewed using the electronic building project administration computer system 200, which allows access to specific data sets extracted from the building project database.

Figure 3C:
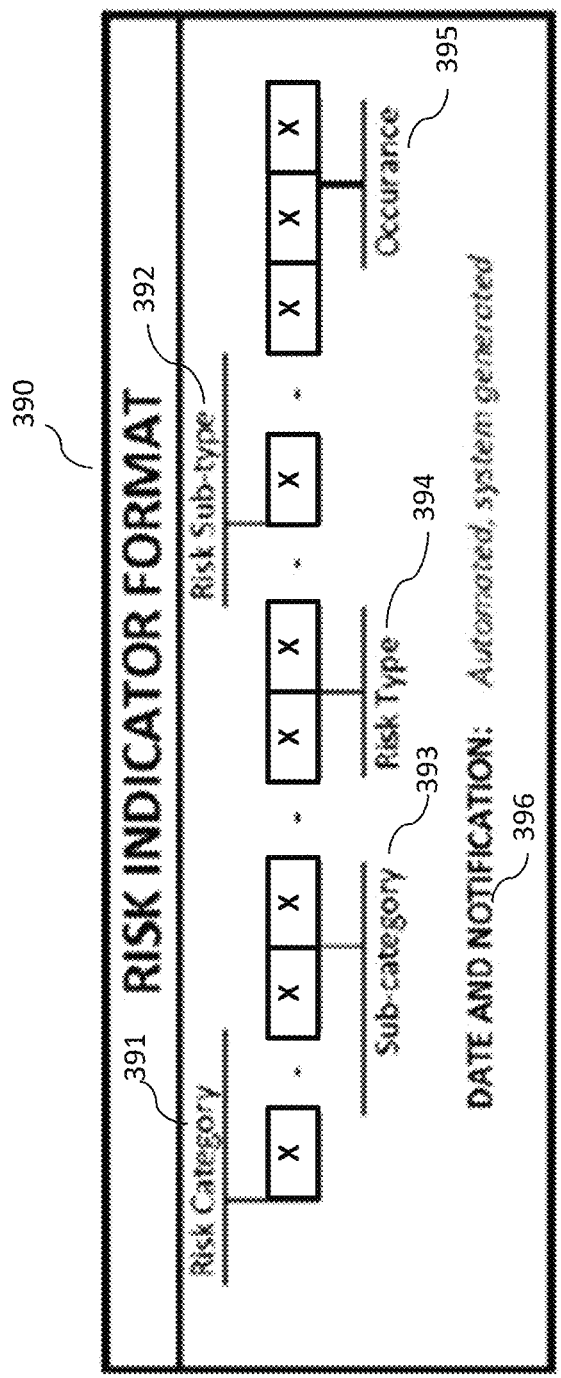
FIG. 3C is a representation of a risk indicator format which may be associated with notifications potential risk as a result of a stakeholder action by the electronic building project administration computer system in accordance with exemplary embodiments of the present invention.

FIG. 3C is an exemplary representation of the risk indicator format 390 which will be associated with notification of a potential risk as a result of a stakeholder action in the electronic building project administration computer system 200.

As illustrated in FIG. 3C, in embodiments, a unique risk ID number may be associated with each action that the electronic building project administration computer system 200 identifies as potentially shifting risk to that stakeholder, using risk indicator format 390. The risk indicator format 390 includes a risk category 391, risk sub-type 392, sub-category 393, risk type 394, occurrence 395, and date and notification 396.

Level of development, also referred to as LOD, is one of the fields in sheet ID number format 350. LOD refers to the phase of project development and is a measure of progress that generally refers to project phases and the level of spatial and material data inherent in the virtual model provided in the electronic building project administration computer system 200 corresponding to that phase during the planning and construction process.

In embodiments, requirements for completing each LOD and moving to the next are pre-defined and relevant project stakeholders certify their deliverables at the end of each LOD. In embodiments, there are six qualified LOD milestones (levels) for project progress (e.g., LOD 1, LOD 2, LOD 3, LOD 4, LOD 5, LOD 6). LOD certification, seen in LOD status (Progress/Certified) 354, conveys whether or not the data may be relied upon and used by the stakeholders to achieve the next progressive LOD. When LOD status 354 is certified, the data may be relied upon.

FIG. 3D is an exemplary representation of the LOD completion requirements 3D-1 associated with each LOD level (1-6) in the electronic building project administration computer system 200.

Referring to FIG. 3D, in embodiments, LOD 1 represents the diligence, assessment, and conceptualization phase of building project 201. LOD 1 completion 3D(a) has been reached when the parameters of spatial context, size, scope, and scale of the project have been established and an assessment of potential project impacts has been made using the electronic building project administration computer system 200. In embodiments, LOD 1 maybe considered the planning stage.

In embodiments, LOD 2 represents the schematic design and configuration phase of building project 201. LOD 2 describes the level of development in which generalized performance criteria for building systems and assemblies are developed, and the structural and MEP systems and sustainability strategies for the building project are described and analyzed. In this stage, planning data is compared to model data to ensure consistency and any inconsistencies are resolved between the stakeholders. LOD 2 completion 3D(b) has been completed when the electronic building project administration computer system 200 determines or confirms that all predetermined design criteria have been met and accepted by the relevant stakeholders. In embodiment, this includes validating electronic computer modules of the project to ensure they are complete.

In embodiments, LOD 3 represents the coordination and design development phase of building project 201 in which the size, shape, location, configuration, performance and properties of elements, materials, and systems are coordinated and specified. LOD 3 completion 3D(c) has been reached when the electronic building project administration computer system 200 determines or confirms that all predetermined design criteria have been met and accepted by the relevant stakeholders. In embodiments, LOD 3 completion 3D(c) similarly may be reached when the size, shape, location, configuration, performance, and properties of elements, materials, and systems for building project 201 have been confirmed and accepted by all relevant stakeholders.

In embodiments, LOD 4 represents the scope documentation and validation phase of building project 201. LOD 4 completion 3D(d) has been reached when the electronic building project administration computer system 200 determines that sufficient data has been provided to: (1) describe and assess the scope of work implied by the design; (2) assign procurement responsibility for every element, material, system, and requirement implied by the design; (3) assess constructability and determine means and methods required to accomplish the design; obtain regulatory approvals for the scope of the proposed work; and (4) solicit bid proposals for a fixed price from building professionals and construction managers for the scope of work implied by the design. In embodiments, the bids discussed above may include product price and service price information related to each instant data item. These prices may be approved by the necessary stakeholders, such as the owner, for example.

In embodiments, LOD 5 represents the validation and realization phase. In embodiments, LOD 5 completion 3D(e) includes the verification of installed systems of building project 201 by data provided and other means of surveying and verification that installed systems are integrated into the electronic computer model of electronic building project administration computer system 200.

In embodiments, LOD 6 represents the post-construction occupation/operations phase of building project 201. LOD 6 completion 3D(f) has been reached when the electronic building project administration computer system 200 determines or confirms that any post construction and operational requirements have been met and confirmed by the relevant stakeholders.

Figure 4A:
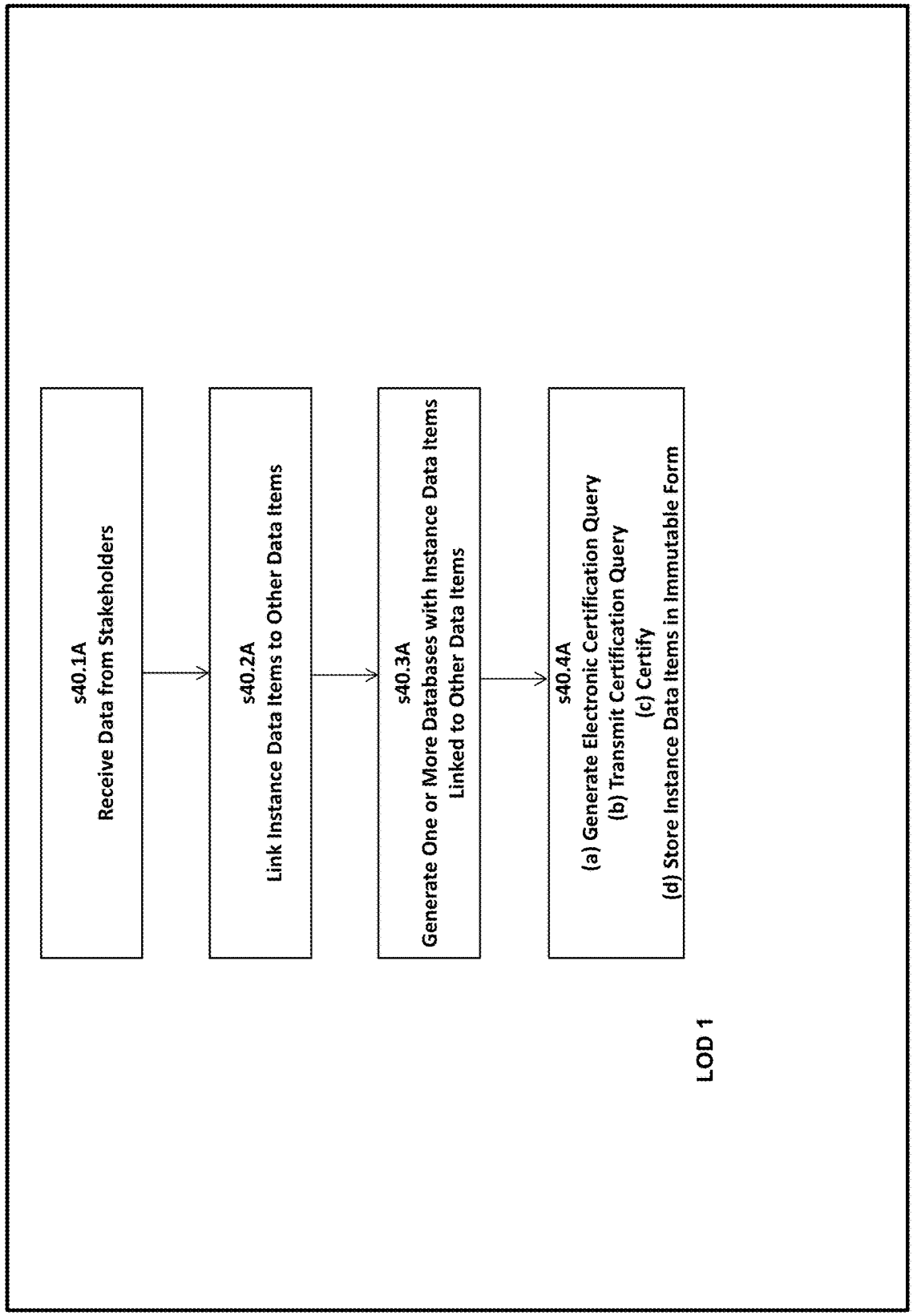
FIG. 4A is an exemplary process flow of the steps to generate one or more project platform database(s) 2B1 using an electronic building project computer administration system 200 in accordance with exemplary embodiments of the present invention.

FIG. 4A is an exemplary process flow of the steps used by the electronic building project administration computer system 200 to generate one or more project platform database (s) 2B1 in accordance with exemplary embodiments of the present invention. The steps set forth in the process flow are illustrative of the various steps in the building project administration process. The steps are being described here in the order of appearance in FIG. 4A, but during an actual building project administration process some steps may occur simultaneously or in a different order.

In a step s40.1A, the electronic building project administration computer system 200 receives data from various stakeholder devices, such as those shown in FIG. 1, to name a few. This first subgroup of stakeholders will generally be providing level at a high level of granularity.

In embodiments, the data includes stakeholder information 2B29, element data 2B20, material data 2B22, specification data 2B24, requirement data 2B25, procurement data 2B26, and instance data items 2B50, to name a few.

In embodiments, each data item includes source indicator information, including at least stakeholder information 2B29 to identify the stakeholder that provided the data and a time stamp, including date and time that the data was provided. In embodiments, other information may be included as well.

In a step s40.2A, the electronic building project administration computer system 200 links the received stakeholder information 2B29, element data 2B20, material data 2B22, specification data 2B24, requirement data 2B25, and procurement data 2B26 to instance data items 2B50.

In a step s40.3A, the electronic building project administration computer system 200 generates one or more building project platform database 2B1 comprising the stakeholder information 2B29, element data 2B20, material data 2B22, specification data 2B24, requirement data 2B25, and procurement data 2B26 linked to the instance data items 2B50.

In a step s40.4A(a), the electronic building project administration computer system 200 generates an electronic certification query requesting certification of the instance data items 2B50 for LOD 1.

In a step s40.4A(b), the electronic building project administration computer system 200 transmits the electronic certification query to each relevant stakeholder device requesting certification of the instance data items 2B50 for LOD 1.

In embodiments, relevant stakeholders verify and review the certification query for LOD 1 via their stakeholder devices.

In a step s40.4A(c), the electronic building project administration computer system 200 receives a certification message from each relevant stakeholder device and certifies LOD 1.

In a step s40.4A(d), the electronic building project administration computer system 200 stores instance data items 2B50 in an immutable form such that a permanent record of the instance data items at the end of LOD 1 is maintained.

The process described above in connection with FIG. 4A may be performed by a computer system that is programmed to perform the process described in connection with FIG. 4A.

Figure 4B:
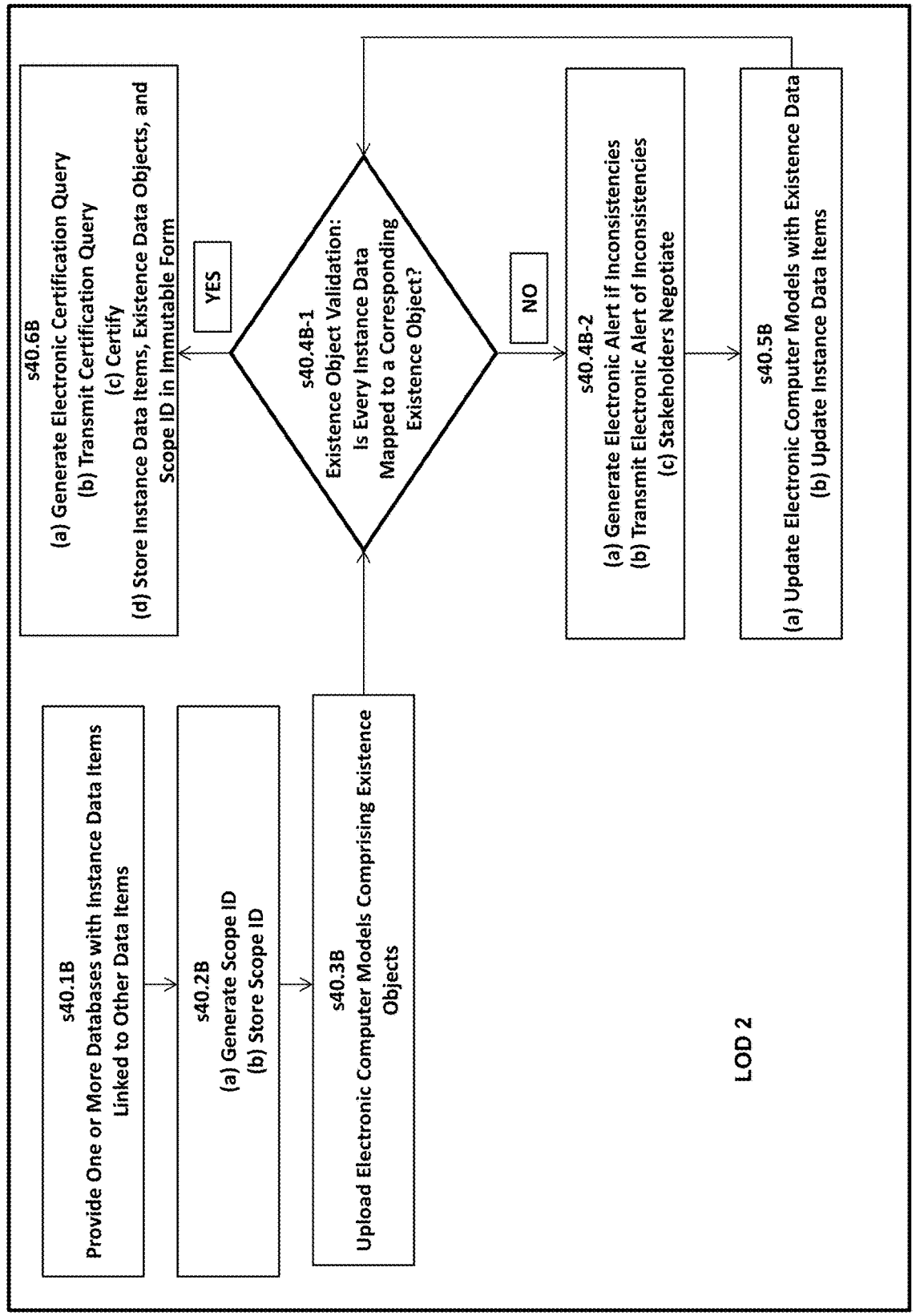
FIG. 4B is an exemplary process flow of the steps to validate a first electronic computer model of a first building project using an electronic building project computer administration system 200 in accordance with exemplary embodiments of the present invention.

FIG. 4B is an exemplary process flow of the steps used by the electronic building project administration computer system 200 to validate a first electronic computer model of a first building project in accordance with exemplary embodiments of the present invention. The steps set forth in the process flow are illustrative of the various steps in the building project administration process. The steps are being described here in the order of appearance in FIG. 4B, but during an actual building project administration process some steps may occur simultaneously or in a different order.

In a step s40.1B, a building project platform database 2B1 comprising the stakeholder information 2B29, element data 2B20, material data 2B22, specification data 2B24, requirement data 2B25, and procurement data 2B26, and the instance data items 2B50 from LOD 2 is provided. Stakeholder information 2B29, in embodiments, may be associated with each stakeholder of a first subgroup of stakeholders of a plurality of stakeholders associated with the first building project. In embodiments, stakeholder information 2B29 may include identity information, role information, interest information, professional and/or technical obligation information and contribution information of each stakeholder of at least the first subgroup of stakeholders, to name a few. Identity information, in embodiments, may include a name, a company, and contact information, to name a few. For example, an identity may be John Smith, of John Smith Architecture, with an electronic mail address of jsmith@jsarchitecture.com. The contact information may also include, a facsimile number, a telephone number, an address, and cellular phone number, to name a few. In embodiments, role information may indicate a role the stakeholder plays in the building project. For example, the role may be an architect, a construction manager, an owner, a contractor, or a sub contractor, to name a few. Interest information, in embodiments, may identify an interest a stakeholder may have in the building project. For example, a stakeholder may have a financial interest in the project or portion of the project that the stakeholder is responsible for. Professional and/or technical obligation information, in embodiments, may include obligations that must be adhered to by a stakeholder. For example, an engineer may have a technical obligation to design a building. The engineer may also have a professional obligation outlined by a code of ethics by the National Society of Professional Engineers. Contribution information, in an embodiment, may reflect a task or tasks that are to be completed by a stakeholder. For example, a Heating, Ventilation, and Air Conditioning (HVAC) sub contractor may have the contribution of installing heating and cooling systems in a building.

Element data 2B20, in embodiments, may be associated with each instance data item of a plurality of instance data items 2B50 associated with the first project. The element data 2B20 for each instance data item may be provided by a first responsible stakeholder. A responsible stakeholder, in embodiments, may be a stakeholder of the first subgroup of stakeholders. A responsible stakeholder, for example, may be a stakeholder that is responsible for at least a portion of the first building project. For example, a responsible stakeholder may be the architect who designed the first building project, the engineer(s) who designed or participated in the design of one or more systems or portions of the building project based on the architect's design. Other responsible stakeholders may include the owner, the contractor, an owner's representative, and/or the construction manager, to name a few. The element data 2B20, in embodiments, may include first source information associated with the first responsible stakeholder. Source information, in embodiments, may be information that can identify the first stakeholder that provided or caused to be provided, the element data 2B20. In this embodiment, the first source may indicate that the element data 2B20 was provided the first responsible stakeholder. Additionally, in embodiments, the element data 2B20 may also include a first timestamp. The first timestamp, in embodiments, may indicate when the element data 2B20 was provided to the one or more electronic building project databases.

Material data 2B22, in embodiments, may be associated with each instance data item of the plurality of instance data items 2B50 associated with the first building project. The material data 2B22, in embodiments, may be provided by a second responsible stakeholder of the first subgroup of stakeholders. In embodiments, the second responsible stakeholder may be the same as the first responsible stakeholder. For example, both the material data 2B22 and the element data 2B20 may be provided by the same stakeholder. In embodiments, the second responsible stakeholder may be different than the first responsible stakeholder. The material data 2B22, in embodiments, may include second source information associated with the second responsible stakeholder. For example, the second source information may indicate that the material data 2B22 originated from the second responsible stakeholder. Additionally, the material data 2B22 may include a second timestamp indicating when the material data 2B22 was provided to the one or more electronic building project databases. The material data, in embodiments, will indicate the specific material or materials necessary for an instance data item or instance data items in the building project.

Specification data 2B24, in embodiments, may be associated with each instance data item of the plurality of instance data items 2B50 associated with the first building project. In embodiments, the specification data 2B24 for each instance data item is provided by a third responsible stakeholder of the first subgroup of stakeholders. In embodiments, the third responsible stakeholder may be the same as the first responsible stakeholder and/or the second responsible stakeholder or may be a different stakeholder. For example, the element data 2B20 and the specification data 2B24 may be provided by the same responsible stakeholder. In embodiments, the third responsible stakeholder may be the same as the second responsible stakeholder. For example, the material data 2B22 and the specification data 2B24 may be provided by the same stakeholder. In embodiments, the third responsible stakeholder, the second responsible stakeholder, and the first responsible stakeholder may be the same. For example, the element data 2B20, the material data 2B22, and the specification data 2B24 may be provided by the same responsible stakeholder. In embodiments, the third responsible stakeholder may be different than the first responsible stakeholder and the second responsible stakeholder. The specification data 2B24, in embodiments, may include third source information associated with the third responsible stakeholder. For example, the third source information may indicate that the specification data 2B24 originated from the third responsible stakeholder. Additionally, the specification data 2B24 may include a third timestamp indicating when the specification data 2B24 was provided to the one or more electronic building project databases. The specification data, in embodiments, may identify specification or requirements for an instance data item.

Requirement data 2B25, in embodiments, may be associated with contract documents, regulations or legal requirements (e.g., Minority Business Enterprise ("MBE")/Woman Business Enterprise ("WBE") procurement policies, a site safety plan, and implementation of water recovery practices and other sustainability practices, to name a few) related to each instance data item of the plurality of instance data items 2B50 associated with the first building project. In embodiments, the requirement data 2B25 for each instance data item is provided by a fourth responsible stakeholder of the first subgroup of stakeholders. In embodiments, the fourth responsible stakeholder may be the same as the first responsible stakeholder. For example, the requirement data 2B25 and the element data 2B20 may be provided by the same stakeholder. In embodiments, the fourth responsible stakeholder may be the same as the second responsible stakeholder. For example, the requirement data 2B25 and the material data 2B22 may be provided by the same stakeholder. In embodiments, the fourth responsible stakeholder may be the same as the third responsible stakeholder. For example, the requirement data 2B25 and the specification data 2B24 may be provided by the same stakeholder. In embodiments, the fourth responsible stakeholder, the first responsible stakeholder, and the second responsible stakeholder may be the same stakeholder. For example, the requirement data 2B25, the element data 2B20, and the material data 2B22 may be provided by the same stakeholder. In embodiments, the fourth responsible stakeholder, the first responsible stakeholder, and the third responsible stakeholder, may be the same stakeholder. For example, the requirement data 2B25, the element data 2B20, and the specification data 2B24 may be provided by the same stakeholder. In embodiments, the fourth responsible stakeholder, the second responsible stakeholder, and the third responsible stakeholder may be the same stakeholder. For example, the requirement data 2B25, the material data 2B22, and the specification data 2B24, may be provided by the same stakeholder. In embodiments, the fourth responsible stakeholder, the first responsible stakeholder, the second responsible stakeholder and the third responsible stakeholder may be the same stakeholder. For example, the element data 2B20, the material data 2B22, the specification data 2B24, and the requirement data 2B25 may be provided by the same stakeholder. In embodiments, the fourth responsible stakeholder may be different than the first responsible stakeholder, the second responsible stakeholder, and the third responsible stakeholder. The requirement data 2B25, in embodiments, may include fourth source information associated with the fourth responsible stakeholder. For example, the fourth source information may indicate that the requirement data 2B25 originated from the fourth responsible stakeholder. Additionally, the requirement data 2B25 may include a fourth timestamp indicating when the requirement data 2B25 was provided to the one or more electronic building project databases.

Procurement data 2B26, in embodiments, may be associated with the procurement of each instance data item of the plurality of instance data items 2B50 associated with the first building project. In embodiments, procurement data 2B26 may be provided by a fifth responsible stakeholder of the first subgroup of stakeholders. Procurement data 2B26, in embodiments, may include responsibility, terms, conditions, and/or warranties, to name a few.

In embodiments, the fifth responsible stakeholder may be the same as the first responsible stakeholder, the second responsible stakeholder, the third responsible stakeholder, and/or the fourth responsible stakeholder. For example, the element data 2B20 and the procurement data 2B26 may be provided by the same stakeholder. In embodiments, the fifth responsible stakeholder may be different than the first responsible stakeholder, the second responsible stakeholder, the third responsible stakeholder, and/or the fourth responsible stakeholder. The procurement data 2B26, in embodiments, may include fifth source information associated with the fifth responsible stakeholder. For example, the fifth source information may indicate that the procurement data 2B26 originated from the fifth responsible stakeholder. Additionally, the procurement data 2B26 may include a fifth timestamp indicating when the procurement data 2B26 was provided to the one or more electronic building project databases.

The procurement data may include: (i) procurement responsibility information indicating an individual responsible for procurement of each instance data item; (ii) procurement terms information indicating permissible terms for procurement of each instance data item; (iii) procurement conditions information indicating conditions under for each instance data item; (iv) procurement warranties indicating any warranties associated with procurement of each instance data item.

The plurality of instance data items 2B50, in embodiments, may be associated with the first building project. The instance data items 2B50, in embodiments, may be provided by at least one stakeholder of the first subgroup of stakeholders. For example, the instance data items 2B50 may be provided by the first responsible stakeholder or any other responsible stakeholder or another stakeholder. Each instance data items of the plurality of instance data items 2B50, in embodiments, may be linked to at least one of the element data 2B20, the material data 2B22, the specification data 2B24, the requirement data 2B25 and/or the procurement data 2B26. Each instance data item, in embodiments, may correspond to a physical object included and/or service required in the first building project. In embodiments, an instance data item may correspond to both a physical object and a service.

Each instance data item, in embodiments, may include sixth source information associated with the stakeholder that provided the plurality of instance data items 2B50. For example, the sixth source information may indicate that the instance data items 2B50 originated from the fifth responsible stakeholder. Additionally, the instance data items 2B50 may include a sixth timestamp indicating when the instance data items (or when each instance data item) 2B50 was provided to the one or more electronic building project databases. In embodiments, the one or more electronic building project databases is a relational database.

In embodiments, building project platform database 2B1 may be one or more databases. In embodiments, the one or more databases may be located together in a single location or may be located in difference locations and operatively connected to each other and/or to the electronic building project administration computer system 200. In embodiments, the one or more building project platform database may be relational databases.

In a step s40.2B(a), the electronic building project administration computer system 200 generates a scope ID associated with each instance data item associated with a building project 201 based on the scope ID format 301 discussed above in FIG. 3A. The scope ID, in embodiments, may include a material element category indicator 302, a CSI division number 303, a material object category indicator 307, a scope designator 304, a type designator 305, and/or a specification category number 308. In embodiments, each of the material element category indicator 302, CSI division number 303, material object category indicator 307, scope designator 304, type designator 305, and/or specification category number 308, may be based on at least one of the element data 2B20, material data 2B22, specification data 2B24, requirement data 2B25, and/or procurement data 2B26. Moreover, in embodiments, the scope ID is linked to a respective instance data item of the instance data items 2B50. In embodiments, the scope ID format leverages classifications used in the construction industry to describe specific elements of building project 501. For example, Construction Specification Institute division numbers may be used in the scope ID.

Since LOD 2 is a relatively early stage of the project, details regarding specific elements may not be fully developed. In embodiments, only the material element category 302, CSI division number 303, and the type designator 305 of the scope ID have non-zero values in the scope IDs assigned in FIG. 4A. This is indicated by A, B, and C in FIG. 3A.

In a step s40.2B(b), the electronic building project administration computer system 200 stores scope IDs associated with each respective instance data item 2B50 in building project platform database 2B1. In embodiments, scope IDs associated with each respective instance data item may be stored in another memory that is operatively connected to the database 2B1.

In embodiments, all instance data items 2B50 of the same type have the same scope ID.

In a step s40.3B, one or more stakeholders upload, or otherwise transmit, to the electronic building project administration computer system 200 an electronic computer model comprising existence objects data 2B60 related to the building project 201. In embodiments, an electronic computer module may be developed in the computer system 200, using the CAD/BIM integration module 203, for example. In embodiments, The CAD/BIM integration module 203 in combination with configuration module 202 may normalize the data being incorporated into building project 201. The one or more stakeholders, in embodiments, may be from a second subgroup of stakeholders associated with the first building project. In embodiments, there may be overlap between the first subgroup of stakeholder and the second subgroup of stakeholders. In embodiments, the first electronic computer model (or electronic building model) includes one or more existence objects associated with the first building project. Existence objects may be associated with existence object data 2B60 and reflect objects or services or both reflected in the model. In embodiments, the electronic computer model may include seventh source data. The seventh source data may indicate that the electronic computer module originated with the one or more stakeholders of the second subgroup of stakeholders. Additionally, the electronic computer model may include a seventh timestamp indicating when the electronic computer model was received by the electronic building project administration computer system.

In embodiments, the electronic computer model may be an Industry Foundation Classes (IFC) model.

In a step s40.4B-1, the electronic building project administration computer system 200 validates the electronic computer model comprising existence objects data 2B60.

In embodiments, the electronic building project administration computer system 200 compares the existence objects data 2B60 in the first computer model to the instance data items 2B50 associated with the first building project to map each existence objects data 2B60 to map each instance data item 2B50 to a corresponding existence object data 2B60 based on at least the scope ID to ensure conformity.

In a step s40.4B-2(a), in embodiments, the electronic building project administration computer system 200 generates an electronic alert signal when all existence object data 2B60 is not mapped to a corresponding instance data item 2B50 or each instance data item 2B50 is not mapped to corresponding existence object data 2B60.

In a step s40.4B-2(b), in embodiments, the electronic building project administration computer system 200 transmits the electronic alert signal of inconsistences to all relevant stakeholder devices. In embodiments, the electronic alert signal is transmitted to at least one stakeholder and the first subgroup of stakeholders.

In a step s40.4B-2(c), in embodiments, stakeholders identified by the electronic building project administration computer system 200 as relevant to the inconsistent mapping determined in step s40.4B-1, negotiate via the electronic building project administration computer system 200, or externally, to name a few, to fix inconsistencies so that each existence objects data 2B60 is mapped to a corresponding instance data item 2B50 and each instance data item 2B50 is mapped to a corresponding existence object data 2B60.

In a step s40.5B(a), in embodiments, the electronic building project administration computer system 200 receives updated electronic computer model data including updated existence data objects 2B60 from stakeholder devices. The CAD/BIM integration module 203 in combination with configuration module 202 may normalize the data being incorporated into building project 201.

In a step s40.5B(b), in embodiments, the electronic building project administration computer system 200 may receive updated instance data items 2B50 from stakeholder devices.

In embodiments, the electronic building project administration computer system 200 may receive updated the stakeholder information 2B29, element data 2B20, material data 2B22, specification data 2B24, requirement data 2B25, and procurement data 2B26, and instance data items 2B50 via stakeholder devices in step s40.5B(b).

In embodiments, the electronic building project administration computer system 200 then repeats the validating process in step s40.4B-1 until each existence objects data 2B60 is mapped to a corresponding instance data item 2B50 and each instance data item 2B50 is mapped to a corresponding existence object data 2B60. In embodiments, steps 40.4B-1 through 40.5B are repeated until no alert indicating inconsistencies is generated.

In a step s40.6B(a), the electronic building project administration computer system 200 may generate an electronic certification query requesting certification of the instance data items 2B50 for LOD 2.

In a step s40.6B(b), the electronic building project administration computer system 200 may transmit the electronic certification query to each relevant stakeholder device requesting certification of the instance data items 2B50 for LOD 2.

In embodiments, relevant stakeholders verify and review the certification query for LOD 2 via their stakeholder devices or otherwise.

In a step s40.6B(c), the electronic building project administration computer system 200 receives a certification message from each relevant stakeholder device and certifies LOD 2.

In a step s40.6B(d), the electronic building project administration computer system 200 stores instance data items 2B50, existence objects data 2B60, and scope ID in an immutable form when the certification message from each stakeholder device confirms certification.

The process described above in connection with FIG. 4B may be performed by a computer system that is programmed to perform the process described in connection with FIG. 4B.

Figure 4C:
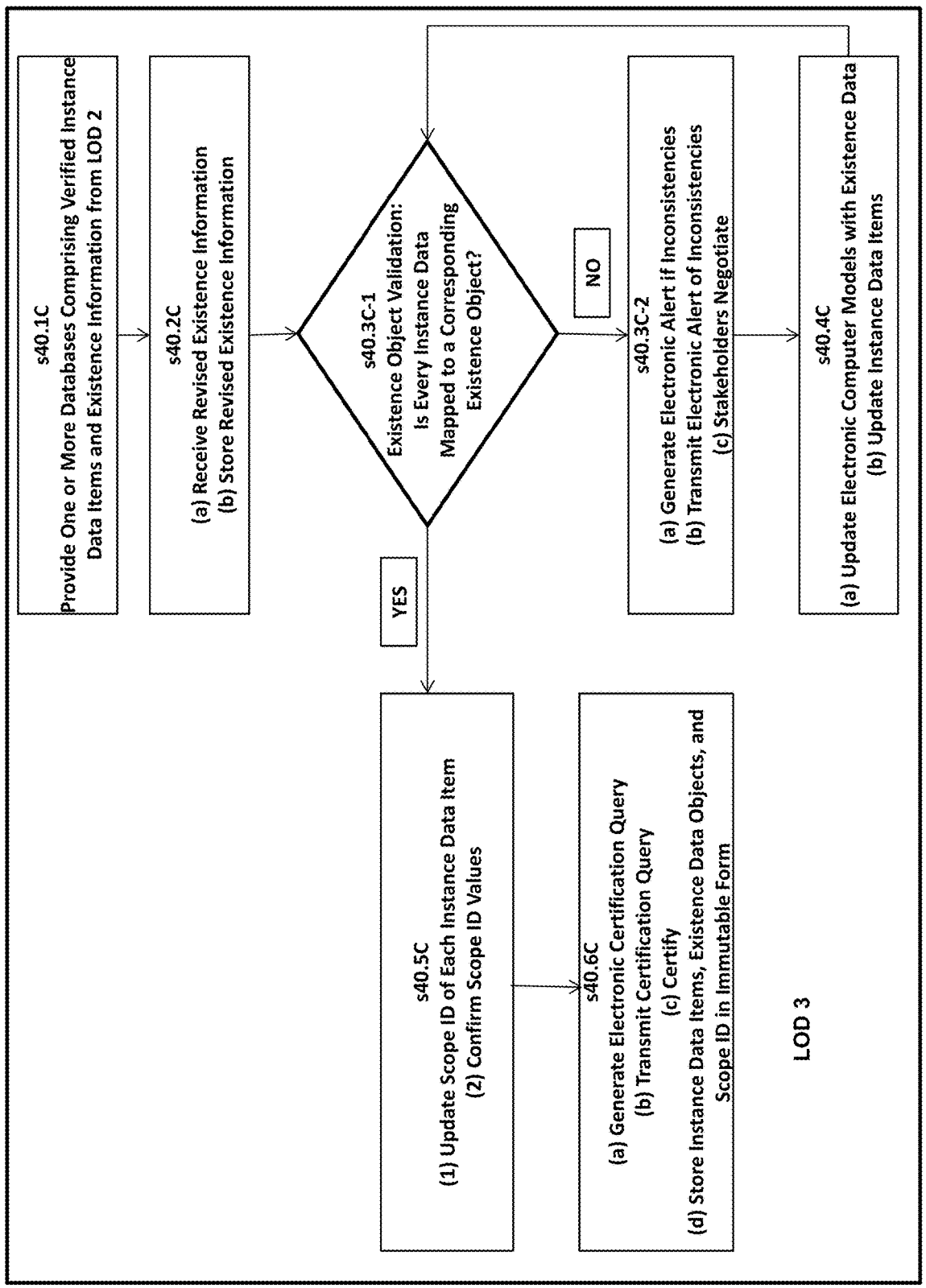
FIG. 4C is an exemplary process flow of the steps to update a first building project using an electronic building project computer administration system 200 in accordance with exemplary embodiments of the present invention.
Figure 4D:
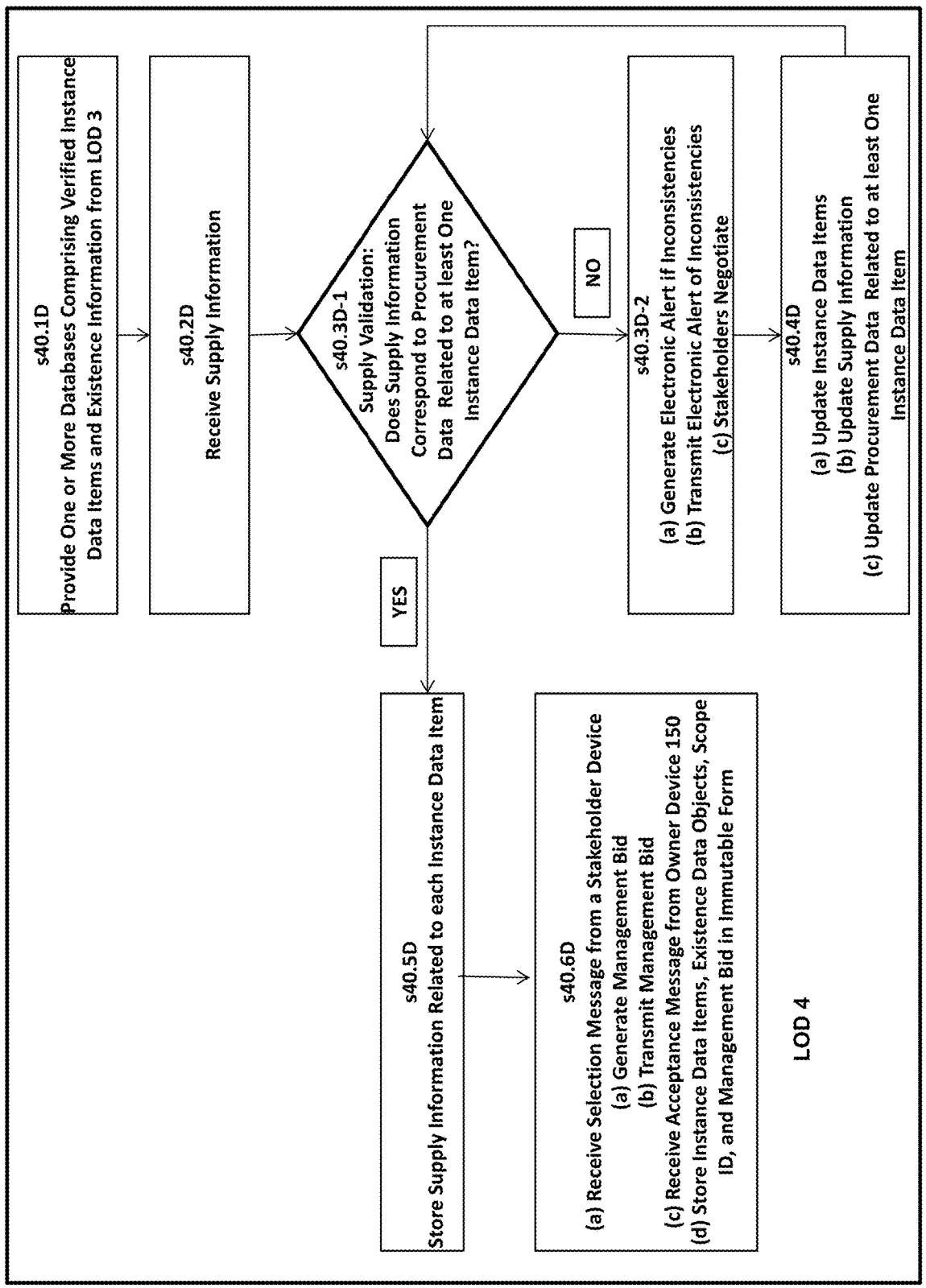
FIG. 4D is an exemplary process flow of the steps to update a first building project using an electronic building project computer administration system 200 in accordance with exemplary embodiments of the present invention.
Figure 4E:
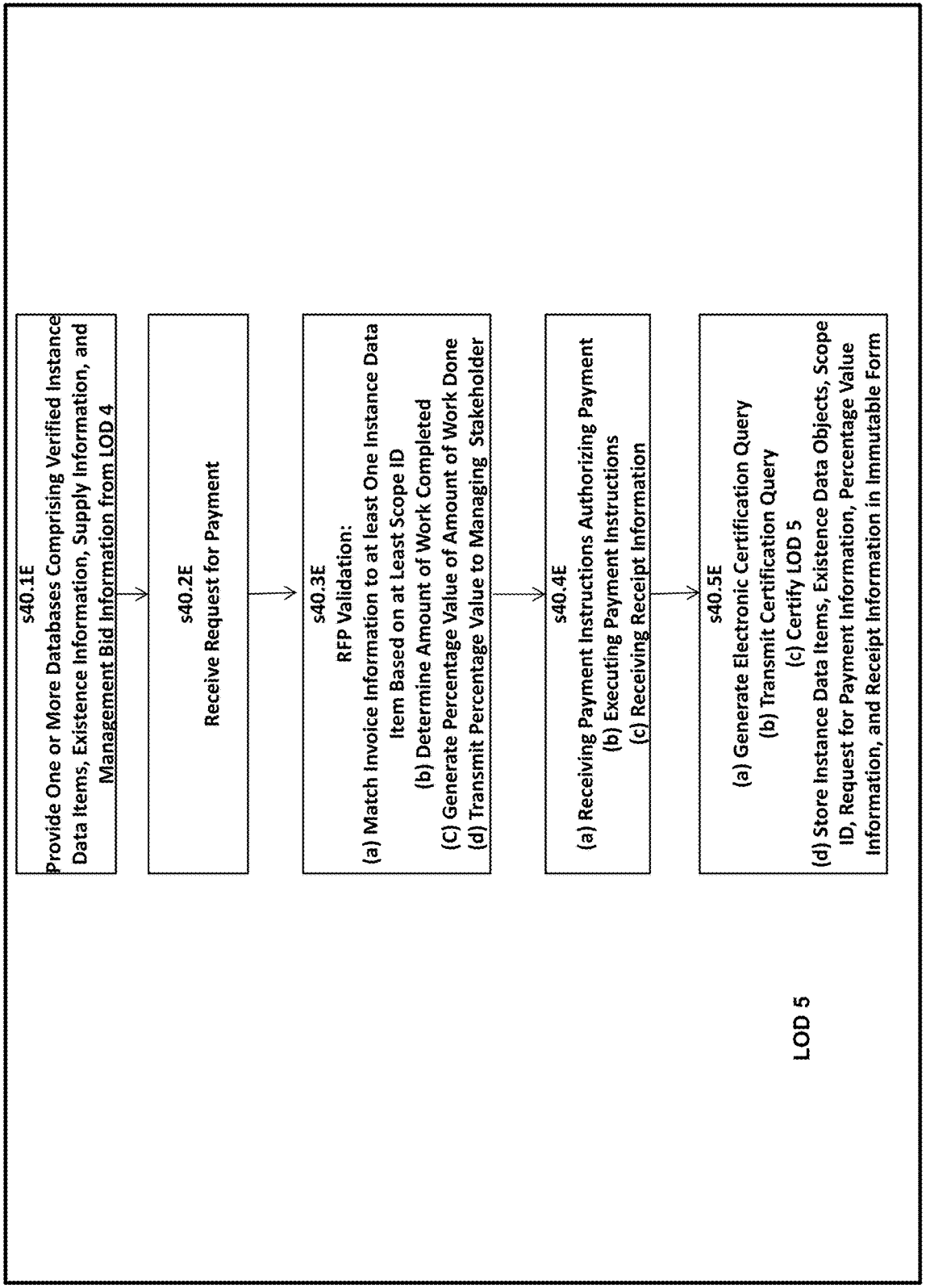
FIG. 4E is an exemplary process flow of the steps to update a first building project using an electronic building project computer administration system 200 in accordance with exemplary embodiments of the present invention.
Figure 4F:
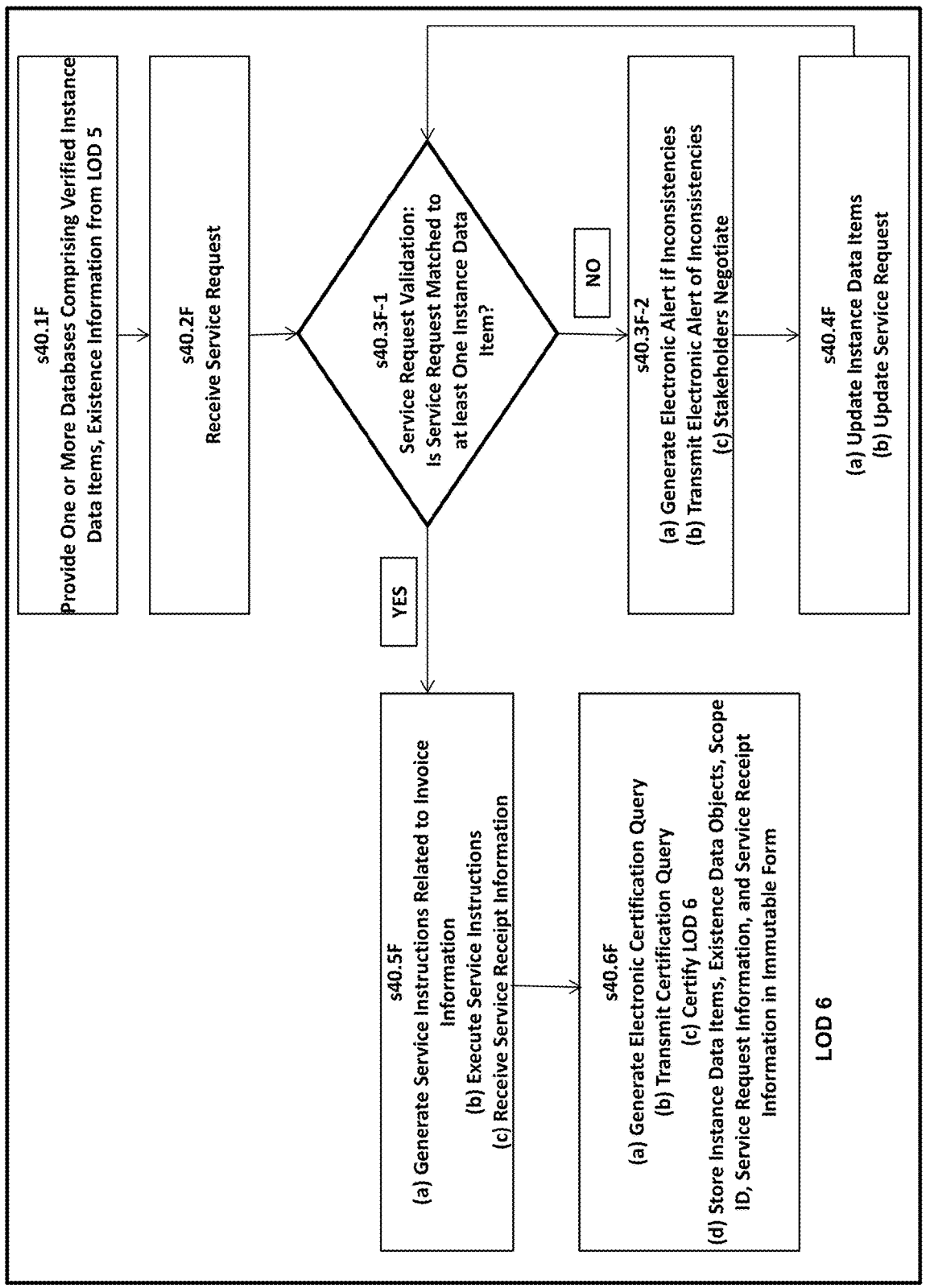
FIG. 4F and FIG. 4H are exemplary process flows of the steps to manage a building associated with a building project using an electronic building project computer administration system 200 in accordance with exemplary embodiments of the present invention.
Figure 4G:
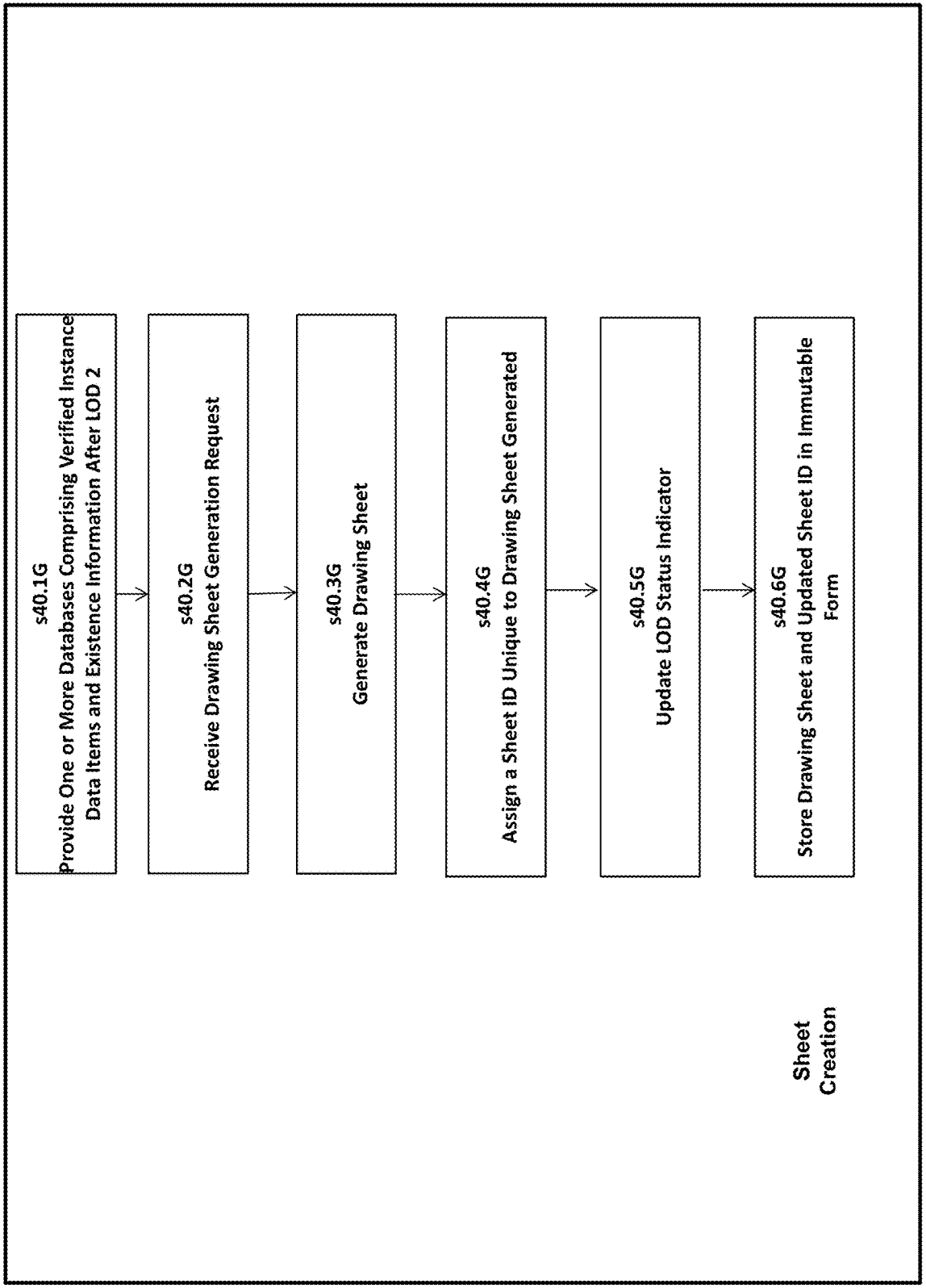
FIG. 4G is an exemplary process flow of the steps used to generate a drawing sheet in accordance with exemplary embodiments of the present invention.

In embodiments, the process of FIG. 4B may continue with the process shown in FIG. 4G, where at a step S40.1G, one or more databases comprising verified instance data items and existence information after LOD 2 are provided. At a step S40.2G the electronic building project administration computer system 200 receives a drawing sheet generation request from at least one stakeholder of the first subgroup of stakeholders and/or the second subgroup of stakeholders. The drawing sheet request, in embodiments, may include at least one scope ID. In embodiments, the drawing sheet request may include multiple scope ID's.

At a step 40.3G, a drawing sheet request is generated by the electronic building project administration computer system 200, a drawing sheet. In embodiments, the generated drawing sheet may indicate each instance of the existence object corresponding to the at least one scope ID included in the first computer model.

At a step 40.4G, a sheet ID unique to the generated drawing sheet is assigned to the generated drawing sheet. In embodiments, the project administration computer system 200 assigns the unique sheet ID. In embodiments, the sheet ID includes the discipline designator 351, document format series number 353, level of development indicator, and/or a LOD status indicator 354. In embodiments, the discipline designator 351, document format series number 353, level of development indicator, and/or a LOD status indicator 354 are based on input provided by one or more stakeholders.

At a step 40.5G, the electronic project administration computer system 200 updates the level of development status indicator 354 of the sheet ID to reflect certification.

At a step 40.6G, the electronic project administration computer system 200 stores, in an immutable form, the drawing sheet and updated sheet ID and the at least one scope ID.

The process described above in connection with FIG. 4G may be performed by a computer system that is programmed to perform the process described in connection with FIG. 4G.

FIG. 4C is an exemplary process flow of steps used by electronic building project administration computer system 200 to update a first building project in accordance with exemplary embodiments of the present invention. The steps set forth in the process flow are illustrative of the various steps in the building project administration process. The steps are being described here in the order of appearance in FIG. 4C, but during an actual building project administration process some steps may occur simultaneously or in a different order.

In a step s40.1C the building project platform database 2B1 comprising the stakeholder information 2B29, element data 2B20, material data 2B22, specification data 2B24, requirement data 2B25, and procurement data 2B26, instance data items 2B50, and existence objects data 2B60 from LOD 2 is provided. Stakeholder information 2B29, in embodiments, may be associated with each stakeholder of a first subgroup of stakeholders and a second subgroup of stakeholders of a plurality of stakeholders associated with the first building project. In embodiments, stakeholder information 2B29 may include, identity information, role information, interest information, professional and/or technical obligation information, and contribution information of each stakeholder of the first subgroup of stakeholders as discussed above as well as similar information related to the second subgroup of stakeholders.

Element data 2B20, in embodiments, may be associated with each instance data item of a plurality of instance data items 2B50 associated with the first project. The element data 2B20 includes information that is generally the same as that discussed above with respect to FIG. 4B and may be provided by a first responsible stakeholder in the same manner as discussed above. In this case, the first responsible stakeholder may be one of the first subgroup of stakeholders or the second subgroup of stakeholders. As noted above, the element data 2B20, in embodiments, may include first source information associated with the first responsible stakeholder that can identify the origin of the element data 2B20 as well as a timestamp.

Material data 2B22, in embodiments, may be associated with each instance data item of the plurality of instance data items 2B50 associated with the first building project. The material data 2B22 includes information that is generally the same as that discussed above with respect to FIG. 4B and may be provided by a second responsible stakeholder in the same manner as discussed above. In this case, the second responsible stakeholder may be one of the first subgroup of stakeholders or the second subgroup of stakeholders. As noted above, the material data 2B22, in embodiments, may include second source information associated with the second responsible stakeholder that can identify the origin of the material element data 2B22 as well as a timestamp.

Specification data 2B24, in embodiments, may be associated with each instance data item of the plurality of instance data items 2B50 associated with the first building project. The specification data 2B24 includes information that is generally the same as that discussed above with respect to FIG. 4B and may be provided by a third responsible stakeholder in the same manner as discussed above. In this case, the third responsible stakeholder may be one of the first subgroup of stakeholders or the second subgroup of stakeholders. As noted above, the specification data 2B24, in embodiments, may include third source information associated with the third responsible stakeholder that can identify the origin of the material element data 2B22 as well as a timestamp.

Requirement data 2B25, in embodiments, may be associated with the same type of information discussed above with reference to FIG. 4B and may be provided by a fourth responsible stakeholder in the same manner as discussed above. In this case, the fourth responsible stakeholder may be one of the first subgroup of stakeholders or the second subgroup of stakeholders. As noted above, the requirement data 2B25, in embodiments, may include fourth source information associated with the fourth responsible stakeholder that can identify the origin of the requirement element data 2B25 as well as a timestamp.

Procurement data 2B26, in embodiments, may be associated with the procurement of each instance data item of the plurality of instance data items 2B50 associated with the first building project. The requirement data 2B26, in embodiments, may be associated with the same type of information discussed above with reference to FIG. 4B and may be provided by a fifth responsible stakeholder in the same manner as discussed above. In this case, the fifth responsible stakeholder may be one of the first subgroup of stakeholders or the second subgroup of stakeholders. As noted above, the procurement data 2B26, in embodiments, may include fifth source information associated with the fifth responsible stakeholder that can identify the origin of the requirement procurement data 2B26 as well as a timestamp.

The plurality of instance data items 2B50 may be associated with the first building project. In embodiments, the instance data items 2B50 may be provided by at least one responsible stakeholder of the first subgroup of stakeholders or the second subgroup of stakeholders. Otherwise the instance data items include the information discussed above with reference to FIG. 4B and may include sixth source information associated with the at least one responsible stakeholder of the first subgroup of stakeholders and/or the second subgroup of stakeholders and a time stamp.

Existence objects data 2B60 (e.g. existence information) may include information associated with each existence object of a plurality of existence objects specified in an electronic computer model or models associated with the first building project.

In embodiments, building project platform database 2B1 may be one or more databases.

In embodiments, all instance data items 2B50 of the same type have the same scope ID.

In a step s40.2C(a), the electronic building project administration computer system 200 receives updated existence objects data 2B60. In embodiments, the electronic building project administration computer system 200 may receive the updated existence objects data 2B60 from at least one stakeholder from a third subgroup of stakeholders associated with the first building project. The third subgroup of stakeholders may include stakeholders not includes in the first subgroup of stakeholders or the second group of stakeholder, however, their may be overlap between the first subgroup of stakeholders, second subgroup of stakeholders and fourth subgroup of stakeholders. The updated existence information, in embodiments, is associated with at least one of the existence objects included in the electronic computer model or a new existence object. In embodiments, the CAD/BIM integration module 203 in combination with configuration module 202 normalizes the data being incorporated into building project 201. In embodiments, the electronic computer model may be an IFC model. In embodiments, the updated existence information may be provided in a second electronic computer model. In embodiments, the updated existence information may be provided via a stakeholder interface of a stakeholder user device associated with at least one stakeholder.

In embodiments, the existence objects data 2B60 is provided as input data provided via a stakeholder device. In embodiments, the CAD/BIM integration module 203 in combination with configuration module 202 normalizes the data being incorporated into building project 201.

In a step s40.2C(b), the electronic building project administration computer system 200 stores the updated existence information in the one or more electronic building project databases.

In a step s40.3B, one or more stakeholders upload to the electronic building project administration computer system 200 an electronic computer model comprising existence objects data 2B60 related to the building project 201. The CAD/BIM integration module 203 in combination with configuration module 202 normalizes the data being incorporated into building project 201.

In a step s40.3C-1, the electronic building project administration computer system 200 validates the electronic computer model comprising existence objects data 2B60.

In embodiments, the electronic building project administration computer system 200 compares the existence objects data 2B60 and instance data items 2B50 to map existence objects data 2B60 to a corresponding instance data item 2B50 and each instance data item 2B50 to corresponding existence object data 2B60 based on at least scope ID, to name a few, to ensure conformity.

In a step s40.3C-2(a), in embodiments, the electronic building project administration computer system 200 generates an electronic alert signal when each existence objects data 2B60 is not mapped to a corresponding instance data item 2B50 or each instance data item 2B50 is not mapped to a corresponding existence object data 2B60.

In a step s40.3C-2(b), in embodiments, the electronic building project administration computer system 200 transmits the electronic alert signal of inconsistencies to all relevant stakeholder devices.

In a step s40.3C-2(c), in embodiments, stakeholders identified by the electronic building project administration computer system 200 as relevant to the inconsistent mapping determined in step s40.3B-1, negotiate via the electronic building project administration computer system 200, or externally, to name a few, to fix inconsistencies so that each existence objects data 2B60 is mapped to a corresponding instance data item 2B50 and each instance data item 2B50 is mapped to a corresponding existence object data 2B60.

In a step s40.4C(a), in embodiments, the electronic building project administration computer system 200 receives updated electronic computer model data comprising updated existence data objects 2B60 from stakeholder devices. The CAD/BIM integration module 203 in combination with configuration module 202 normalizes the data being incorporated into building project 201.

In a step s40.4C(b), in embodiments, the electronic building project administration computer system 200 receives updated instance data items 2B50 from stakeholder devices.

In embodiments, the electronic building project administration computer system 200 may receive updated stakeholder information 2B29, element data 2B20, material data 2B22, specification data 2B24, requirement data 2B25, and procurement data 2B26, and instance data items 2B50 via stakeholder devices in step s40.4C (b).

In embodiments, the electronic building project administration computer system 200 then reassesses the instance data items 2B50 and existence objects data 2B60 in accordance with step s40.3C-1 until each existence objects data 2B60 is mapped to a corresponding instance data item 2B50 and each instance data item 2B50 is mapped to a corresponding existence object data 2B60.

In a step s40.5C(a), the electronic building project administration computer system 200 updates scope ID associated with each instance data item associated with a building project 201.

In a step s40.5C(b), the electronic building project administration computer system 200 confirms that the scope ID associated with each instance data item associated with a building project 201 includes non-zero values for at least the material element category 302, CSI division number 303, scope designator 304, type designator 305, and specification category number 306.

In embodiments, all instance data items 2B50 of the same type have the same scope ID.

In a step s40.6C(a), the electronic building project administration computer system 200 generates an electronic certification query requesting certification of the instance data items 2B50 and existence objects data 2B60 when it is confirmed that each instance data item 2B50 includes non-zero values for at least the material element category 302, CSI division number 303, scope designator 304, type designator 305, and specification category number 306 for LOD 3.

In a step s40.6C(b), the electronic building project administration computer system 200 transmits the electronic certification query to each relevant stakeholder device requesting certification.

In embodiments, relevant stakeholders verify and review the certification query via their stakeholder devices.

In a step s40.6C(c), the electronic building project administration computer system 200 receives a certification message from each relevant stakeholder device and certifies LOD 3.

In a step s40.6C(d), the electronic building project administration computer system 200 stores instance data items 2B50, existence objects data 2B60, and scope ID in an immutable form when the certification message from each stakeholder device confirms certification.

The process described above in connection with FIG. 4C may be performed by a computer system that is programmed to perform the process described in connection with FIG. 4C.

FIG. 4D is an exemplary process flow of the steps used by the electronic building project administration computer system 200 to update a first building project in accordance with exemplary embodiments of the present invention. The steps set forth in the process flow are illustrative of the various steps in the building project administration process. The steps are being described here in the order of appearance in FIG. 4D, but during an actual building project administration process some steps may occur simultaneously or in a different order.

In a step s40.1D, building project platform database 2B1 comprising the stakeholder information 2B29, element data 2B20, material data 2B22, specification data 2B24, requirement data 2B25, and procurement data 2B26, instance data items 2B50, and existence objects data 2B60 from LOD 3 is provided. Stakeholder information 2B29, in embodiments, may be associated with each stakeholder of a first subgroup of stakeholders, second subgroup of stakeholders or third subgroup of stakeholders of a plurality of stakeholders associated with the first building project. In embodiments, stakeholder information 2B29 includes the same types of information discussed above with respect to FIGS. 4B and 4C.

Element data 2B20, in embodiments, may be associated with each instance data item of a plurality of instance data items 2B50 associated with the first project. The element data 2B20 includes the same types of information discussed above with respect to FIGS. 4B and 4C and may be provided by a first responsible stakeholder of the first subgroup of stakeholders, second subgroup of stakeholders or third group of stakeholders.

Material data 2B22, in embodiments, may be associated with each instance data item of the plurality of instance data items 2B50 associated with the first building project. The material data 2B22 includes the same types of information discussed above with respect to FIGS. 4B and 4C and may be provided by a second responsible stakeholder of the first subgroup of stakeholders, second subgroup of stakeholders or third group of stakeholders.

Specification data 2B24, in embodiments, may be associated with each instance data item of the plurality of instance data items 2B50 associated with the first building project. The material data 2B24 includes the same types of information discussed above with respect to FIGS. 4B and 4C and may be provided by a third responsible stakeholder of the first subgroup of stakeholders, second subgroup of stakeholders or third group of stakeholders.

Requirement data 2B25, in embodiments, may be associated with each instance data item of the plurality of instance data items 2B50 associated with the first building project and includes the same types of information discussed above with respect to FIGS. 4B and 4C and may be provided by a fourth responsible stakeholder of the first subgroup of stakeholders, second subgroup of stakeholders or third group of stakeholders.

Procurement data 2B26, in embodiments, may be associated with the procurement of each instance data item of the plurality of instance data items 2B50. The procurement data 2B26 includes the same types of information discussed above with respect to FIGS. 4B and 4C and may be provided by a fifth responsible stakeholder of the first subgroup of stakeholders, second subgroup of stakeholders or third group of stakeholders.

The plurality of instance data items 2B50 may be associated with the first building project and include the same types of information and associations discussed above with respect to FIGS. 4b and 4C. The instance data items may be provided by one or more stakeholders of the first subgroup of stakeholders, second subgroup of stakeholders or third group of stakeholders.

Existence objects data 2B60 (e.g. existence information) may include information associated with each existence object of a plurality of existence objects specified in an electronic computer model associated with the first building project as noted above.

In embodiments, building project platform database 2B1 may be one or more databases.

In embodiments, all instance data items 2B50 of the same type have the same scope ID.

In a step s40.2D, the electronic building project administration computer system 200 receives from at least one stakeholder from a fourth subgroup of stakeholders associated with the first building project, supply information associated with at least one instance data item. The fourth subgroup of stakeholders may include stakeholders other than those in the first subgroup of stakeholders, second subgroup of stakeholders and third subgroup of stakeholders, however, there may be overlap.

In embodiments, the supply information may include supplier information.

In embodiments, the supply information may include a product price based on procurement data 2B26 related to the at least one instance data item 2B50.

In embodiments, the supply information may include a service price based on procurement data 2B26 related to the at least one instance data item 2B50.

In embodiments, the supply information may include a product price and a service price based on procurement data 2B26 related to the at least one instance data item 2B50.

In a step s40.3D-1, the electronic building project administration computer system 200 validates the supply information.

In embodiments, the electronic building project administration computer system 200 confirms that that the supply information corresponds to procurement data 2B26 related to at least one instance data item 2B50, to ensure conformity.

In a step s40.3D-2(a), in embodiments, the electronic building project administration computer system 200 generates an electronic alert signal when the supply information does not correspond to the procurement data 2B26 related to the at least one instance data item 2B50.

In a step s40.3D-2(b), in embodiments, the electronic building project administration computer system 200 transmits the electronic alert signal of inconsistences to all relevant stakeholder devices.

In a step s40.3D-2(c), in embodiments, stakeholders identified by the electronic building project administration computer system 200 as relevant to the inconsistent mapping determined in step s40.3D-1, negotiate via the electronic building project administration computer system 200, or externally, to name a few, to fix inconsistencies so that each good information does corresponds to the procurement data 2B26 related to the at least one instance data item 2B50.

In a step s40.4D(a), in embodiments, the electronic building project administration computer system 200 receives updated instance data items 2B50 from stakeholder devices.

In a step s40.4D(b), in embodiments, the electronic building project administration computer system 200 receives updated supply information from stakeholder devices.

In a step s40.4D(c), in embodiments, the electronic building project administration computer system 200 receives updated procurement data 2B26 related to at least one instance data item 2B50 from stakeholder devices.

In embodiments, the electronic building project administration computer system 200 then reassesses the good information in accordance with step s40.3D-1 until the supply information corresponds to procurement data 2B26 related to at least one instance data item 2B50.

In embodiments, steps s40.2D-s40.4D(c) is repeated for each instance data item 2B50.

In a step s40.5D, the electronic building project administration computer system 200 stores supply information related to each instance data item 2B50 in the building project platform database 2B1.

In embodiments, the building project platform database 2B1 may be one or more databases.

In a step s40.6D(a), the electronic building project administration computer system 200 receives a selection message from a stakeholder device including a selection of respective supply information related to a respective instance data item 2B50.

In a step s40.6D(b), the electronic building project administration computer system 200 generates a management bid comprising supply information related to a respective instance data item 2B50, to name a few.

In a step s40.6D(c), the electronic building project administration computer system 200 transmits the management bid to an owner device 150.

In embodiments, owner verifies and reviews the management bid for LOD 4 via owner device 150.

In a step s40.6D(d), the electronic building project administration computer system 200 receives an acceptance message from owner device 150 indicating acceptance of the management bid and certifying.

In a step s40.6D(e), the electronic building project administration computer system 200 stores instance data items 2B50, existence objects data 2B60, scope ID, the management bid in an immutable form.

The process described above in connection with FIG. 4D may be performed by a computer system that is programmed to perform the process described in connection with FIG. 4D.

Figure 4H:
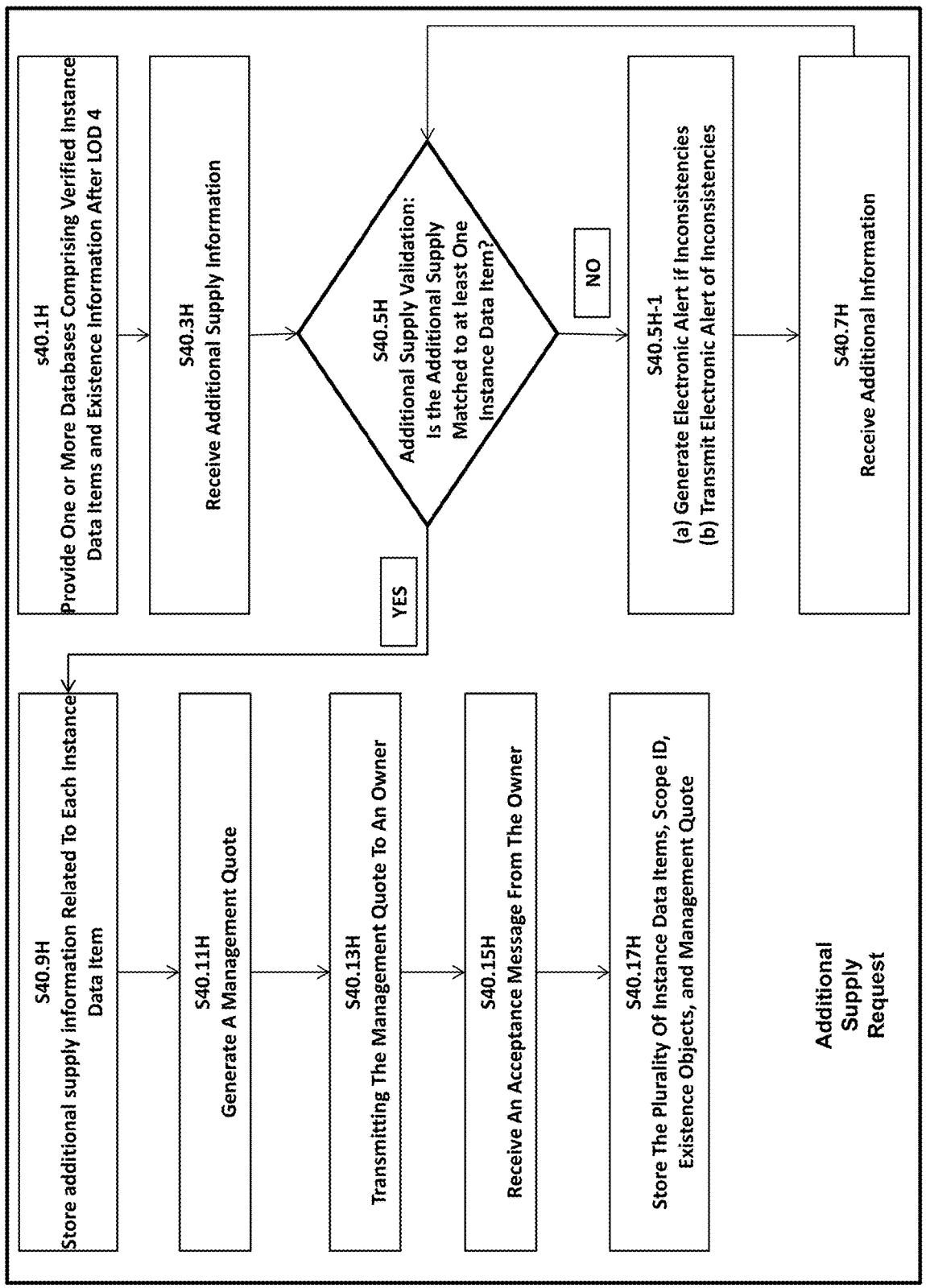

The process of FIG. 4F may continue with the process of FIG. 4H, where at a step s40.1H, one or more databases comprising verified instance data items and existence information after LOD 4 are provided. At a step s40.3H, the building project administration computer system 200 receives additional supply information associated with at least one instance data item. In embodiments, the additional supply information is received from at least one stakeholder from the fourth subgroup of stakeholders associated with the first building project. In embodiments, the supply information includes supplier information. In embodiments, the supplier information includes a good price based on procurement information related to the at least one instance data item. In embodiments, the supply information includes a service price based on procurement information related to the at least one instance data item. In embodiments, the supply information includes a good price and a service price based on procurement information related to the at least one data instance item.

At a step s40.5H, the building project administration computer system 200 validates whether the additional supply information corresponds to the at least one instance data item by confirming that the additional good information corresponds to procurement information related to the at least one instance data item.

If the additional supply information does not correspond to the at least one instance data item, at a step s40.5H-1(a), the building project administration computer system 200 generates an electronic alert signal. After the signal has been generated, at a step s40.5H-1(b), the building project administration computer system 200 transmits the electronic alert signal to the at least one stakeholder, the fourth subgroup of stakeholders, the first subgroup of stakeholders, the second subgroup of stakeholders, and the third subgroup of stakeholders.

After the electronic alert signal is transmitted, at a step s40.7H, the building project administration computer system 200 receives additional information. The additional information, in embodiments, may include at least one of:

updated instance data item information, updated advanced supply information, and/or updated procurement information related to the at least one instance data item.

In embodiments, steps s40.3H through s40.7H are repeated until no electronic alert signal is generated (e.g. when the additional supply information corresponds to at least one instance data item).

Once the additional supply information has been validated, the building project administration computer system 200, at a step s40.9H, stores additional supply information related to each instance data item of the plurality of instance data items 2B50 in the electronic building project databases.

At a step, s40.11H, the building project administration computer system 200 receives a second selection message from at least one stakeholder of the first subgroup of stakeholders, the second subgroup of stakeholders, or the third subgroup of stakeholders. In embodiments, the second selection message includes a selection of respective additional supply information related to the respective instance data item.

At a step s40.13H, the building project administration computer system 200 generates a management bid. The management bid, in embodiments, includes at least the additional respective supply information and the related respective instance data item.

At a step s40.15H, the building project administration computer system 200 transmits the management bid to an owner included in the first subgroup of stakeholders.

At a step s40.17H, the building project administration computer system 200 receives an acceptance message from the owner. The acceptance message, in embodiments, may indicate an acceptance of the management bid. In embodiments, the building project administration computer system 200 may receive a rejection message from the owner. The rejection message may indicate that the owner would like a different price, goods, and/or services related to the additional supply information.

At a step s40.19H, the building project administration computer system 200 stores, in an immutable form, the plurality of instance data items 2B50 along with the respective scope ID of each instance data item, existence objects, and the management bid.

The process described above in connection with FIG. 4H may be performed by a computer system that is programmed to perform the process described in connection with FIG. 4H.

FIG. 4E is an exemplary process flow of steps used by the building project administration computer system 200 to update a first building project in accordance with exemplary embodiments of the present invention. More specifically, FIG. 4E illustrate exemplary steps used to update a first building project. The steps set forth in the process flow are illustrative of the various steps in the building project administration process. The steps are being described here in the order of appearance in FIG. 4E, but during an actual building project administration process some steps may occur simultaneously or in a different order.

In a step s40.1E, the building project platform database 2B1 comprising the stakeholder information 2B29, element data 2B20, material data 2B22, specification data 2B24, requirement data 2B25, and procurement data 2B26, instance data items 2B50, existence objects data 2B60, good information, and management bid information from LOD 4 is provided.

Stakeholder information 2B29, in embodiments, may be associated with each stakeholder of a first subgroup of stakeholders, second subgroup of stakeholders, third group of stakeholders or fourth group of stakeholders of a plurality of stakeholders associated with the first building project. The Stakeholder information 2B29 otherwise includes the types of information described above with reference to FIGS. 4B, 4C and 4D.

Element data 2B20, in embodiments, may be associated with each instance data item of a plurality of instance data items 2B50 associated with the first project and otherwise includes the same types of information discussed above with respect to FIGS. 4B, 4C and 4D. The first responsible user may be from the first subgroup of stakeholders, the second subgroup of stakeholders, the third subgroup of stakeholders or the fourth subgroup of stakeholders.

Material data 2B22, in embodiments, may be associated with each instance data item of the plurality of instance data items 2B50 associated with the first building project and otherwise includes the same types of information discussed above with respect to FIGS. 4B, 4C and 4D. The second responsible user may be from the first subgroup of stakeholders, the second subgroup of stakeholders, the third subgroup of stakeholders or the fourth subgroup of stakeholders.

Specification data 2B24, in embodiments, may be associated with each instance data item of the plurality of instance data items 2B50 associated with the first building project and otherwise includes the same types of information discussed above with respect to FIGS. 4B, 4C and 4D. The third responsible user may be from the first subgroup of stakeholders, the second subgroup of stakeholders, the third subgroup of stakeholders or the fourth subgroup of stakeholders.

Requirement data 2B25 includes the same types of information discussed above with respect to FIGS. 4B, 4C and 4D. The further responsible user may be from the first subgroup of stakeholders, the second subgroup of stakeholders, the third subgroup of stakeholders or the fourth subgroup of stakeholders.

Procurement data 2B26, includes the same types of information discussed above with respect to FIGS. 4B, 4C and 4D. The further responsible user may be from the first subgroup of stakeholders, the second subgroup of stakeholders, the third subgroup of stakeholders or the fourth subgroup of stakeholders.

The plurality of instance data items 2B50, in embodiments, may be associated with the first building project and includes the same types of data and associations discussed above with respect to FIGS. 4B, 4C and 4D. The one or more stakeholder that provides the data items may be from the first subgroup of stakeholders, the second subgroup of stakeholders, the third subgroup of stakeholders or the fourth subgroup of stakeholders.

In embodiments, each instance data item is associated with a scope ID including material element category indicator 302, CSI division number 303, material object category indicator 307, scope designator 304, type designator 305, and/or specification category number 308. A value of the scope ID includes the material element category indicator 302, CSI division number 303, material object category indicator 307, scope designator 304, type designator 305, and/or specification category number 308, depends on at least one of the element data 2B20, material data 2B22, specification data 2B24, requirement data 2B25, and/or procurement data 2B26.

In embodiments, building project platform database 2B1 may be one or more databases.

In embodiments, the one or more building project platform database(s) 2B1 are relational databases.

In embodiments, all instance data items 2B50 of the same type have the same scope ID.

In a step s40.2E, the electronic building project administration computer system 200 receives from a second at least one stakeholder from a fifth subgroup of stakeholders associated with the first building project, a request for payment associated with at least one instance data item 2B50. The fifth subgroup of stakeholders may be different from the first subgroup of stakeholders, the second subgroup of stakeholders, the third subgroup of stakeholders or the fourth subgroup of stakeholders, however, their may be overlap between the subgroups.

In a step s40.3E, the electronic building project administration computer system 200 validates the request for payment.

In a step s40.3E(a), the electronic building project administration computer system 200 matches the request for payment information to the at least one instance data item 2B50 based on at least scope ID.

In a step s40.3E(b), the electronic building project administration computer system 200 determines an amount of work completed based on at least presence or absence of a corresponding existence objects data 2B60 in a building associated with a first building project 201.

In embodiments, the determination of amount of work completed may be based on information provided by one or more stakeholders of the first subgroup of stakeholders, the second subgroup of stakeholders, the third subgroup of stakeholders or the further subgroup of stakeholders.

In embodiments, the determination of amount of work completed may be based on information provided by one or more sensors in the building associated with the first building project 201.

In embodiments, each sensor of the one or more sensors is associated with a scope ID.

In a step s40.3E(c), the electronic building project administration computer system 200 generates a percentage value indicative of the amount of work done.

In a step s40.3E(e), the electronic building project administration computer system 200 transmits the percentage value to a managing stakeholder device responsible for at least one instance data item 2B50.

In a step s40.4E(a), the electronic building project administration computer system 200 receives payment instructions from the managing stakeholder device responsible for at least one instance data item 2B50 authorizing payment.

In a step s40.4E(b), the electronic building project administration computer system 200 executes the payment instructions.

In a step s40.4E(c), the electronic building project administration computer system 200 receives receipt information confirming receipt of payment.

In a step s40.5E(a), the electronic building project administration computer system 200 generates an electronic certification query requesting certification of the instance data items 2B50, existence objects data 2B60, request for payment information, percentage value information, and receipt information.

In a step s40.5E(b), the electronic building project administration computer system 200 transmits the electronic certification query to each stakeholder device requesting certification.

In embodiments, relevant stakeholders verify and review the certification query via their stakeholder devices.

In a step s40.5E(c), the electronic building project administration computer system 200 receives a certification message from each stakeholder device and certifies.

In a step s40.5E(d), the electronic building project administration computer system 200 stores, in an immutable form, the plurality of instance data items 2B50 along with the respective scope id of each instance data item 2B50 and object existence information related to the existence data objects 2B60 as well as the request for payment, percentage value and receipt information related thereto.

The process described above in connection with FIG. 4E may be performed by a computer system that is programmed to perform the process described in connection with FIG. 4E.

FIG. 4F is an exemplary process flow of the building project structure component used by the electronic building project administration computer system 200 to manage a building associated with a building project in accordance with exemplary embodiments of the present invention. The steps set forth in the process flow are illustrative of the various steps in the building project administration process. The steps are being described here in the order of appearance in FIG. 4F, but during an actual building project administration process some steps may occur simultaneously or in a different order.

In a step s40.1F, the electronic building project administration computer system 200 provides the building project platform database 2B1 comprising the stakeholder information 2B29, element data 2B20, material data 2B22, specification data 2B24, requirement data 2B25, and procurement data 2B26, instance data items 2B50, and existence objects data 2B60 from LOD 5.

Stakeholder information 2B29, in embodiments, may be associated with each stakeholder of a first subgroup of stakeholders, a second subgroup of stakeholders, a third subgroup of stakeholders, a fourth subgroup of stakeholders or a fifth group of stakeholders of a plurality of stakeholders associated with the first building project. Otherwise the stakeholder information includes the same types of information described above with respect to FIGS. 4B, 4C, 4D and 4E.

Element data 2B20, in embodiments, may be associated with each instance data item of a plurality of instance data items 2B50 associated with the first project and includes the same types of information described above with respect to FIGS. 4B, 4C, 4D and 4E. The first responsible stakeholder may be from the first subgroup of stakeholders, second subgroup of stakeholders, third subgroup of stakeholders, fourth subgroup of stakeholders or fifth group of stakeholders.

Material data 2B22, in embodiments, may be associated with each instance data item of the plurality of instance data items 2B50 associated with the first building project and includes the same types of information described above with respect to FIGS. 4B, 4C, 4D and 4E. The second responsible stakeholder may be from the first subgroup of stakeholders, second subgroup of stakeholders, third subgroup of stakeholders, fourth subgroup of stakeholders or fifth group of stakeholders.

Specification data 2B24, in embodiments, may be associated with each instance data item of the plurality of instance data items 2B50 associated with the first building project and includes the same types of information described above with respect to FIGS. 4B, 4C, 4D and 4E. The third responsible stakeholder may be from the first subgroup of stakeholders, second subgroup of stakeholders, third subgroup of stakeholders, fourth subgroup of stakeholders or fifth group of stakeholders.

Requirement data 2B25, includes the same types of information described above with respect to FIGS. 4B, 4C, 4D and 4E. The fourth responsible stakeholder may be from the first subgroup of stakeholders, second subgroup of stakeholders, third subgroup of stakeholders, fourth subgroup of stakeholders or fifth group of stakeholders.

Procurement data 2B26, includes the same types of information described above with respect to FIGS. 4B, 4C, 4D and 4E. The fifth responsible stakeholder may be from the first subgroup of stakeholders, second subgroup of stakeholders, third subgroup of stakeholders, fourth subgroup of stakeholders or fifth group of stakeholders.

The plurality of instance data items 2B50, in embodiments, may be associated with the first building project and includes the same type of data and associations described above with respect to FIGS. 4B, 4C, 4D and 4E. The at least one responsible stakeholder that provides the instance data items 2B50 may be from the first subgroup of stakeholders, second subgroup of stakeholders, third subgroup of stakeholders, fourth subgroup of stakeholders or fifth group of stakeholders.

In embodiments, each instance data item is associated with a scope ID including material element category indicator 302, CSI division number 303, material object category indicator 307, scope designator 304, type designator 305, and/or specification category number 308. A value of the scope ID includes the material element category indicator 302, CSI division number 303, material object category indicator 307, scope designator 304, type designator 305, and/or specification category number 308, depends on at least one of the element data 2B20, material data 2B22, specification data 2B24, requirement data 2B25, and/or procurement data 2B26.

Existence objects data 2B60 (e.g. existence information) may include information associated with each existence object of a plurality of existence objects specified in an electronic computer model associated with the first building project.

In embodiments, building project platform database 2B1 may be one or more databases. In embodiments, the one or more building project platform database(s) 2B1 are relational databases. In embodiments, all instance data items 2B50 of the same type have the same scope ID.

In a step s40.2F, the electronic building project administration computer system 200 receives from a second at least one stakeholder device from a sixth subgroup of stakeholders associated with the first building project, a service request associated with at least one instance data item 2B50. In embodiments, the sixth subgroup of stakeholders comprises users of the building associated with the first building plan. In embodiments, the sixth subgroup of stakeholders comprises residents of the building based on the first building project. In embodiments, the sixth subgroup of stakeholders comprises employees of the building based on the first building project. In embodiments the sixth subgroup of users may include stakeholders that are also part of the first subgroup of users, second subgroup of users, third subgroup of users, fourth subgroup of users or fifth subgroup of users.

In embodiments, the service request is generated by sensors provided in the building based on the first building project.

In embodiments, the service request comprises a request for repair, replacement, and/or removal of an item in the building.

In a step s40.3F-1, the electronic building project administration computer system 200 validates the service request.

In embodiments, the electronic building project administration computer system 200 validates that that the service request is matched with at least one instance data item 2B50 based on at least the scope ID, to ensure conformity.

In a step s40.3F-2(a), in embodiments, the electronic building project administration computer system 200 generates an electronic alert signal when the service request does not match with a respective instance data item 2B50.

In a step s40.3F-2(b), in embodiments, the electronic building project administration computer system 200 transmits the electronic alert signal of inconsistences to all relevant stakeholders. In embodiments, the electronic alert is transmitted to the second at least one stakeholder and the first subgroup of stakeholders, second subgroup of stakeholders, third group of stakeholders, fourth subgroup of stakeholders and fifth group of stakeholders.

In a step s40.3F-2(c), in embodiments, stakeholders identified by the electronic building project administration computer system 200 as relevant to the inconsistent matching determined in step s40.3F-1, negotiate via the electronic building project administration computer system 200, or externally, to name a few, to fix inconsistencies so that each service request matches with a respective instance data item 2B50.

In a step s40.4F(a), in embodiments, the electronic building project administration computer system 200 receives additional information including updated instance data items 2B50 from stakeholder devices.

In a step s40.4F(b), in embodiments, the electronic building project administration computer system 200 receives additional information including updated service request information from stakeholder devices.

In embodiments, the electronic building project administration computer system 200 then reassesses the service request in accordance with step s40.3F-1 until no alert signal is generated and the service request information matches with at least one instance data item 2B50. In embodiments, steps 40.4F-1 through 40.5F are repeated until no alert indicating inconsistencies is generated.

In a step s40.5F(a), the electronic building project administration computer system 200 generates service instructions.

In a step s40.5F(b), the electronic building project administration computer system 200 executes the service instructions.

In a step s40.5F(c), the electronic building project administration computer system 200 receives service receipt information confirming performance of service.

In a step s40.6F(a), the electronic building project administration computer system 200 generates an electronic certification query requesting certification of the instance data items 2B50, existence objects data 2B60, service request information, and service receipt information for LOD 6.

In a step s40.6F(b), the electronic building project administration computer system 200 transmits the electronic certification query to each relevant stakeholder requesting certification of LOD 6.

In embodiments, relevant stakeholders verify and review the certification query for LOD 6 via their stakeholder devices.

In a step s40.6F(c), the electronic building project administration computer system 200 receives a certification message from each relevant stakeholder and certifies LOD 6.

In a step s40.6F(d), the electronic building project administration computer system 200 stores in an immutable form, the plurality of instance data items 2B50 along with the respective scope id of each instance data item 2B50 and existence information related to the existence objects data 2B60 as well as the service request information and service receipt information.

The process described above in connection with FIG. 4F may be performed by a computer system that is programmed to perform the process described in connection with FIG. 4F.

In embodiments, the electronic building project administration computer system 200 functions as a closed network of trusted stakeholders (e.g., federated parties) interacting with the electronic building project administration computer system 200 through their stakeholder devices. The stakeholders, through their stakeholder devices, operate within a common meta-governance framework that creates a trust ecosystem. The stakeholders in the network join out of their respective commercial interests, and thereby have economic incentives to adopt the electronic building project administration computer system 200 meta-governance.

In embodiments, the electronic building project administration computer system 200 uses a trusted mechanism to create an immutable audit trail history and provide the practical framework for governance and enforcement necessary to uphold trust in the network.

In embodiments, the electronic building project administration computer system 200 can define project scope as derived from a plurality of project stakeholders' electronic inputs, input through the respective stakeholder devices. One technical advantage of certain embodiments of the present invention is that when implemented in accordance with the teachings herein, professional and financial risk can be mitigated.

In embodiments, the electronic building project administration computer system 200 extracts consistent, complete, and unalterable or difficult to alter data, as published on the respective immutable audit trail history.

The immutable audit trail as implemented by embodiments of the electronic building project administration computer system 200 addresses four technical problems with use of shared building project data heretofore encountered: (1) distribution of false and unreliable data; (2) counterfeit derivatives of project data in digital or published page format; (3) undisclosed peer to peer data exchanges and transactions; and (4) unauthorized and uncoordinated changes.

In embodiments, the electronic building project administration computer system 200 implements protocols that flag and prevent changes to data certified in a previous LOD, which was applied and managed by building project platform database 2B1. This mechanism exposes both undisclosed out-of-network peer-to-peer data exchanges and transactions, and unauthorized, uncoordinated changes to project scope between stakeholders. In embodiments, the electronic building project administration computer system 200 restricts change of project scope by governance only through use of its system. The change management protocol embodied in the electronic building project administration computer system 200, publicly notifies stakeholders of potential change via their respective stakeholder devices, initiates the change process, whereby the rationale and process by which consensus for the change is coordinated, achieved and memorialized. By way example, if certifying LOD 4 necessitates changes to the immutable audit trail history data certified in LOD 3, a new path on the audit trail history is added by the electronic building project administration computer system 200 to containing the previous LOD 3 certified immutable audit trail.

Figure 5A:
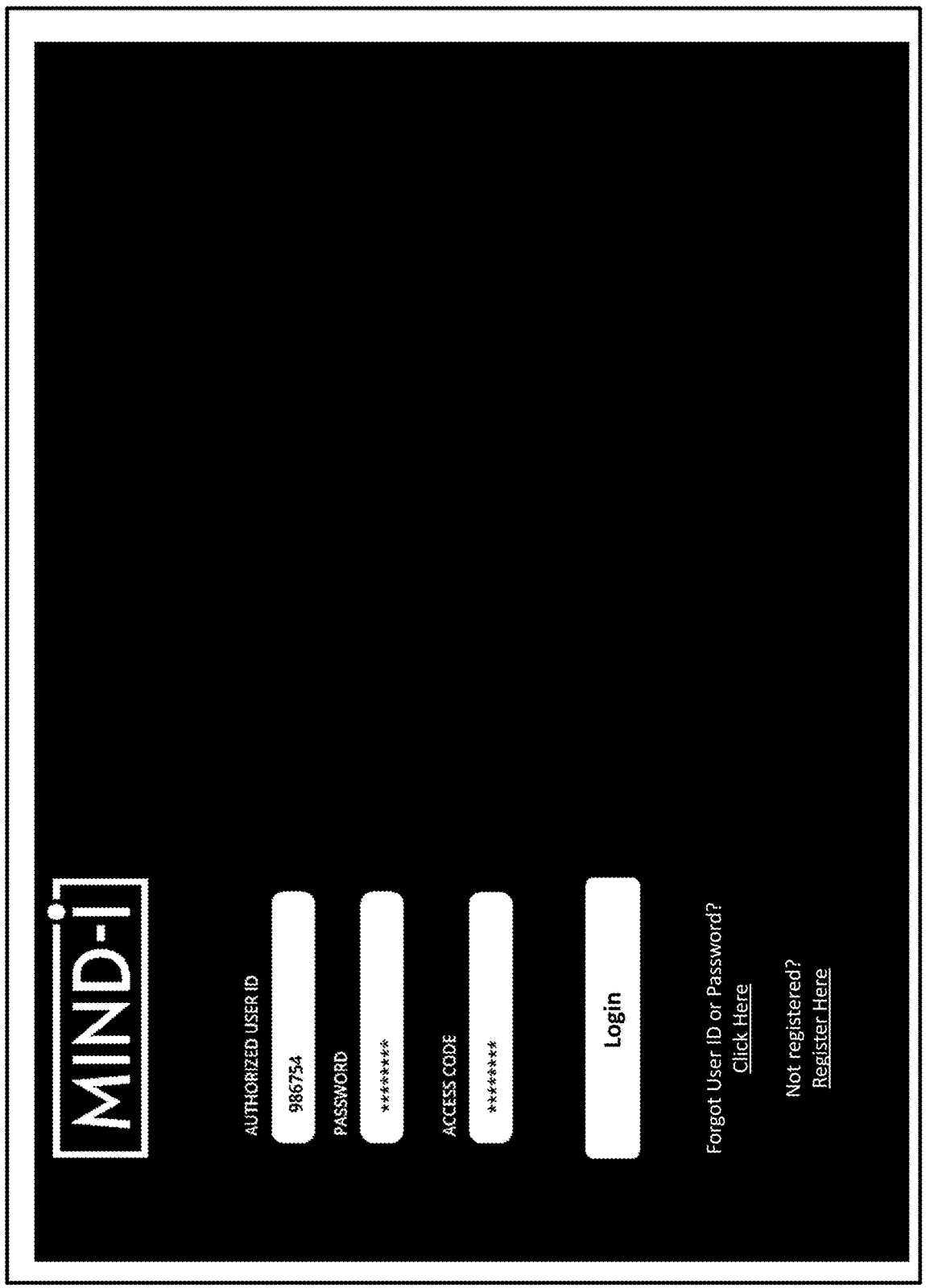
FIGS. 5A-V are exemplary diagrams of graphic user interfaces (GUIs) provided by the electronic building project administration computer system in accordance with embodiments of the present invention.
Figure 5C:
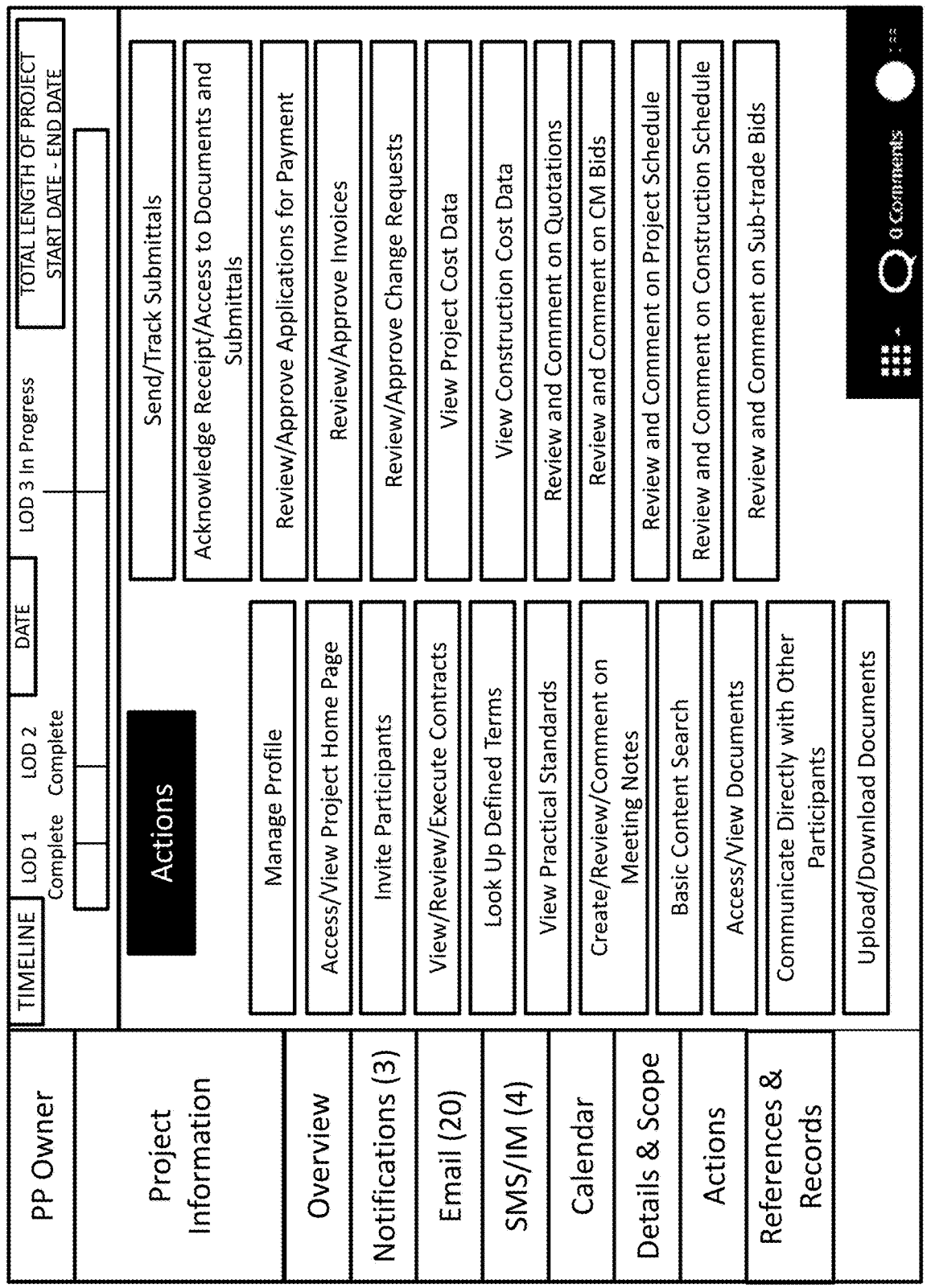
Figure 5F:
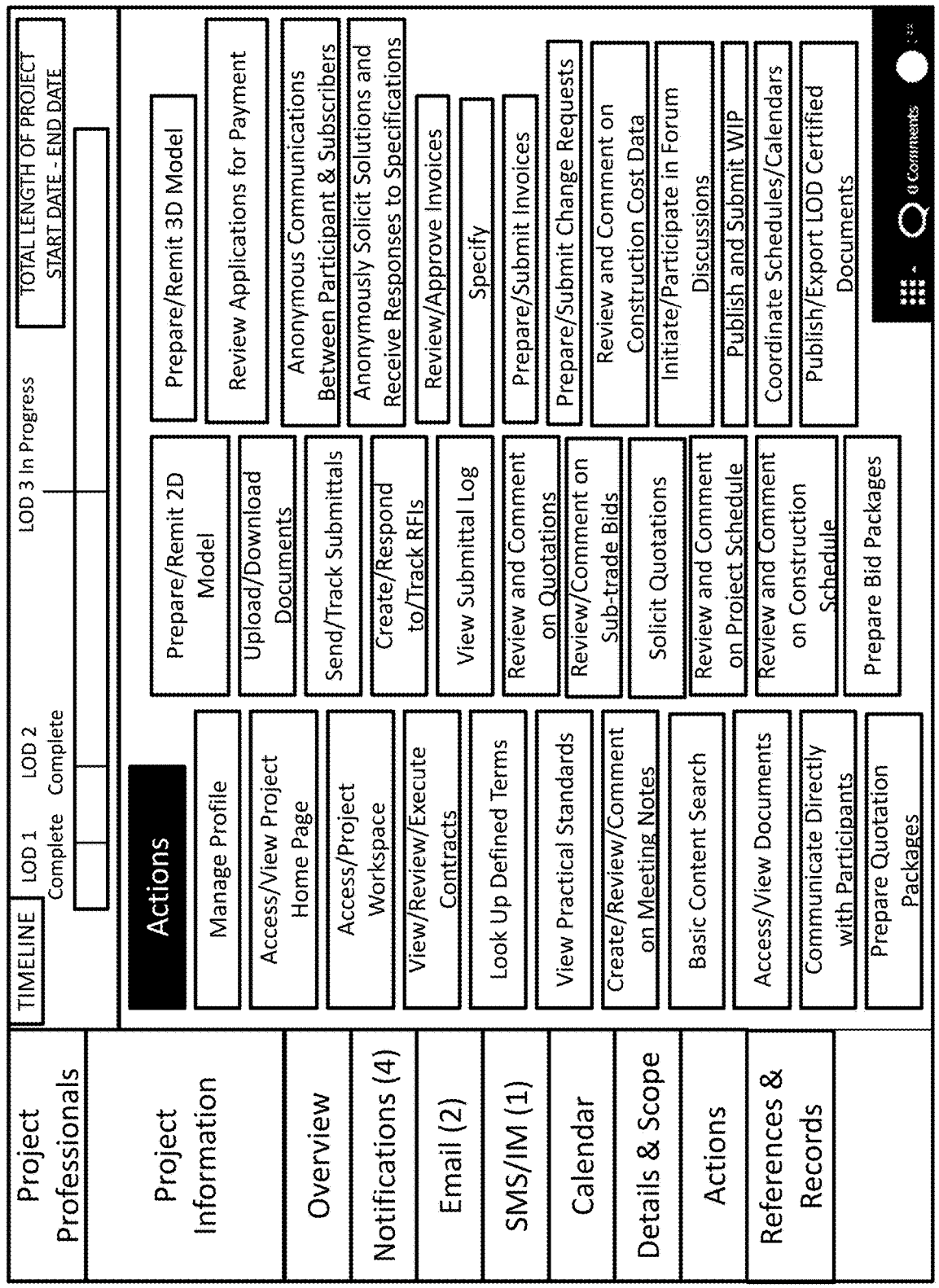
Figure 5H:
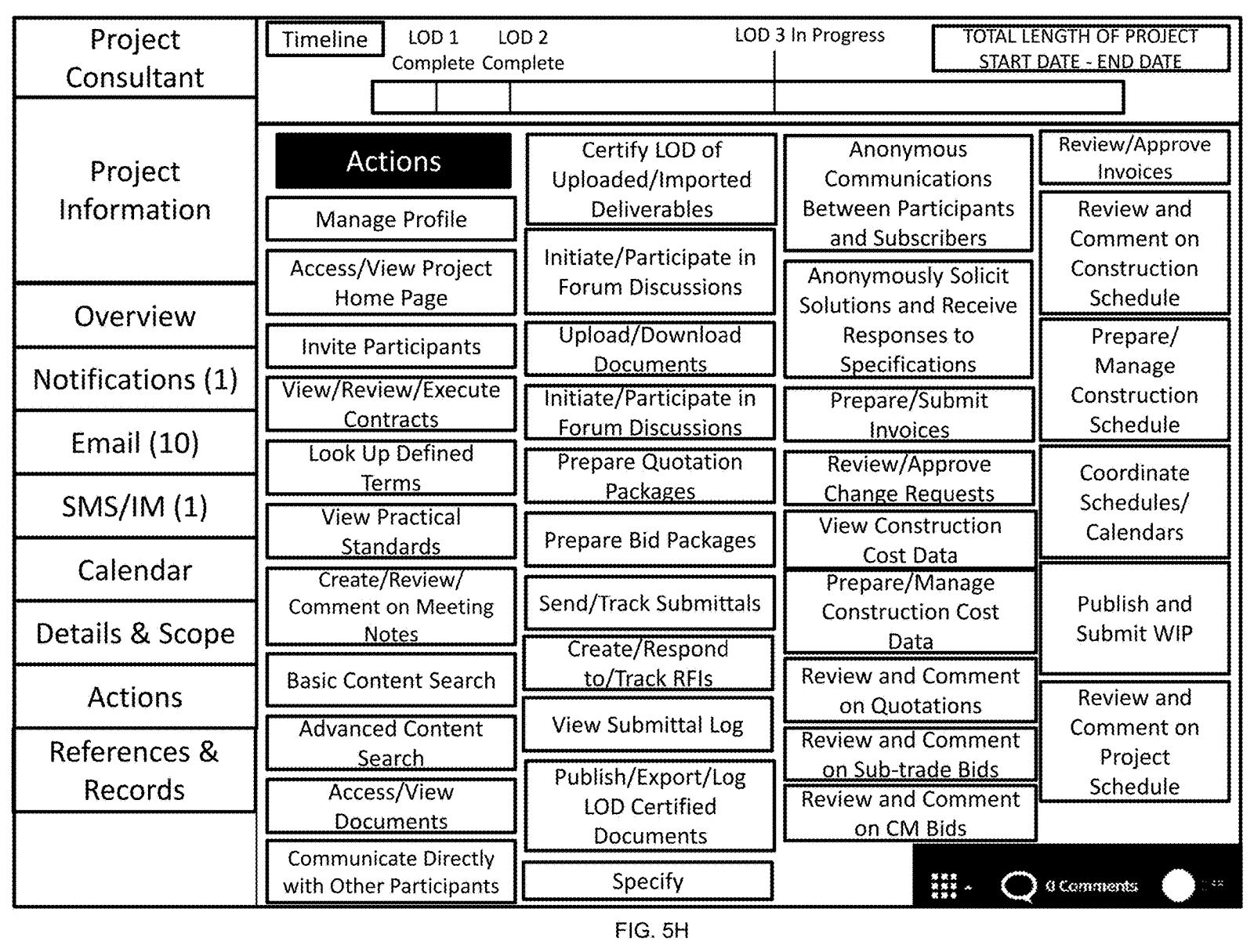
Figure 5J:
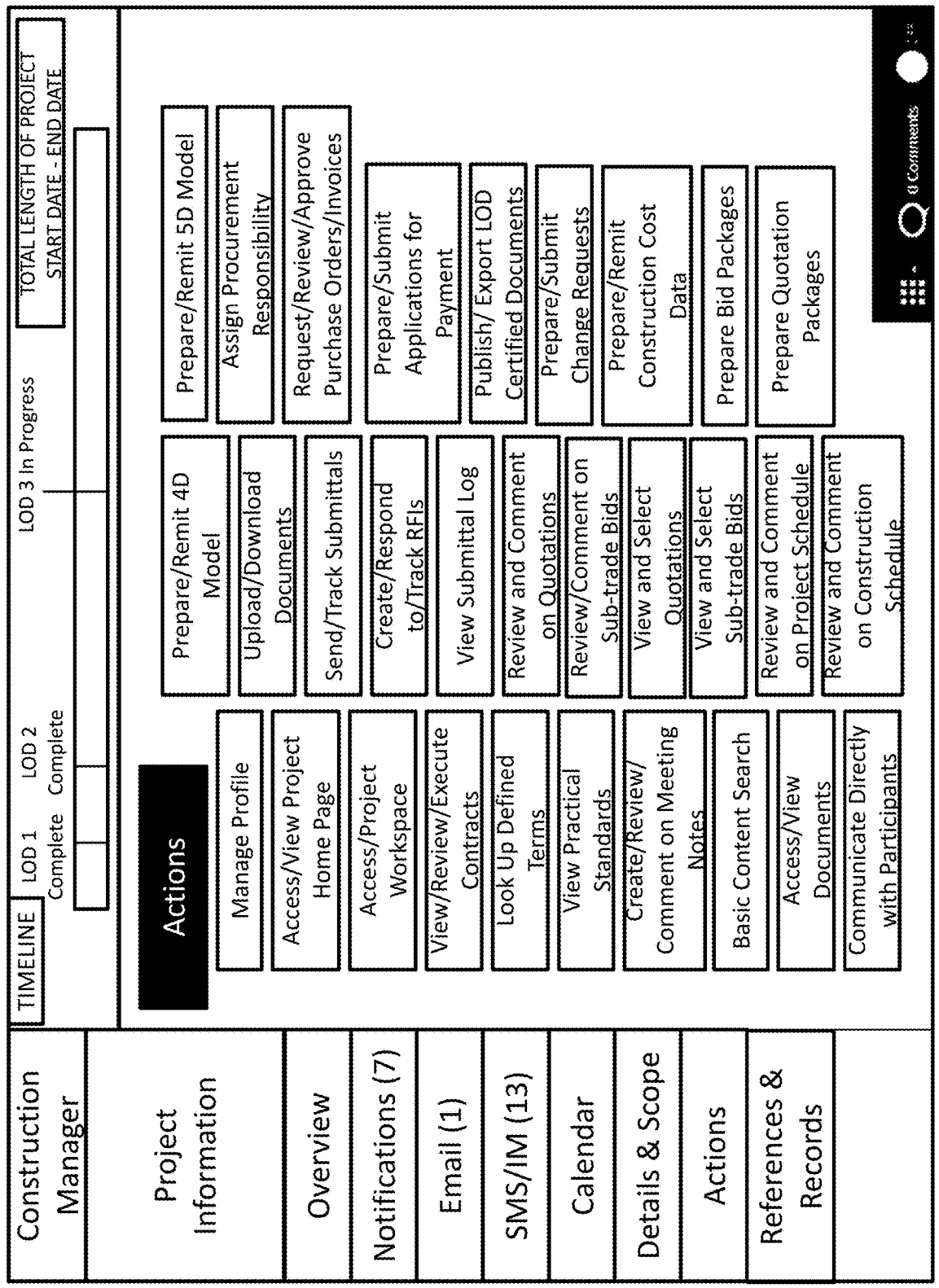
Figure 5L:
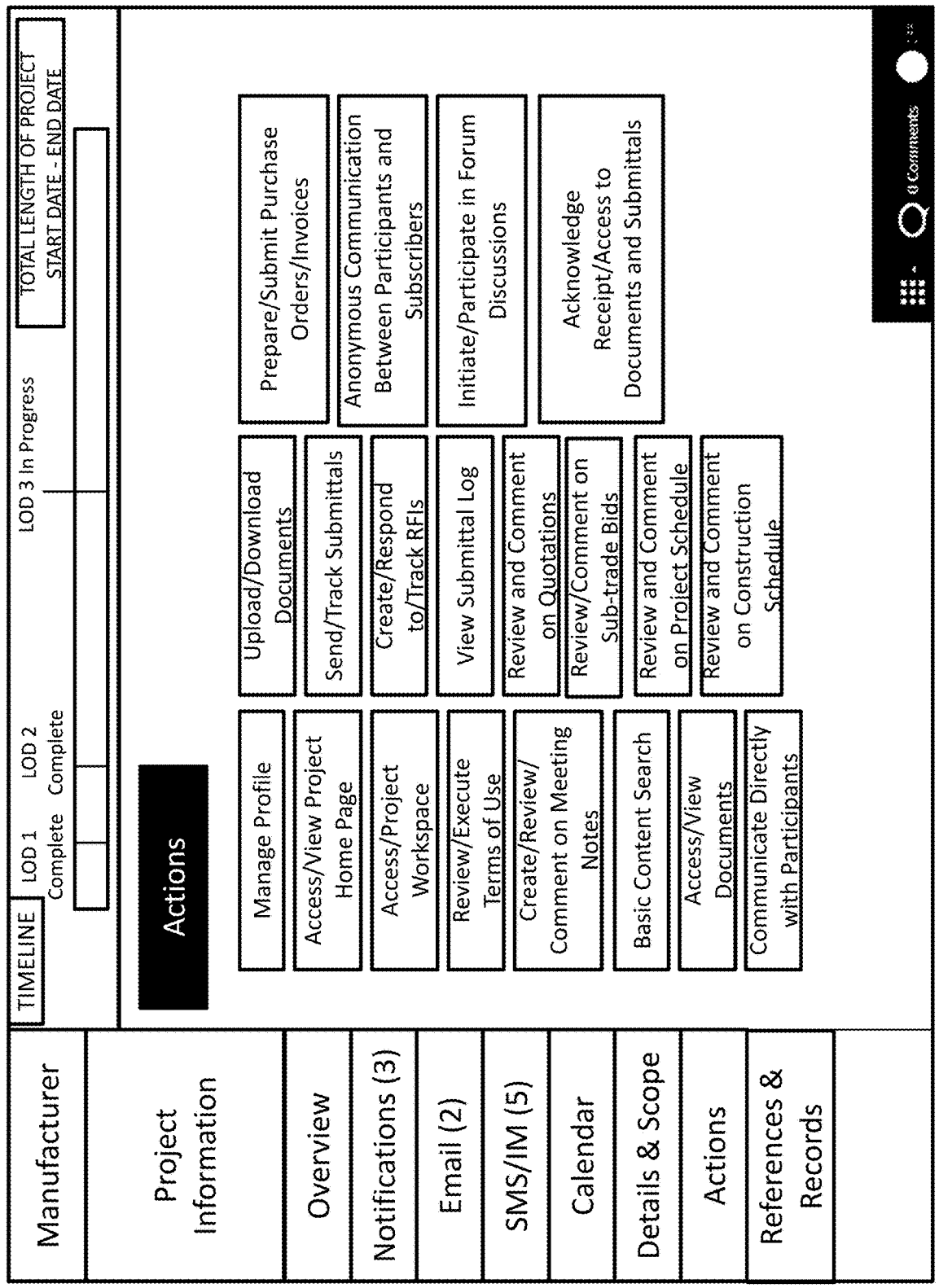
Figure 5O:
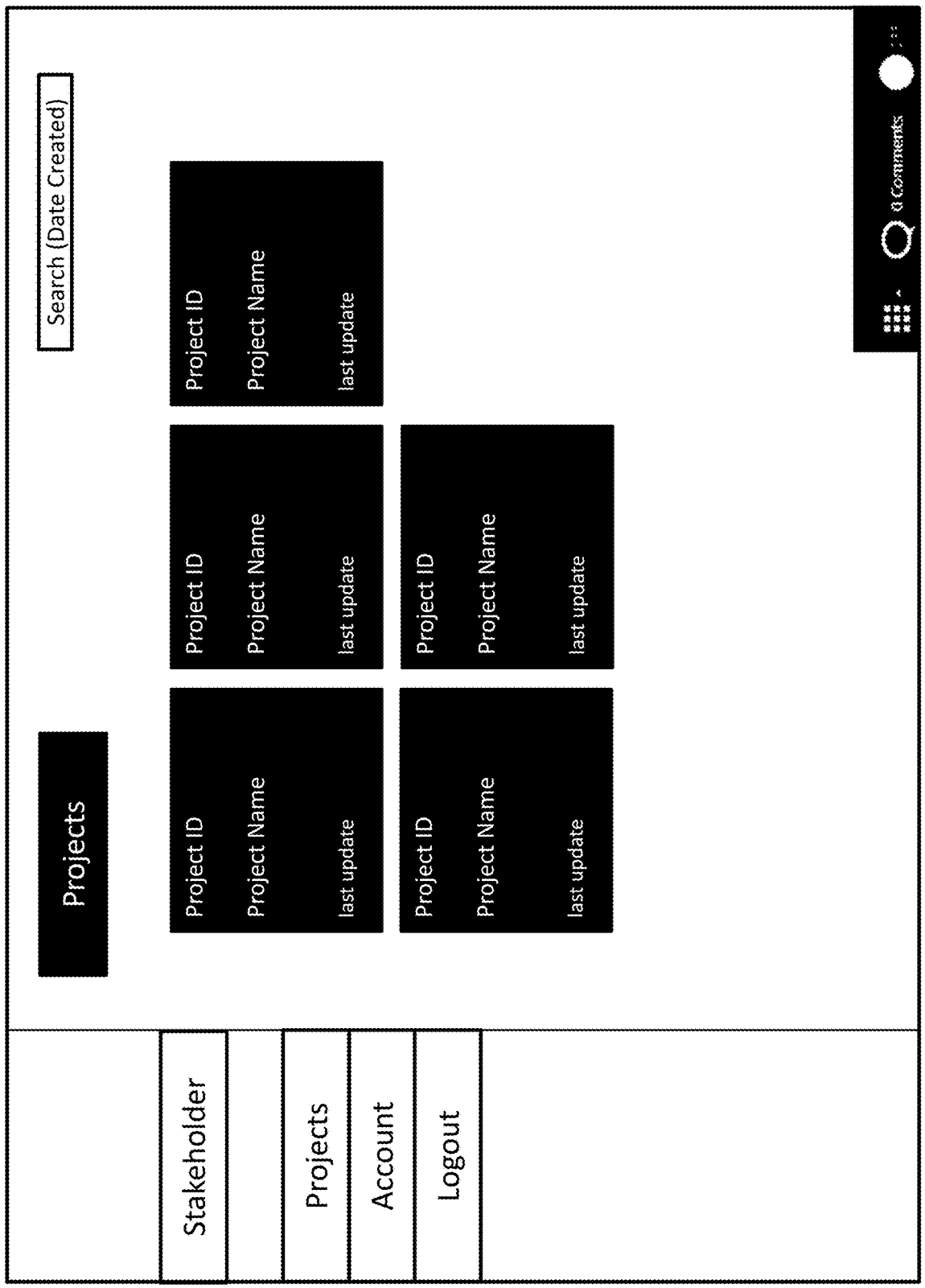
Figure 5P:
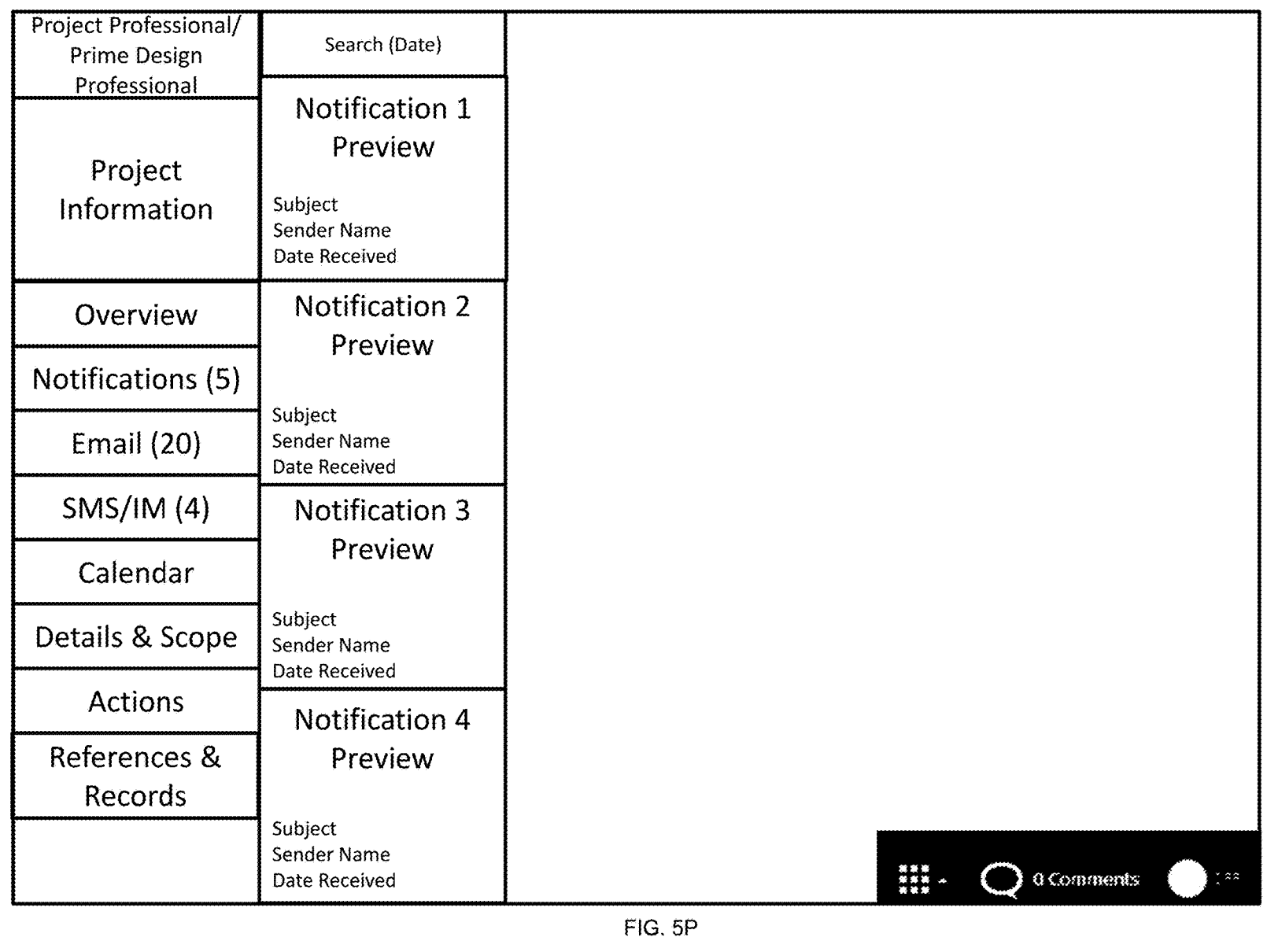
Figure 5Q:
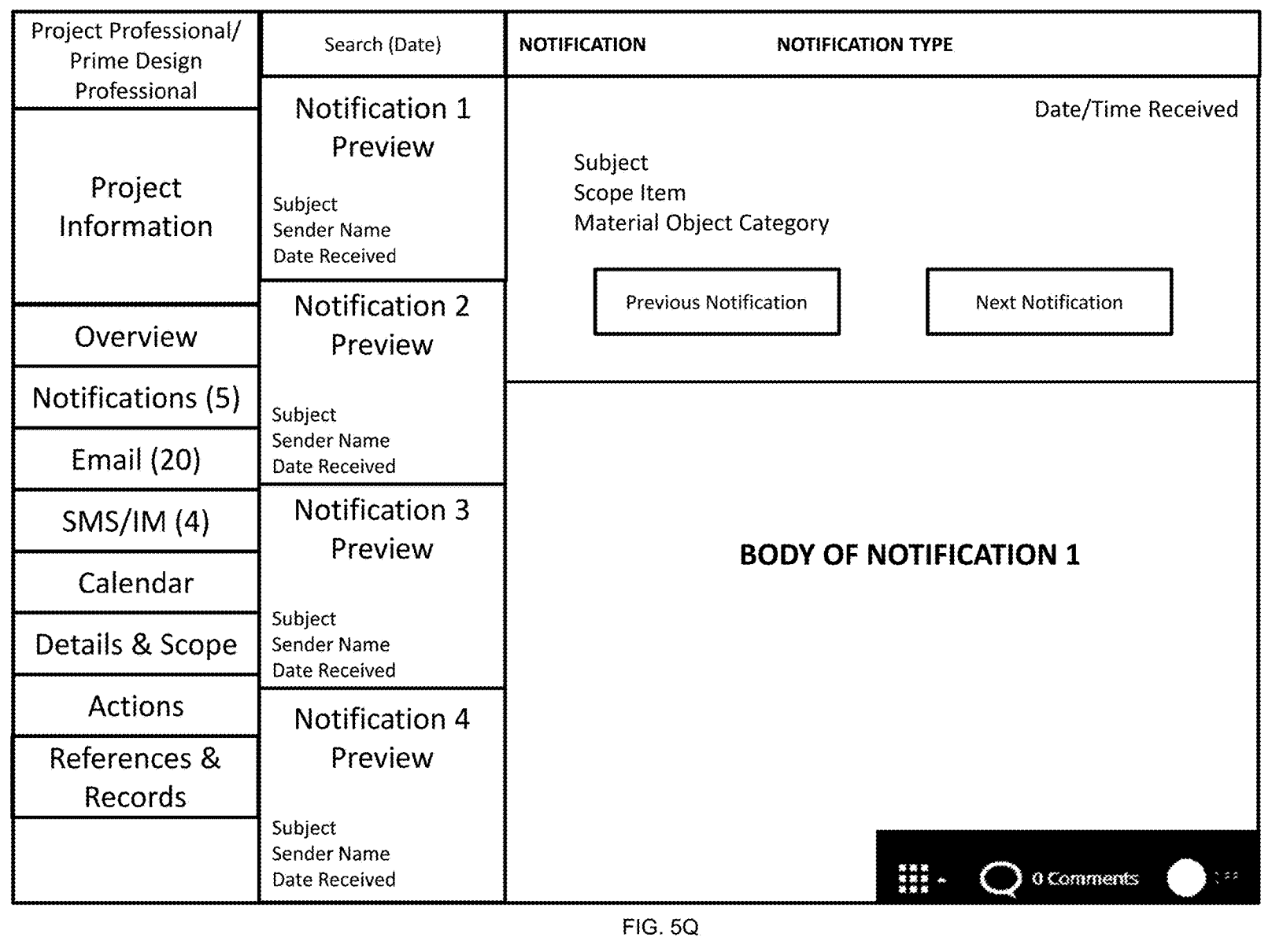
Figure 5S:
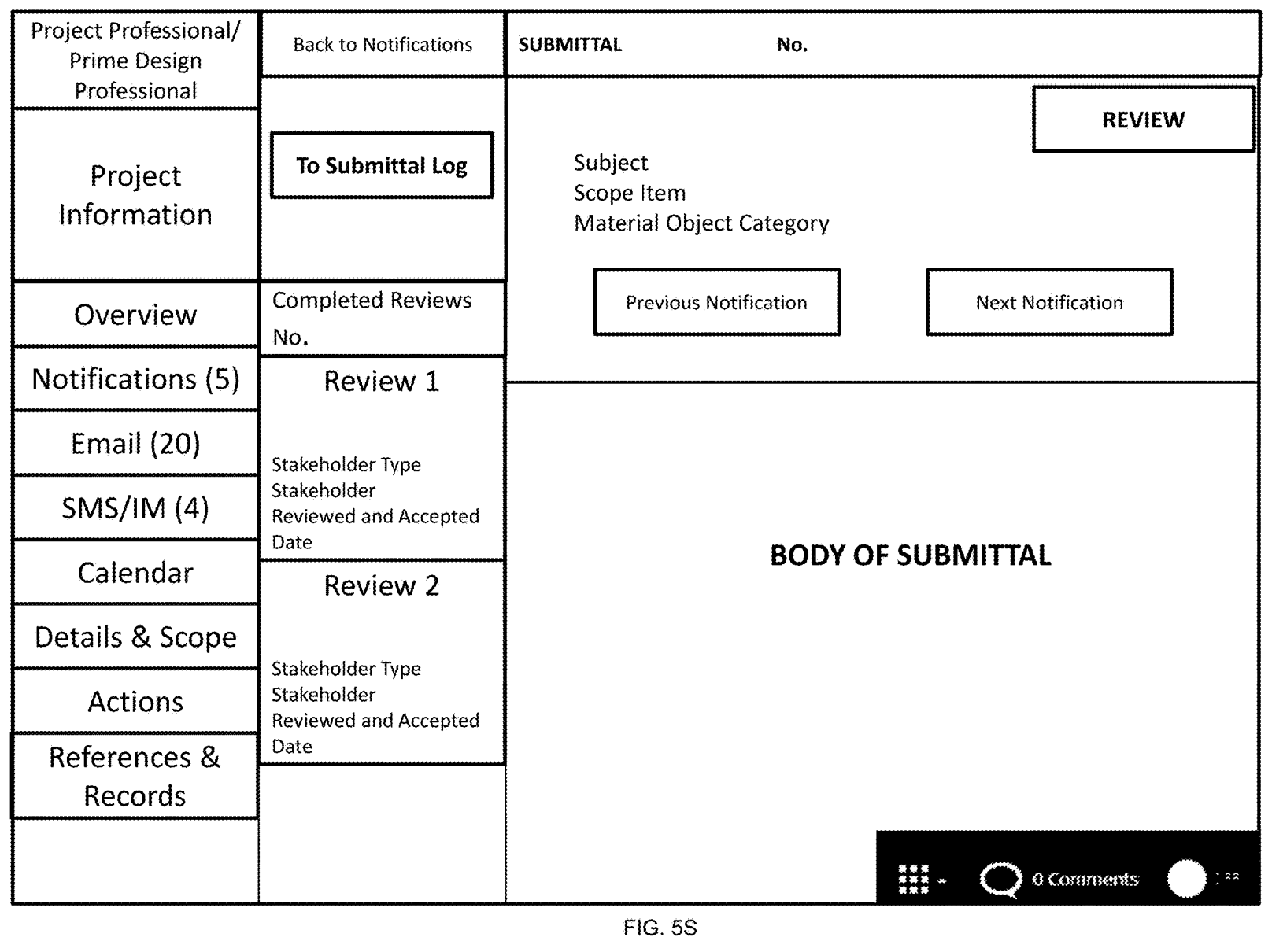
Figure 5T:
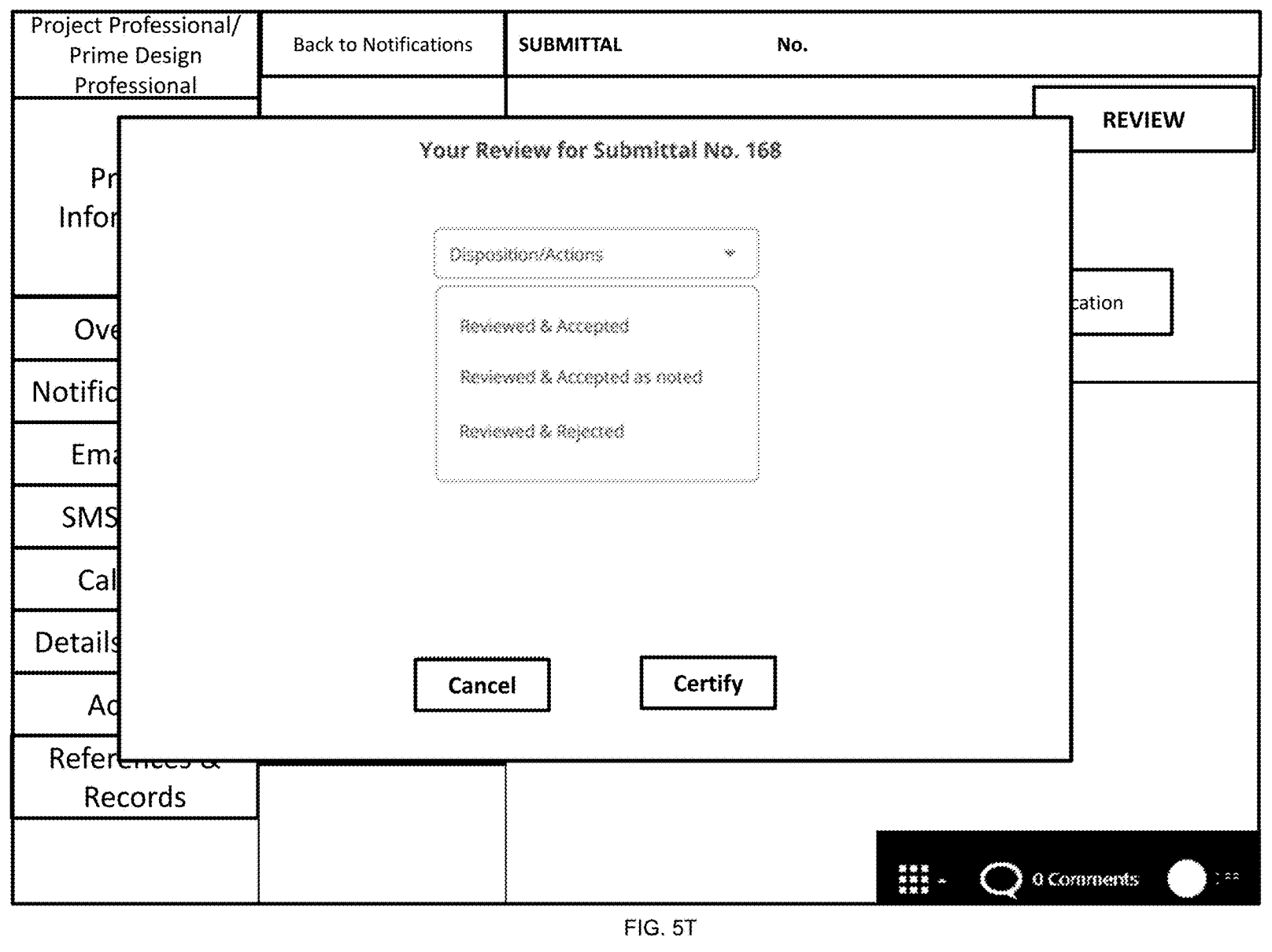
Figure 5U:
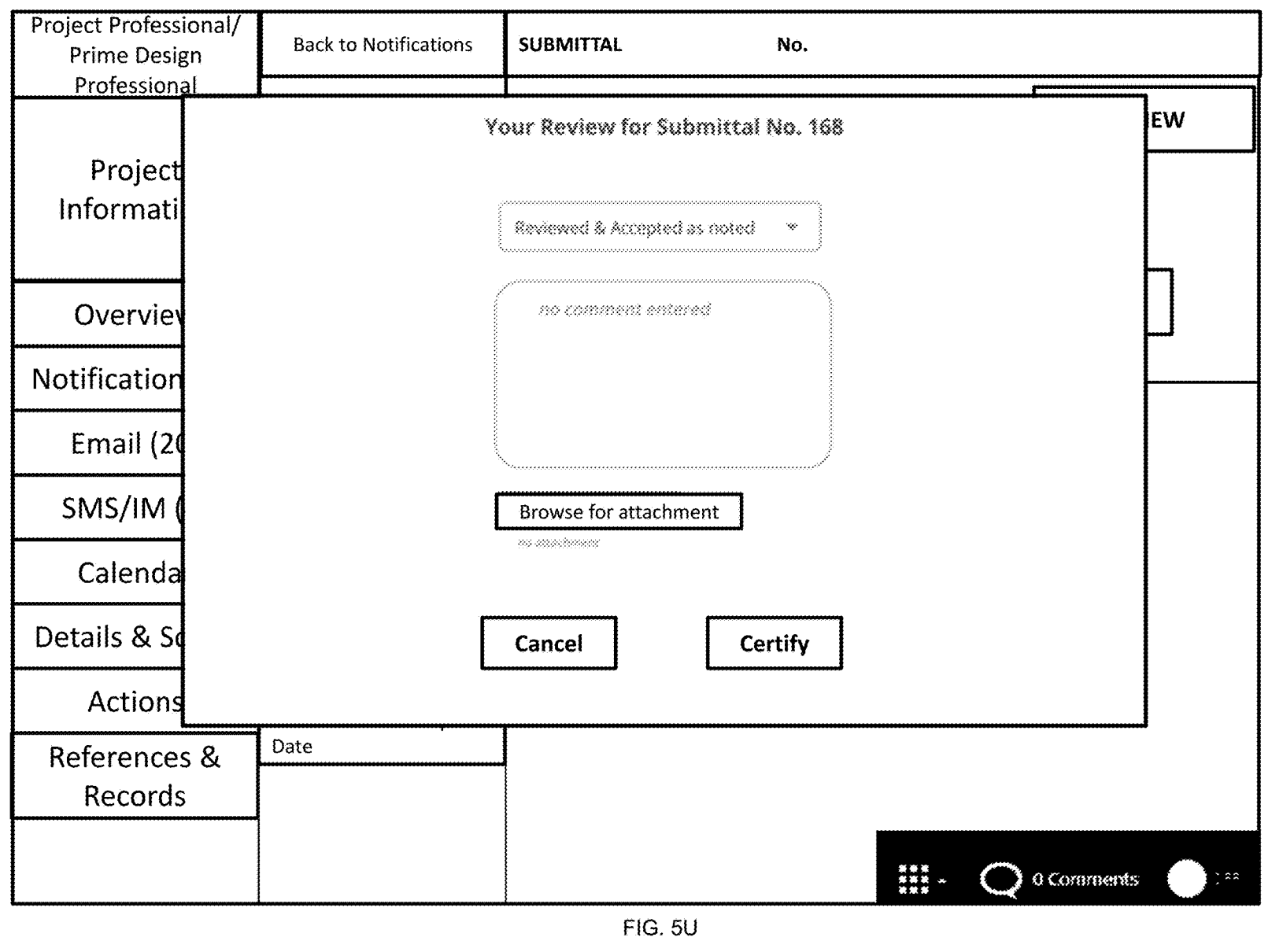
Figure 5V:
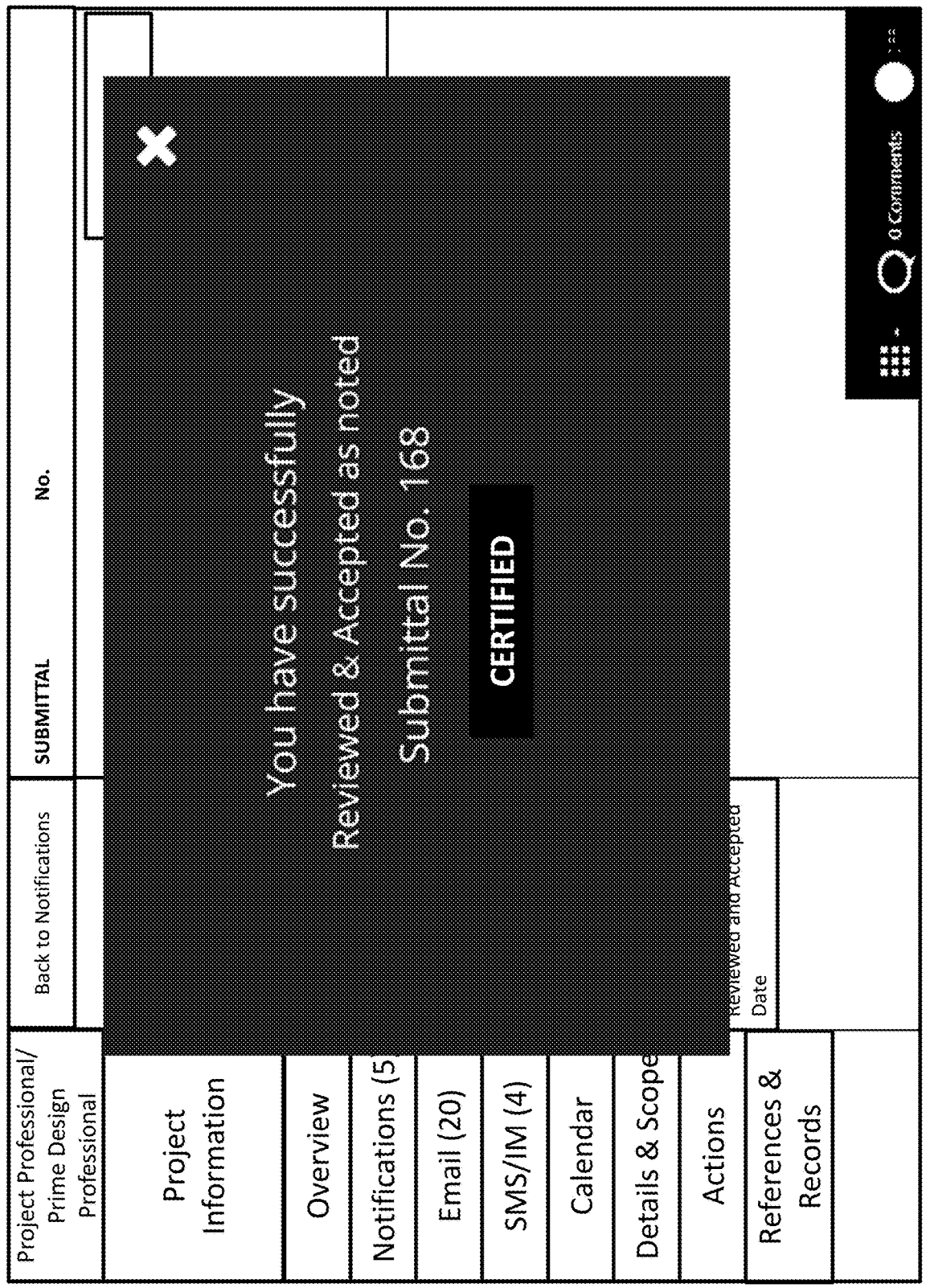

FIGS. 5A-V are exemplary diagrams of graphic user interfaces (GUIs) provided by the electronic building project administration computer system 200 in accordance with embodiments of the present invention. In embodiments, the electronic building project administration computer system 200 may transmit display data to stakeholder devices, which may include machine-readable instructions to render such user interfaces. In embodiments, user interfaces may be based, at least in part, upon stakeholder identity information, role information, interest information, professional information and technical obligation and contribution information of each stakeholder of the first subgroup of stakeholders, to name a few. In embodiments, data for generating a user interface may be stored in project platform database 2B1. In embodiments, the electronic building project administration computer system 200 may process logical rules governing user interface content and/or layout to generate display data and/or instructions for rendering an interface at a stakeholder device. Such data and/or instructions may be transmitted to the stakeholder device, which may render the interface. In embodiments, the stakeholder device may execute the machine-readable instructions to render the interface, which may be a dynamic interface that changes in response to user inputs and/or receipt of updated data values. In embodiments, each stakeholder device GUI is unique to the stakeholder based on at least user credentials, to name a few.

Turning to FIG. 5A, an exemplary diagram of a log-in screen for use with a stakeholder GUI according to exemplary embodiments described herein is illustrated. The log-in screen may include fields to enter stakeholder credentials, which may include 1 authorized user ID, password, and access code, to name a few. The log-in screen may include links for stakeholders to register and to retrieve a forgotten password or user id, to name a few. In embodiments, the log-in screen may be the same for each stakeholder. In embodiments, the log-in screen may be different for different stakeholders.

Turning to FIG. 5B, an exemplary diagram of an owner stakeholder device GUI is illustrated. The owner stakeholder device GUI may include owner name, project information, an overview tab, notifications tab, emails tab, SMS/IM tab, calendar tab, details & scope tab, actions tab, references and records tab, comments/chat pop-up, and project timeline, to name a few. In embodiments, the owner stakeholder device GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to owner stakeholder device based on stakeholder identity, role, interest, professional and technical obligation and contribution of each stakeholder.

Turning to FIG. 5C, a diagram of a prime participant-owner stakeholder device GUI is illustrated. The prime participant-owner stakeholder device GUI may include a prime participant-owner name, project information, an overview tab, notifications tab, emails tab, SMS/IM tab, calendar tab, details & scope tab, actions tab, references and records tab, comments/chat pop-up, and project timeline, to name a few. In embodiments, the prime participant-owner stakeholder device GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to prime participant-owner stakeholder device based on stakeholder identity information, role information, interest information, professional and technical obligation information and contribution information of each stakeholder.

Turning to FIG. 5D, an exemplary diagram of an owner representative stakeholder device GUI is illustrated. The owner representative stakeholder device 153 GUI may include owner representative name, project information, overview tab, notifications tab, emails tab, SMS/IM tab, calendar tab, details & scope tab, actions tab, references and records tab, comments/chat pop-up, and project timeline, to name a few. In embodiments, the owner representative stakeholder device 153 GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to owner representative stakeholder device based on stakeholder identity information, role information, interest information, professional and technical obligation information and contribution information of each stakeholder.

Turning to FIG. 5E, an exemplary diagram of a cost consultant stakeholder device GUI is illustrated. The cost consultant stakeholder device GUI may include a cost consultant name, project information, overview tab, notifications tab, emails tab, SMS/IM tab, calendar tab, details & scope tab, actions tab, references and records tab, comments/chat pop-up, and project timeline, to name a few. In embodiments, the cost consultant stakeholder device GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to cost consultant stakeholder device 155 based on stakeholder identity information, role information, interest information, professional and technical obligation information and contribution of each stakeholder of the first subgroup of stakeholders, to name a few.

Turning to FIG. 5F, an exemplary diagram of a project professional stakeholder device GUI is illustrated. The project professional stakeholder device GUI may include project professional name, project information, overview tab, notifications tab, emails tab, SMS/IM tab, calendar tab, details & scope tab, actions tab, references and records tab, comments/chat pop-up, and project timeline, to name a few. In embodiments, the project professional stakeholder device GUI may also include a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to project professional stakeholder device based on stakeholder identity information, role information, interest information, professional and technical obligation information and contribution information of each stakeholder.

Turning to FIG. 5G, an exemplary diagram of a building professional stakeholder device GUI illustrated. The building professional stakeholder device GUI may include a building professional name, project information, overview tab, notifications tab, emails tab, SMS/IM tab, calendar tab, details & scope tab, actions tab, references and records tab, comments/chat pop-up, and project timeline, to name a few. In embodiments, the building professional stakeholder device GUI may also comprise a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to building professional stakeholder device 156 based on stakeholder identity information, role information, interest information, professional and technical obligation information and contribution information of each stakeholder.

Turning to FIG. 5H, an exemplary diagram of a project consultant stakeholder device GUI is illustrated. The project consultant stakeholder device GUI may include a project consultant name, project information, overview tab, notifications tab, emails tab, SMS/IM tab, calendar tab, details & scope tab, actions tab, references and records tab, comments/chat pop-up, and project timeline, to name a few. In embodiments, the project consultant stakeholder device GUI may also include a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to project consultant stakeholder device 154 based on stakeholder identity information, role information, interest, information professional and technical obligation information and contribution information of each stakeholder.

Turning to FIG. 5I, an exemplary diagram of a prime design professional stakeholder device GUI is illustrated. The prime design professional stakeholder device a GUI may include a prime design professional name, project information, overview tab, notifications tab, emails tab, SMS/IM tab, calendar tab, details & scope tab, actions tab, references and records tab, comments/chat pop-up, and project timeline, to name a few. In embodiments, the prime design professional stakeholder device GUI may also include a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to prime design professional stakeholder device based on stakeholder identity information, role information, interest information, professional and technical obligation information and contribution information of each stakeholder.

Turning to FIG. 5J, an exemplary diagram of a construction manager stakeholder device GUI is illustrated. The construction manager stakeholder device GUI may include a construction manager name, project information, overview tab, notifications tab, emails tab, SMS/IM tab, calendar tab, details & scope tab, actions tab, references and records tab, comments/chat pop-up, and project timeline, to name a few. In embodiments, the construction manager stakeholder device GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to construction manager stakeholder device 152 based on identity information, role information, interest, information professional and technical obligation information and contribution of each stakeholder.

Turning to FIG. 5K, an exemplary diagram of a constructor stakeholder device GUI is illustrated. The constructor stakeholder device GUI may include a constructor name, project information, overview tab, notifications tab, emails tab, SMS/IM tab, calendar tab, details & scope tab, actions tab, references and records tab, comments/chat pop-up, and project timeline, to name a few. In embodiments, the constructor stakeholder device GUI may include a time stamp with the current date and time. In embodiments, the project timeline may include a graphical display of which LOD steps have been completed, and which is are progress. In embodiments, the project timeline may also include the total length (e.g., years, months, days) of the project and start and end date of the project. In embodiments, an exemplary diagram of the actions tab is displayed, including options specific to constructor stakeholder device 152a based on stakeholder identity information, role information, interest information, professional and technical obligation information and contribution information of each stakeholder.

Turning to FIG. 5L, an exemplary diagram of a manufacturer stakeholder device 157 is illustrated. The manufacturer stakeholder device GUI may include a manufacturer name, project information, overview tab, notifications tab, emails tab, SMS/IM tab, calendar tab, details & scope tab, actions tab, references and records tab, comments/chat pop-up, and project timeline, to name a few. In embodiments, the manufacturer device 157 GUI may also include a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to manufacturer stakeholder device 157 based on stakeholder identity information, role information, interest information, professional and technical obligation information and contribution information of each stakeholder.

Turning to FIG. 5M, an exemplary diagram of a supplier/vendor stakeholder device GUI is illustrated. The supplier/vendor stakeholder device GUI may include a supplier/vendor name, project information, overview tab, notifications tab, emails tab, SMS/IM tab, calendar tab, details & scope tab, actions tab, references and records tab, comments/chat pop-up, and project timeline, to name a few. In embodiments, the supplier/vendor stakeholder device GUI may also include a time stamp with the current date and time. In embodiments, the project timeline may include a graphical display of which LOD steps have been completed, and which is in progress. In embodiments, the project timeline may also include the total length (e.g., years, months, days) of the project and start and end date of the project. In embodiments, an exemplary diagram of the actions tab is displayed, including options specific to supplier/vendor stakeholder device 158 based on stakeholder identity information, role information, interest information, professional and technical obligation information and contribution of each stakeholder.

Turning to FIG. 5N, an exemplary diagram of a specifier stakeholder device GUI is illustrated. The specifier stakeholder device GUI may include a specifier name, project information, overview tab, notifications tab, emails tab, SMS/IM tab, calendar tab, details & scope tab, actions tab, references and records tab, comments/chat pop-up, and project timeline, to name a few. In embodiments, the specifier stakeholder device GUI may also include a time stamp with the current date and time. In embodiments, the project timeline may include a graphical display of which LOD steps have been completed, and which are in progress. In embodiments, the project timeline may also include the total length (e.g., years, months, days) of the project and start and end date of the project. In embodiments, an exemplary diagram of the actions tab is displayed, including options specific to specifier device 159 based on stakeholder identity information, role information, interest information, professional and technical obligation information and contribution information of each stakeholder.

Turning to FIG. 5O, an exemplary diagram of a project option screen for use with a stakeholder GUI according to exemplary embodiments described herein is illustrated. The project option screen may include a stakeholder name, a projects tab, account tab, and logout tab, to name a few. In embodiments, an exemplary diagram of the projects tab is displayed, including a list of projects that the stakeholder is currently working on and a search bar sorted by date created, to name a few. In embodiments, the list of projects that the stakeholder is currently working includes project id, project name, and last update information, to name a few.

Turning to FIG. 5P, an exemplary diagram of a notifications tab screen for use with a stakeholder GUI according to exemplary embodiments described herein is illustrated. The notifications tab screen may include a list of notifications with notification previews including subject, sender name, and date received to name a few, and a search bar sorted by date, to name a few.

Turning to FIG. 5Q, an exemplary diagram of a notification message on the notifications tab screen for use with a stakeholder GUI according to exemplary embodiments described herein is illustrated. The notification message may include notification type information such as: subject, scope id, material object category, date/time received, body of the message, and options to go to the previous and next messages, to name a few.

Turning to FIG. 5R, an exemplary diagram of a submittal receipt notification message on the notifications tab screen for use with a stakeholder GUI according to exemplary embodiments described herein is illustrated. The submittal receipt notification message may include notification type information, subject, scope id, material object category, date/time received, body of the message, options to go to the previous and next messages, and option to go to the relevant submittal, to name a few.

Turning to FIG. 5S, an exemplary diagram of the actions tab screen for use with a stakeholder GUI according to exemplary embodiments described herein is illustrated. The actions tab screen may include an option to view a submittal log, a list of completed reviews comprising stakeholder type, stakeholder name, reviewed and accepted information, and date to name a few, submittal number, subject, scope id, material object category, option to go to the next and previous notifications, a review option, and the body of the submittal to name a few.

Turning to FIG. 5T, an exemplary diagram of the review screen for a submittal for use with a stakeholder GUI according to exemplary embodiments described herein is illustrated. The review screen may include dispositions/actions drop down option to label the submittal as reviewed & accepted, reviewed and accepted as noted, and reviewed and rejected, to name a few. The review screen may also include the option to certify once a selection from the dropdown has been chosen or cancel.

Turning to FIG. 5U, an exemplary diagram of the review & accepted as noted screen from the drop down discussed in FIG. 5T for use with a stakeholder GUI according to exemplary embodiments described herein is illustrated. The review & accepted as noted screen may include an area to enter text to comment on the submittal and the option to upload and include an attachment. The review & accepted as noted screen may also include the option to certify once text has been entered and/or an attachment has been uploaded or cancel.

Turning to FIG. 5V, an exemplary diagram of a submittal approval notice for use with a stakeholder GUI according to exemplary embodiments described herein is illustrated. The submittal approval notice may include a message that the stakeholder has successfully review and accepted a submittal ad noted, submittal number, certified stamp, and the option to exit the notice, to name a few.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A method of validating a first electronic computer model of a first building project using an electronic building project administration computer system, the method comprising:
   (a) providing one or more electronic building project databases stored on non-volatile computer readable media operatively connected to the electronic building project administration computer system, the one or more electronic building project databases comprising at least the following first data types associated with the first building project:
      (i) stakeholder information associated with each stakeholder of a first subgroup of stakeholders of a plurality of stakeholders associated with the first building project,
      (ii) element data associated with each instance data item of a plurality of instance data items associated with the first building project, wherein the element data for each instance data item is provided by a first responsible stakeholder of the first subgroup of stakeholders and the element data includes first source information associated with the first responsible stakeholder and a first timestamp indicating when the element data was provided to the one or more electronic building project databases;
      (iii) material data associated with each instance data item of the plurality of instance data items associated with the first building project, wherein the material data for each instance data item is provided by a second responsible stakeholder of the first subgroup of stakeholders and the material data includes second source information associated with the second responsible stakeholder and a second timestamp indicating when the material data was provided to the one or more electronic building project databases;
      (iv) specification data associated each instance data item of the plurality of instance data items associated with the first building project, wherein the specification data for each instance data item is provided by a third responsible stakeholder of the first subgroup of stakeholders where the element data includes third source information associated with the third responsible stakeholder and a third timestamp indicating when the specification data was provided to the one or more electronic building project databases;
      (v) requirement data associated with contract documents related to each instance data item of the plurality of instance data items associated with the first building project, wherein the requirement data for each instance data item is provided by a fourth responsible stakeholder of the first subgroup of stakeholders where the requirement data includes fourth source information associated with the fourth responsible stakeholder and a fourth timestamp indicating when the element data was provided to the one or more electronic building project databases;
      (vi) procurement data associated with procurement of each instance data item of the plurality of instance data items associated with the first building project, wherein the procurement data is provided by a fifth responsible stakeholder of the first subgroup of stakeholders and includes fifth source information associated with the fifth responsible stakeholder and a fifth timestamp indicating when the procurement data was provided to the one or more electronic building project databases; and
      wherein the plurality of instance data items are provided by at least one stakeholder of the first subgroup of stakeholders wherein each instance data item is linked to at least one of the element data, the specification data, the requirement data and the procurement data and each instance data item includes sixth source information associated with the at least one stakeholder that provided the instance data item to the one or more electronic building project databases and a sixth time stamp indicating when the instance data item was added to the one or more electronic building project databases;
   (b) generating, by the electronic building project administration computer system, a scope ID associated with each instance data item of the plurality of instance data items associated with the first building project, the scope ID including at least:
      (i) a material element category indicator;
      (ii) a CSI division number;
      (iii) a material object category indicator;
      (iv) a scope designator;
      (v) a type designator;
      and
      (vii) a specification category number;
   wherein a respective value of each of the material element category indicator, CSI division number, material object category indicator, scope designator, and specification category number is based on at least one of element data, material data, specification data, requirement data, and procurement data to which a respective instance data item is linked to, such that the respective instance data item is associated with a respective scope ID;

(c) storing, by the electronic building project administration computer system, the scope ID associated with each respective instance data item in the one or more electronic building project databases;

(d) receiving, by the electronic building project administration computer system, from a second at least one stakeholder from a second subgroup of stakeholders associated with the first building project, a first electronic computer model related to the first building project, the first electronic building model including a plurality of existence objects associated with the first building project and including seventh source data associated with the second at least one stakeholder and seventh timing information indicating when the at least one computer model is received;

(e) validating, by the electronic building administration computer system, the first electronic computer model including steps of:
  (i) comparing, by the electronic building administration system, the plurality of existence objects included in the first computer model to the plurality of instance data items associated with the first building project to map each existence object to a corresponding instance data item associated with the first building project and each instance data item to a corresponding existence object based at least on the scope ID;
  (ii) generating, by the electronic building administration system, an electronic alert signal when the first electronic computer model includes an existence object that is not mapped to a corresponding instance data item or when an instance data item is not mapped to the corresponding existence object;
  (iii) transmitting, by the electronic building administration system, the electronic alert signal to the second at least one stakeholder and the first subgroup of stakeholders;

(f) receiving, by the electronic building administration system, updated information, including at least one of:
  (i) updated instance data item information; and
  (ii) updated first computer model information;

(g) repeating step (e)-(f) until no alert is generated;

(h) generating, by the electronic building administration system, a certification query requesting certification of the instance data items;

(i) transmitting, by the electronic building administration system, the certification query to each stakeholder of the first subgroup of stakeholders and the second subgroup of stakeholders;

(j) receiving, by the electronic building administration system, a certification message from each stakeholder of the first subgroup of stakeholders and the second subgroup of stakeholders;

(k) storing, by the electronic building administration system, in an immutable form, the plurality of instance data items along with the respective scope ID of each instance data item, wherein at least the value of the material element category indicator, the CSI division number and the type designator of each scope ID has a non-zero value, when the certification message form each stakeholder confirms certification; and (l) storing, by the electronic building administration system, the plurality of existences, when the certification message form each stakeholder confirms certification.

2. The method of claim 1, further comprising steps of:
(m) receiving, by the electronic building administration system, a drawing sheet generation request from at least one stakeholder of the first subgroup of stakeholders or the second subgroup of stakeholders, the drawing sheet request including at least one scope ID;
(n) generating, by the electronic building administration system, a drawing sheet indicating each instance of the existence object corresponding to the at least one scope ID included in the first computer model;
(o) assigning, by the electronic building administration system, a sheet ID unique to the drawing sheet generated in (n), wherein the sheet ID, includes:
(i) a discipline designator;
(ii) a documentation format series number;
(iii) a level of development indicator; and
(iv) a level of development status indicator;
  wherein values for the discipline designator, document discipline designator, level of development indicator and level of development status indicator are based on input provided by stakeholders;
(p) updating, by the electronic building administration system, the level of development status indicator of the sheet ID to reflect certification when the certification message from each stakeholder of the first subgroup of stakeholders and the second subgroup of stakeholders is received; and
(q) storing, by the electronic building administration system, in an immutable form, the drawing sheet and updated sheet ID and the at least one scope ID.

3. The method of claim 2, wherein the drawing sheet generation request includes multiple scope IDs.

4. The method of claim 1, wherein the stakeholder information includes an identity of each stakeholder of the first subgroup of stakeholders.

5. The method of claim 1, wherein the stakeholder information includes a role of each stakeholder of the first subgroup of stakeholders.

6. The method of claim 1, wherein the stakeholder information includes an interest of each stakeholder of the first subgroup of stakeholders.

7. The method of claim 1, wherein the stakeholder information includes professional information of each stakeholder of the first subgroup of stakeholders.

8. The method of claim 1, wherein the stakeholder information includes technical obligation information of each stakeholder of the first subgroup of stakeholders.

9. The method of claim 1, wherein the stakeholder information includes contribution information of each stakeholder of the first subgroup of stakeholders.

10. The method of claim 1, wherein the first responsible stakeholder is the same as the second responsible stakeholder, third responsible stakeholder, fourth responsible stakeholder and fifth responsible stakeholder.

11. The method of claim 1, wherein the first responsible stakeholder is the same as at least one of the second responsible stakeholder, third responsible stakeholder, fourth responsible stakeholder and fifth responsible stakeholder.

12. The method of claim 1, wherein the first responsible stakeholder is different from the second responsible stakeholder, third responsible stakeholder, fourth responsible stakeholder and fifth responsible stakeholder.

13. The method of claim 1, wherein the first responsible stakeholder is different from at least one of the second responsible stakeholder, third responsible stakeholder, fourth responsible stakeholder and fifth responsible stakeholder.

14. The method of claim 1, wherein procurement information comprises:
(1) procurement responsibility information;
(2) procurement term information;
(3) procurement condition information; and
(4) procurement warranty information.

15. The method of claim 1, wherein the instance data item is associated with a physical object required by the first building project.

16. The method of claim 1, wherein the instance data item is associated with a service required by the first building project.

17. The computer system of claim 15, wherein the determining further comprises:
based on the indicated full-state for the queue being correct, determining whether a program owner of a message in the queue is in suspended state;
based on the program owner of the message in the queue being in suspended state, identifying that the enqueuing of the request message timing out is likely due to the program owner of the message of the queue being in suspended state; and
wherein the performing comprises:
releasing the lock of the queue; and
providing an indication that the attempted enqueuing of the request message timing out is due to the program owner of a message on the queue being in suspended state.

18. The method of claim 1, wherein only the values of the material element category indicator, the CSI division number, and the type designator have non-zero values.

19. The method of claim 1, wherein the database is a relational database.

20. The method of claim 1, wherein instance data items of the same type of have the same scope ID.

* * * * *